(12) United States Patent
Ohno et al.

(10) Patent No.: US 6,617,816 B2  
(45) Date of Patent: Sep. 9, 2003

(54) DC MOTOR ROTATION DETECTING APPARATUS AND DC MOTOR ROTATION CONTROL APPARATUS

(75) Inventors: Yoshimi Ohno, Kawasaki (JP); Ikuya Tsurukawa, Yokohama (JP); Kenji Koyama, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/747,952

(22) Filed: Dec. 27, 2000

(65) Prior Publication Data

US 2001/0022505 A1 Sep. 20, 2001

(30) Foreign Application Priority Data

Dec. 27, 1999 (JP) .............................. 11-371936

(51) Int. Cl.[7] ............................................... G05B 11/01
(52) U.S. Cl. ................. 318/560; 318/138; 318/245; 318/254; 318/439; 318/685
(58) Field of Search ................. 318/138, 139, 318/245, 254, 439, 808, 812, 560, 685

(56) References Cited

U.S. PATENT DOCUMENTS

| 4,525,657 A | * | 6/1985 | Nakase et al. ............... 318/254 |
| 5,552,689 A | * | 9/1996 | Matoba ....................... 318/599 |
| 5,600,218 A | * | 2/1997 | Hollings et al. ............. 318/439 |
| 5,751,128 A | * | 5/1998 | Chalupa et al. ............. 318/439 |
| 5,783,924 A | * | 7/1998 | Kahlman ..................... 318/601 |
| 5,821,713 A | * | 10/1998 | Hollings et al. ............ 318/439 |
| 5,898,288 A | * | 4/1999 | Rice et al. .................. 318/685 |
| 6,020,715 A | * | 2/2000 | Yasohara et al. ........... 318/808 |
| 6,153,993 A | * | 11/2000 | Oomura et al. ............. 318/434 |

FOREIGN PATENT DOCUMENTS

| JP | 4-127864 | * | 4/1992 | ......... H02K/23/66 |
| JP | 4-190658 | * | 7/1992 | ......... H02K/11/00 |
| JP | 6-189504 | * | 7/1994 | ......... H02K/11/00 |
| JP | 6-245454 | * | 9/1994 | ......... H02K/23/66 |
| JP | 6-245571 | * | 9/1994 | ......... H02P/5/06 |
| JP | 5-347613 | * | 7/1995 | ......... H02P/5/17 |
| JP | 9-222433 | * | 8/1997 | ......... H02K/23/00 |

* cited by examiner

Primary Examiner—Robert E. Nappi  
Assistant Examiner—Tyrone Smith  
(74) Attorney, Agent, or Firm—Oblon, Spivak, McClelland, Maier & Neustadt, P.C.

(57) ABSTRACT

A rotation detector apparatus and a rotation control apparatus for the DC motor is disclosed wherein rotational operations of a rotor of the DC motor are controlled by detecting at least one of the rotational direction, the rotational speed, the cumulative rotation number, and the rotational position of the rotor. The pulsed output signal from at least one motor rotor rotation detector brush is processed by signal processing circuitry to regulate the at least one of the rotational direction, the rotational speed, the cumulative rotation number, and the rotational position of the rotor.

24 Claims, 35 Drawing Sheets

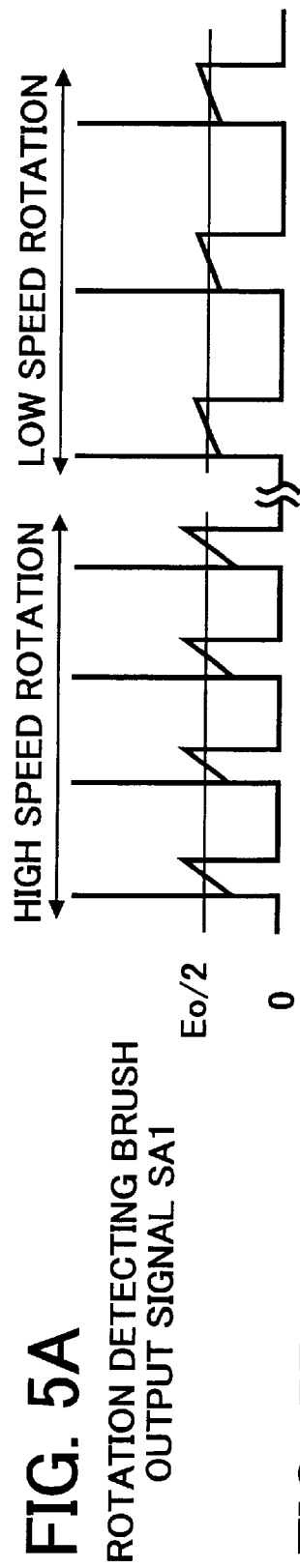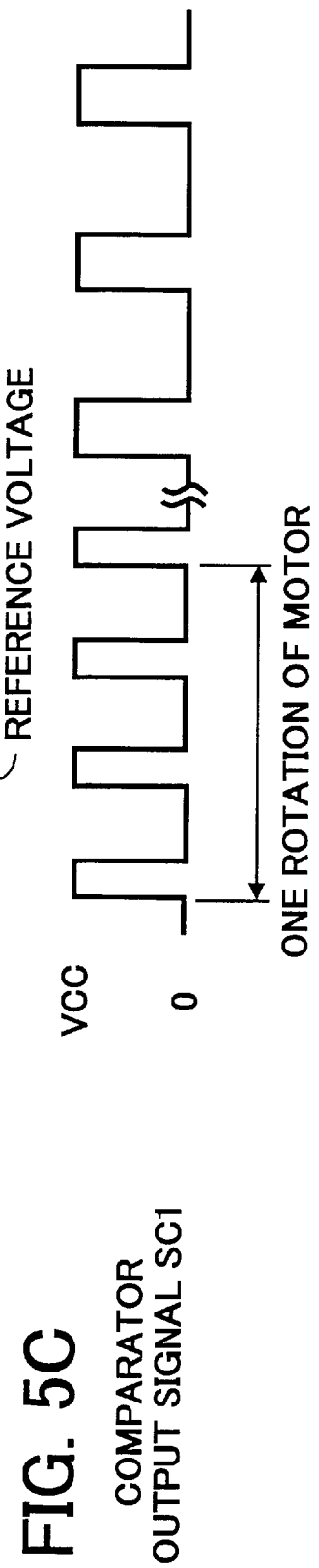
FIG. 5A ROTATION DETECTING BRUSH OUTPUT SIGNAL SA1
FIG. 5B NOISE REMOVING CIRCUIT OUTPUT SIGNAL SB1
FIG. 5C COMPARATOR OUTPUT SIGNAL SC1

ROTATION DETECTING BRUSH
OUTPUT SIGNAL SA2

NOISE REMOVING CIRCUIT
OUTPUT SIGNAL SB2

COMPARATOR
OUTPUT SIGNAL SC2

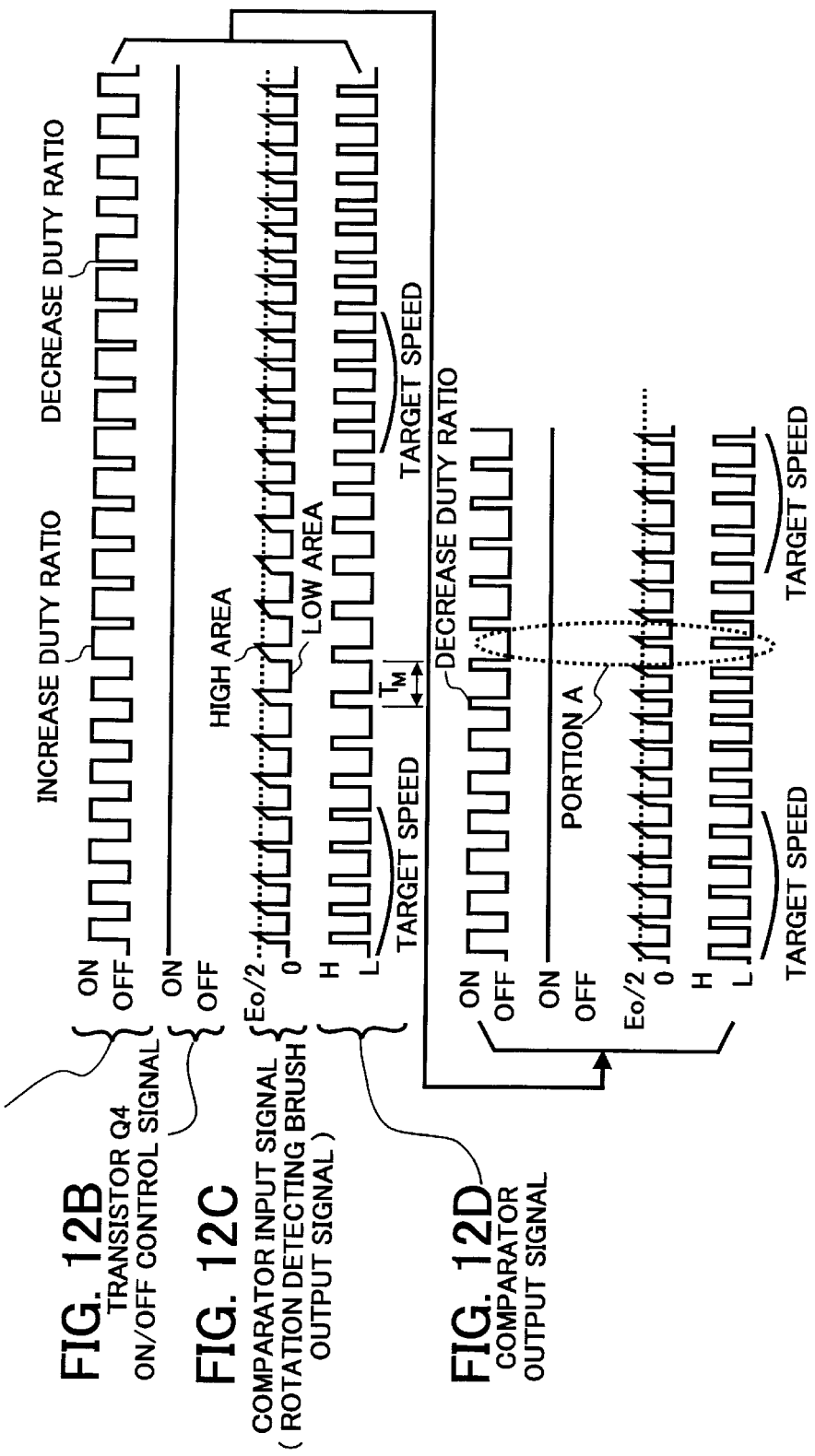

FIG. 15

| IN1 | IN2 | OUT1 | OUT2 | OUT3 | OUT4 | Q1 | Q2 | Q3 | Q4 | MOTOR CONDITION |
|---|---|---|---|---|---|---|---|---|---|---|
| L | L | H | H | L | L | OFF | OFF | OFF | OFF | STOP |
| L | H | H | L | H | L | OFF | ON | ON | OFF | CCW ROTATION |
| H | L | L | H | L | H | ON | OFF | OFF | ON | CW ROTATION |
| H | H | H | H | H | H | OFF | OFF | ON | ON | BRAKE (SHUNT) |

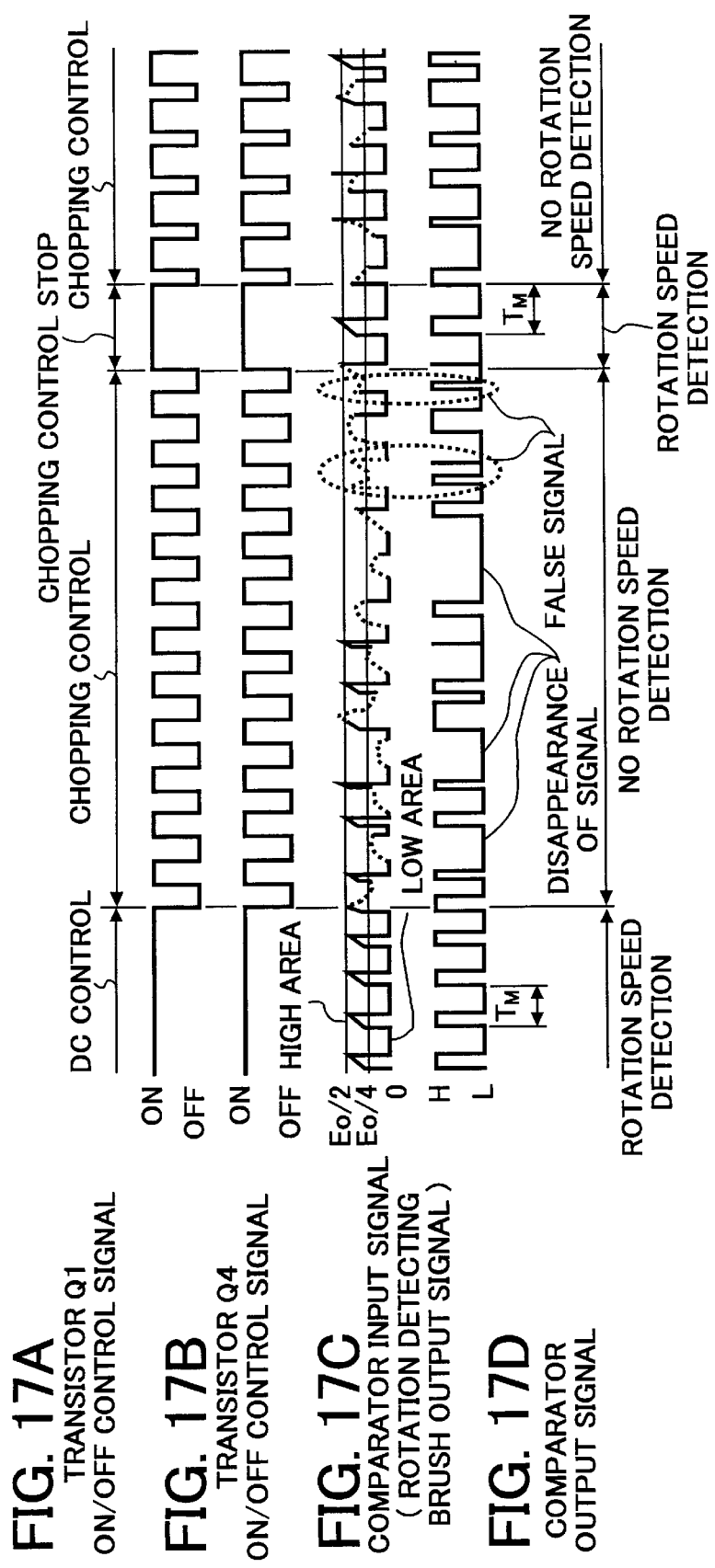

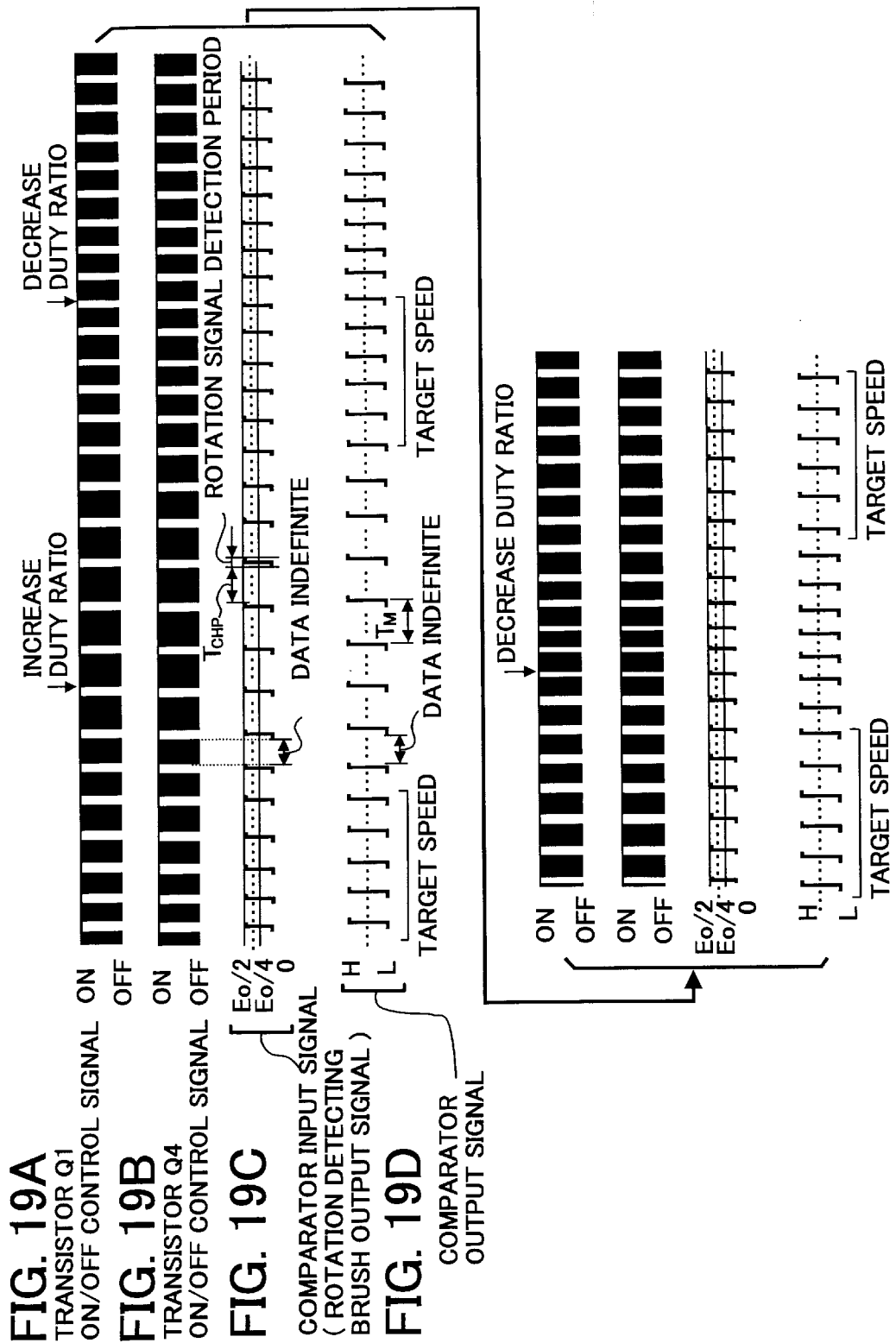

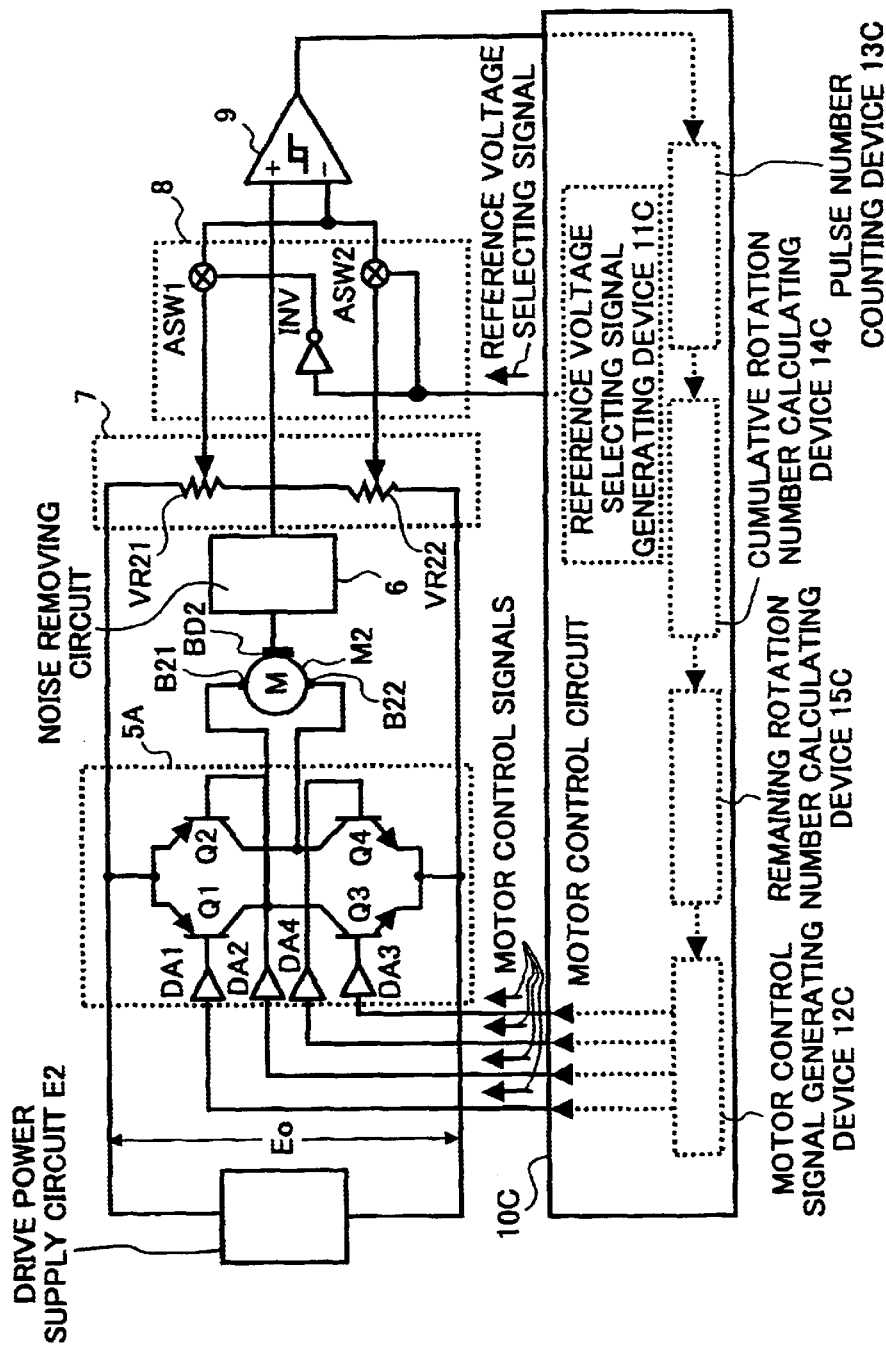

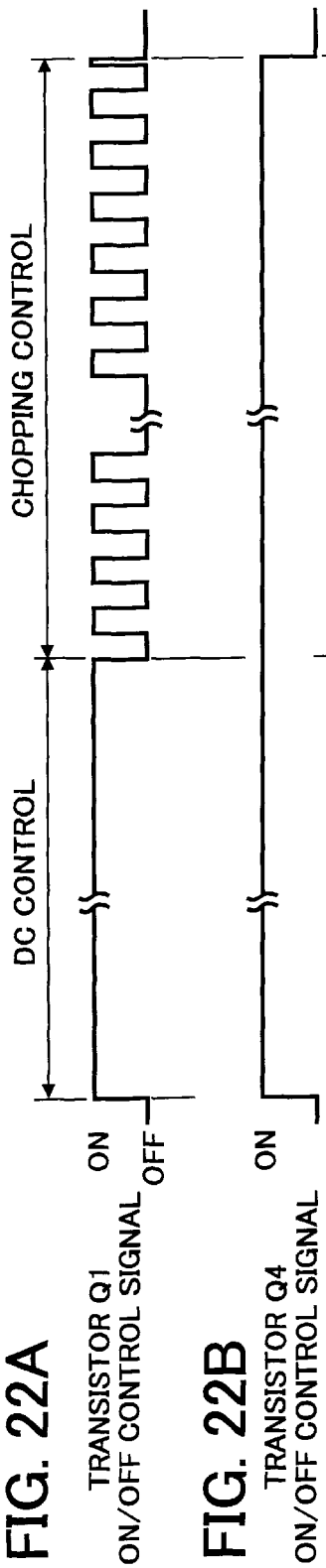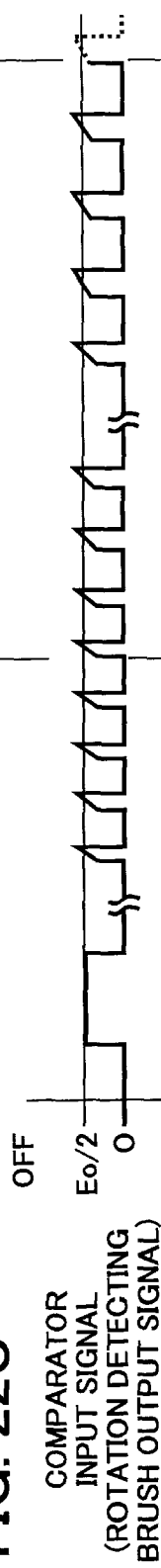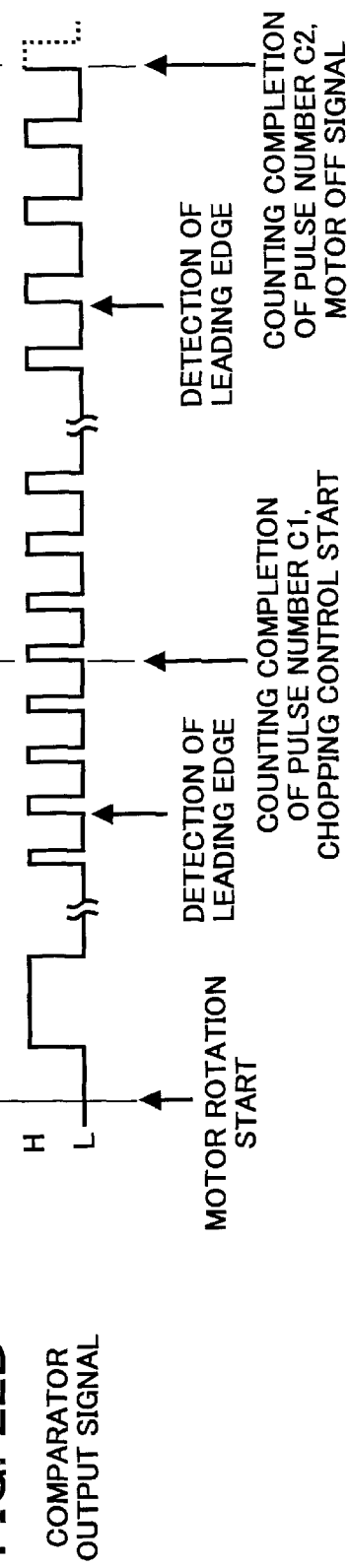
FIG. 22A TRANSISTOR Q1 ON/OFF CONTROL SIGNAL
FIG. 22B TRANSISTOR Q4 ON/OFF CONTROL SIGNAL
FIG. 22C COMPARATOR INPUT SIGNAL (ROTATION DETECTING BRUSH OUTPUT SIGNAL)
FIG. 22D COMPARATOR OUTPUT SIGNAL

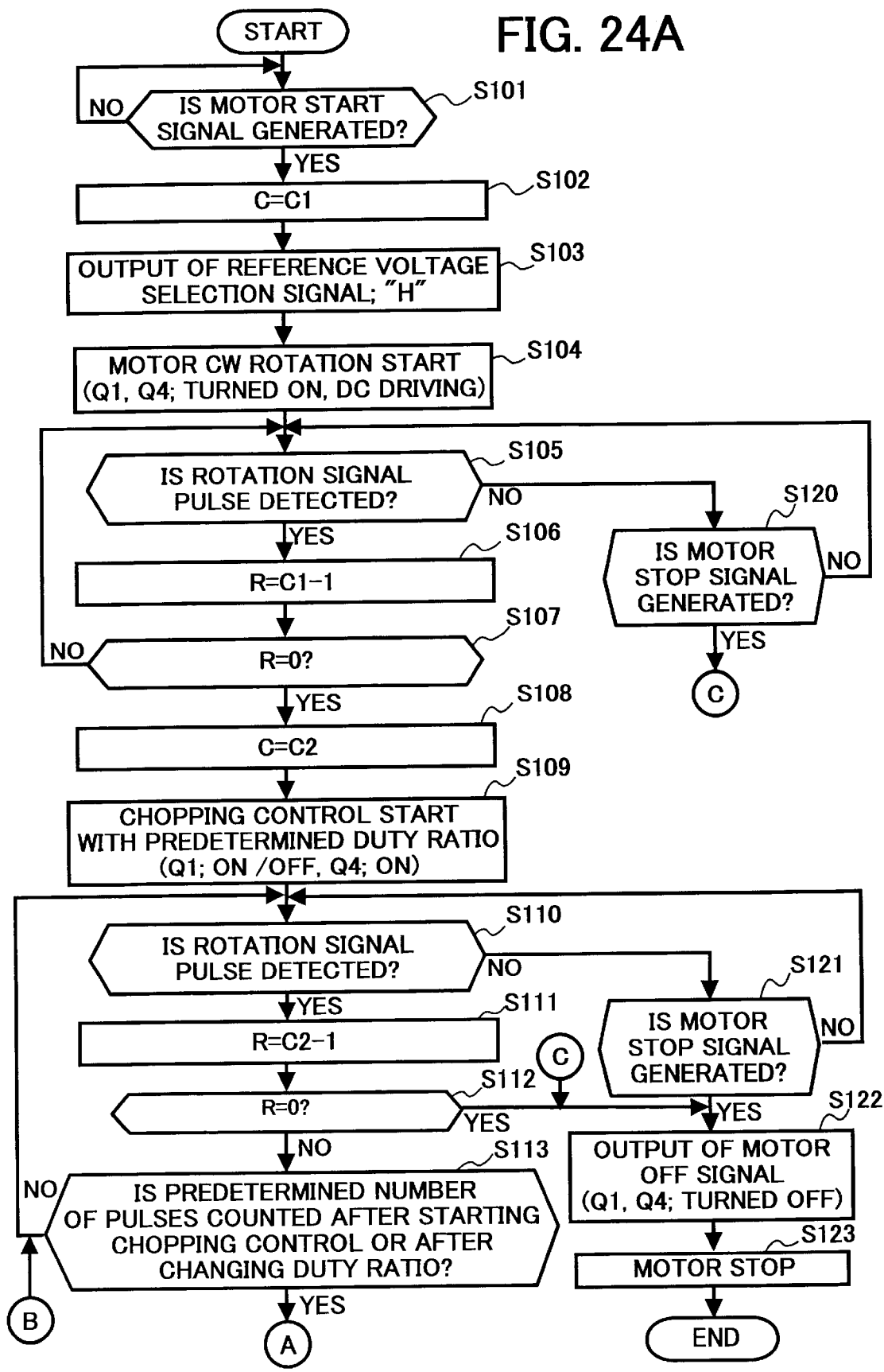

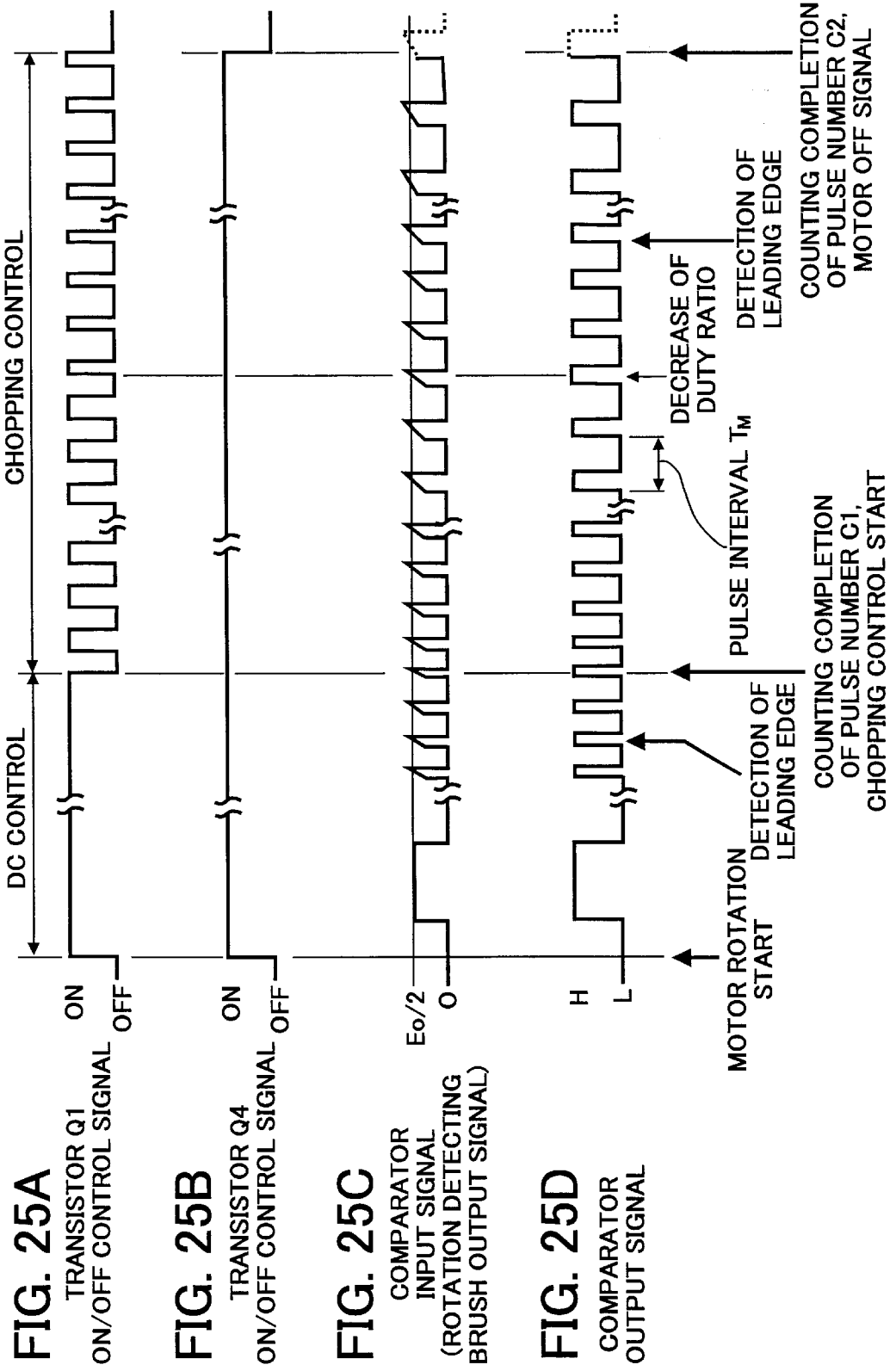

FIG. 26A
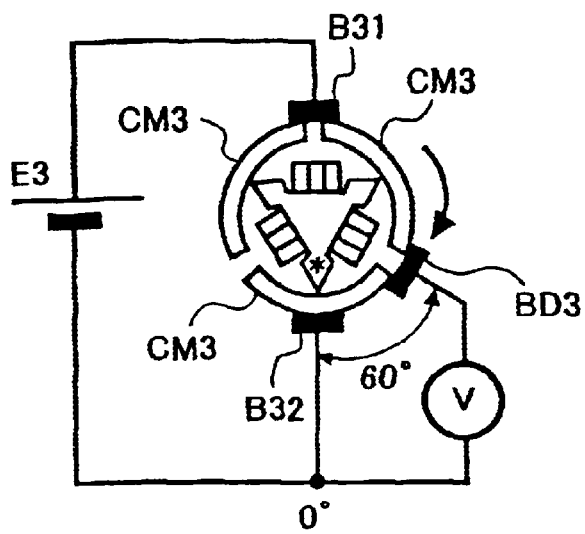
FIG. 26B
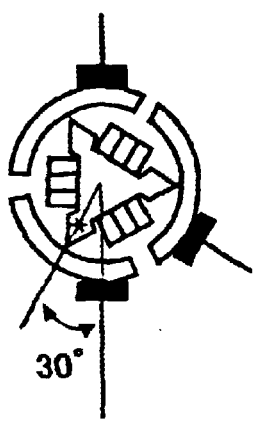
FIG. 26C FIG. 26D FIG. 26E
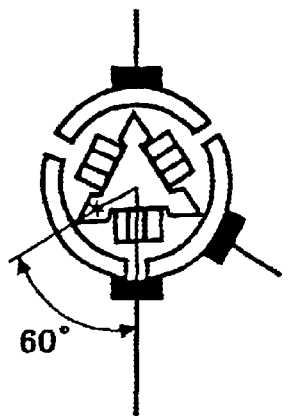 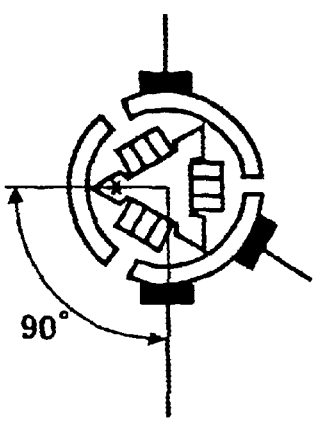 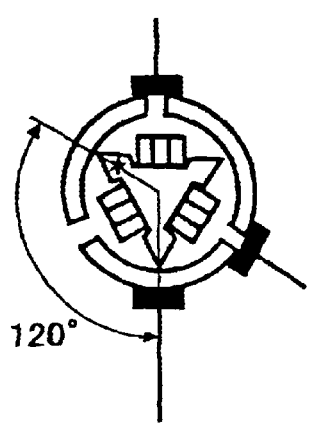

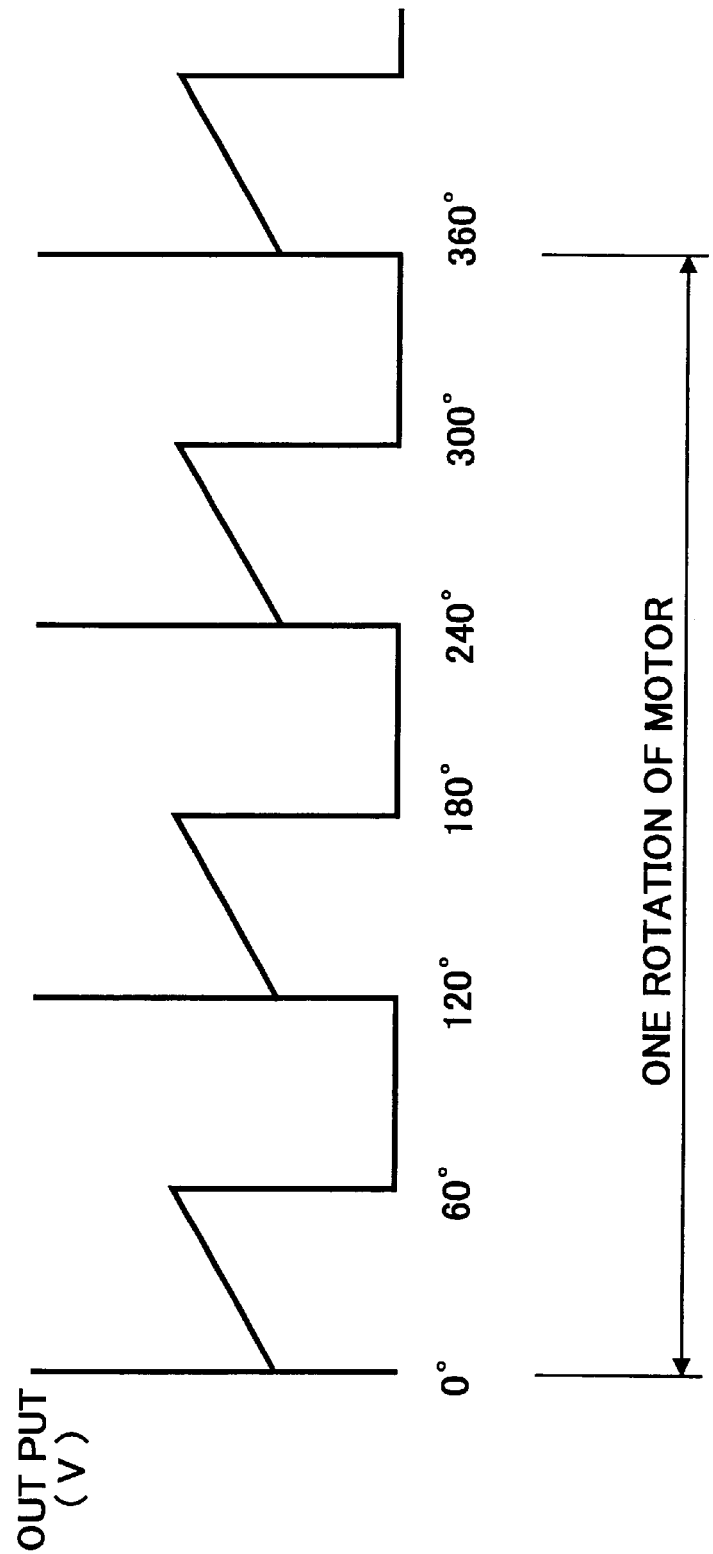

DC MOTOR ROTATION DETECTING APPARATUS AND DC MOTOR ROTATION CONTROL APPARATUS

CROSS REFERENCES TO RELATED APPLICATIONS AND PUBLICATIONS

This application claims priority and contains subject matter related to Japanese Patent Application No. 11-371936 filed in the Japanese Patent Office on Dec. 27, 1999 and the entire contents of which are hereby incorporated by reference.

BACKGROUND OF THE INVENTION

1. Field of the Invention

The present invention relates to an apparatus wherein a DC (direct current) motor is used to provide the driving force for performing mechanical operations, and wherein stabilization of the rotational speed of the DC motor and control of cumulative rotation numbers of the DC motor are required. More particularly, the present invention relates to a rotation detecting apparatus and a rotation control apparatus for the DC motor wherein rotational operations of the rotor of the DC motor are controlled by detecting at least one of the rotational direction, the rotational speed, the cumulative rotation number, and the rotational position of the rotor.

2. Discussion of the Background

A brush-using DC motor is often used to provide the driving force for mechanical operations in a camera, for example: in zooming operations, wherein photographic lenses including a zoom lens are zoomed; in focusing operations, wherein at least one of a photographic lens and an imaging device is moved along an optic axis of the photographic lens for focusing based on the distance from an object to an image focusing point; and in film feeding operations, wherein a photographic film is wound and rewound.

In the brush-using DC motor, plural fixed magnetic poles are formed in a stator by employing a permanent magnet, etc. A DC drive current is switched corresponding to the rotational angle of the rotor, and is applied to plural rotor coils forming plural magnetic poles of the rotor through a commutator which rotates together with the rotor and through a brush which is in sliding contact with the commutator. Thereby, the rotor rotates.

There are, for example, five types of apparatuses using a motor as a driving force: (1) the type where uni-directional rotations of the motor are used, and the rotational speed of the motor is required to be kept constant; (2) the type where uni-directional rotations of the motor are used, and cumulative rotation numbers of the motor, that is, the total driving amount of the motor, are required to be controlled; (3) the type where bi-directional rotations of the motor (i.e., a forward rotation and a reverse rotation) are used, and rotational speed only on uni-directional rotations of the motor is required to be kept constant; (4) the type where bi-directional rotations of the motor are used, and each rotational speed on bi-directional rotations of the motor is required to be kept constant; and (5) the type where bi-directional rotations of the motor are used, and cumulative rotation numbers on uni-directional rotations of the motor are required to be controlled.

With regard to the rotation control method of the motor in an apparatus, there are, for example, two types of apparatuses according to their uses and operation environmental conditions: (1) the type where the rotational speed of the motor is controlled by changing a drive voltage for driving the motor; and (2) the type where the rotational speed of the motor is controlled by a chopping control wherein a drive voltage is intermittently applied to the motor.

As an example of the above-described brush-using DC motor, FIG. 30 illustrates a three-pole motor. In the three-pole motor, electricity is fed to a commutator CM0 which is in sliding contact with a pair of electrode brushes B01 and B02 from a DC drive power supply E0 through the paired electrode brushes B01 and B02. The paired electrode brushes B01 and B02 are brought into contact with the commutator CM0 on rotational angle positions different by 180°. The commutator CM0 includes three pieces which form a cylindrical surface and rotates together with a rotor of the DC motor. The three pieces of the commutator CM0 are separated at equally angled interval of about 120°. Three rotor coils are connected to each other between the adjacent pieces of the commutator CM0, and thereby three rotor magnetic poles are formed therebetween. The polarity of these rotor magnetic poles varies depending on the contact state of each piece of the commutator CM0 and the electrode brushes B01 and B02 which changes corresponding to the rotational angle of the rotor. Thereby, a rotational driving force is generated between, for example, a pair of stator magnetic poles of a permanent magnet at the side of a stator (not shown).

With the rotation of the rotor, respective rotor magnetic poles oppose to respective stator magnetic poles in order, and the contact state of each piece of the commutator CM0 and the electrode brushes B01 and B02 changes. Thus, by the variance of the polarity of each rotor magnetic pole in order, the rotor continually rotates.

Specifically, when a voltage is applied to the paired electrode brushes B01 and B02 from the power supply E0, the current flows from one of the electrode brushes B01 and B02 to another through the rotor coils. The magnetic field is generated by the rotor coils, and thereby the rotor magnetic poles are formed. By the action of the magnetic field generated by the rotor coils and the magnetic field generated by the stator magnetic poles, the rotor rotates.

As a method of detecting the rotation of the above-described motor, a rotary encoder method is known. Specifically, in the rotary encoder method, a rotational slit disk having slits on the circumferential surface thereof is provided on a rotation output shaft of the motor or in a power transmission mechanism rotated by the rotation output shaft. The rotation of the motor is detected by the method of detecting the slits on the circumferential surface of the rotational slit disk with a photointerrupter. Although the rotary encoder method allows an accurate detection of the rotation of the motor, space and cost for the rotary encoder constructed by the rotational slit disk, the photointerrupter, and etc. are inevitably increased.

Further, another method of detecting the rotation of the motor from the drive voltage ripple of the motor is described referring to FIGS. 31 and 32. In FIG. 31, a resistor R0 is connected in series to electrode brushes B01 and B02 in a power supplying line for supplying the motor drive current to the electrode brushes B01 and B02 from a drive power supply E0, and the voltage between both terminals of the resistor R0 is detected. In such a way, the ripple waveform of 60°-period of the drive current as illustrated in FIG. 32 is obtained.

Because the ripple waveform corresponds to the rotational angle position of the rotor, the pulse signal corresponding to the rotational angle position can be obtained by suitably rectifying (shaping) the ripple waveform. Although this another rotation detecting method is advantageous in cost and space, detection errors due to noise, etc. may be caused, so that this another rotation detecting method may be disadvantageous in detection accuracy.

For example, Japanese Laid-open Patent Publication No. 4-127864 describes a method for detecting the rotational speed of a DC motor wherein a rotation detecting brush is provided in addition to a pair of electrode brushes. Similarly, as in the paired electrode brushes, the rotation detecting brush is brought into sliding contact with a commutator so as to extract a voltage applied to the commutator. The rotational speed of the DC motor is detected based on the signal generated by the rotation detecting brush.

Specifically, Japanese Laid-open Patent Publication No. 4-127864 describes a DC motor control circuit illustrated in FIG. 33. Referring to FIG. 33, a rotation detecting brush BD0 is provided to a motor M0 in addition to a pair of electrode brushes B01 and B02. The rotation detecting brush BD0 is connected to a differentiating circuit 101, a time constant reset circuit 102, and a time constant circuit 103 in order. In a comparator 105, the voltage of the output signal from the time constant circuit 103 is applied to a non-inversion input terminal (i.e., +side) of the comparator 105, and the voltage of the output signal from a reference voltage generating device 104 is applied to an inversion input terminal (i.e., −side) of the comparator 105. The output signal from the comparator 105 is connected to one terminal of exciting coils of a relay 107 through a diode 106. Another terminal of the exciting coils of the relay 107 is connected to one terminal of a drive power supply E0. The pair of electrode brushes B01 and B02 is connected to the drive power supply E0 via a contact 107a of the relay 107.

The one terminal of the exciting coils of the relay 107 is connected to a collector of a transistor 109a of a motor starting circuit 109 via a diode 108. The motor starting signal is applied to a base of the transistor 109a via a resistor 109b. A resistor 109c is connected between the base and an emitter of the transistor 109a. The emitter of the transistor 109a is connected to another terminal of the drive power supply E0.

FIG. 34 is a diagram illustrating waveforms of a motor starting signal input to the motor starting circuit 109, a rotation detecting signal SA0 of the rotation detecting brush BD0, an output signal SB0 from the differentiating circuit 101, an output signal SC0 from the time constant circuit 103, an output signal SD0 from the comparator 105, an operation (on/off) signal of the relay 107, and a supply signal applied to a motor M0 from a drive power supply E0.

Next, the operation of the DC motor control circuit of FIG. 33 is described. When the transistor 109a of the motor starting circuit 109 is turned on by the motor starting signal, the relay 107 is turned on and the contact 107a is closed. Thereby, the electric power is supplied to the motor M0 through the electrode brushes B01 and B02, and the motor M0 starts rotating.

With the rotation of the motor M0, pulse train SA0 is output from the rotation detecting brush BD0 and is differentiated in the differentiating circuit 101. Then, signal SB0 which synchronized in the leading edge of each pulse is applied to the time constant reset circuit 102. The time constant reset circuit 102 is synchronized in the signal SB0, and resets the time constant circuit 103. Then, signal SC0 is output from the time constant circuit 103 as illustrated in FIG. 34.

In the normal state in which the motor M0 rotates at a usual rotational speed, the voltage of the output signal SC0 from the time constant circuit 103 does not exceed the reference voltage applied from the reference voltage generating device 104. In this state, output signal SD0 from the comparator 105 is in an "L" (low) level, and the relay 107 is excited and keeps ON condition. Thereby, the supply of electricity to the motor M0 is maintained.

However, when the rotational speed of the motor M0 lowers by overloads, etc., the voltage of the output signal SC0 from the time constant circuit 103 exceeds the reference voltage. Thereby, the output signal SD0 from the comparator 105 becomes a "H" (high) level, and the exciting current does not flow through the relay 107. Thereby, the relay 107 is turned off, and the contact 107a is opened. As a result, the supply of electricity to the motor M0 is stopped.

Thus, in the above-described DC motor control circuit, the lowering of the rotational speed of the motor M0 is detected, and the excessive current is prevented from keeping flowing in the motor M0 by stopping the DC motor M0.

However, Japanese Laid-open Patent Publication No. 4-127864 describes the DC motor control circuit wherein only when the rotational speed of the motor M0 is lower than a certain rotational speed, the relay 107 is turned off. It does not describe a DC motor control circuit that can detect and control the rotational speed, the rotational position, the cumulative rotation number, and the rotational direction of the DC motor with high accuracy.

SUMMARY OF THE INVENTION

Accordingly, an object of the present invention is to provide a novel rotation detecting apparatus and a novel rotation control apparatus that can detect and control at least one of the rotational speed, the rotational direction, the rotational position, and the cumulative rotation number of a DC motor with accuracy. The pulsed output signal from at least one motor rotor rotation detector brush is processed by signal processing circuitry to regulate at least one of the rotational direction, the rotational speed, the cumulative rotation number, and the rotational position of the rotor.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5A is a diagram illustrating the waveform of an output signal from a rotation detecting brush, FIG. 5B is a diagram illustrating the waveform of an output signal from a noise removing circuit, and FIG. 5C is a diagram illustrating the waveform of an output signal from the comparator;

FIG. 12A is a diagram illustrating a waveform of an on/off control signal of a transistor Q1, FIG. 12B is a diagram illustrating a waveform of an on/off control signal of a transistor Q4, FIG. 12C is a diagram illustrating a waveform of a signal input to a non-inversion input terminal of the comparator, and FIG. 12D is a diagram illustrating a waveform of an output signal from the comparator;

FIG. 15 is a truth table for explaining motor rotation control operation of the rotation control apparatus of FIG. 14;

FIG. 17A is a diagram illustrating a waveform of an on/off control signal of the transistor Q1, FIG. 17B is a diagram illustrating a waveform of an on/off control signal of the transistor Q4, FIG. 17C is a diagram illustrating a waveform of a signal input to the non-inversion input terminal of the comparator, and FIG. 17D is a diagram illustrating a waveform of rotation signal pulses output from the comparator;

FIG. 19A is a diagram illustrating a waveform of an on/off control signal of the transistor Q1, FIG. 19B is a diagram illustrating a waveform of an on/off control signal of the transistor Q4, FIG. 19C is a diagram illustrating a waveform of a signal input to the non-inversion input terminal of the comparator, and FIG. 19D is a diagram illustrating a waveform of rotation signal pulses output from the comparator;

FIG. 20 is a circuit diagram illustrating a rotation control apparatus according to a seventh embodiment of the present invention;

FIG. 22A is a diagram illustrating a waveform of an on/off control signal of the transistor Q1, FIG. 22B is a diagram illustrating a waveform of an on/off control signal of the transistor Q4, FIG. 22C is a diagram illustrating a waveform of a signal input to the non-inversion input terminal of the comparator, and FIG. 22D is a diagram illustrating a waveform of rotation signal pulses output from the comparator;

FIGS. 24A and 24B are a flowchart illustrating main steps of the motor rotation control operation of the rotation control apparatus of FIG. 23;

FIG. 25A is a diagram illustrating a waveform of an on/off control signal of the transistor Q1, FIG. 25B is a diagram illustrating a waveform of an on/off control signal of the transistor Q4, FIG. 25C is a diagram illustrating a waveform of a signal input to the non-inversion input terminal of the comparator, and FIG. 25D is a diagram illustrating a waveform of rotation signal pulses output from the comparator;

FIGS. 26A through 26E are schematic views illustrating an example of a DC motor wherein a rotation detecting brush is arranged in a position inclined by 60° relative to an electrode brush, and conditions of a commutator rotating clockwise in order by 30°;

FIG. 27 is a waveform diagram of an output voltage generated from the rotation detecting brush;

DESCRIPTION OF THE PREFERRED EMBODIMENTS

Figure 1:
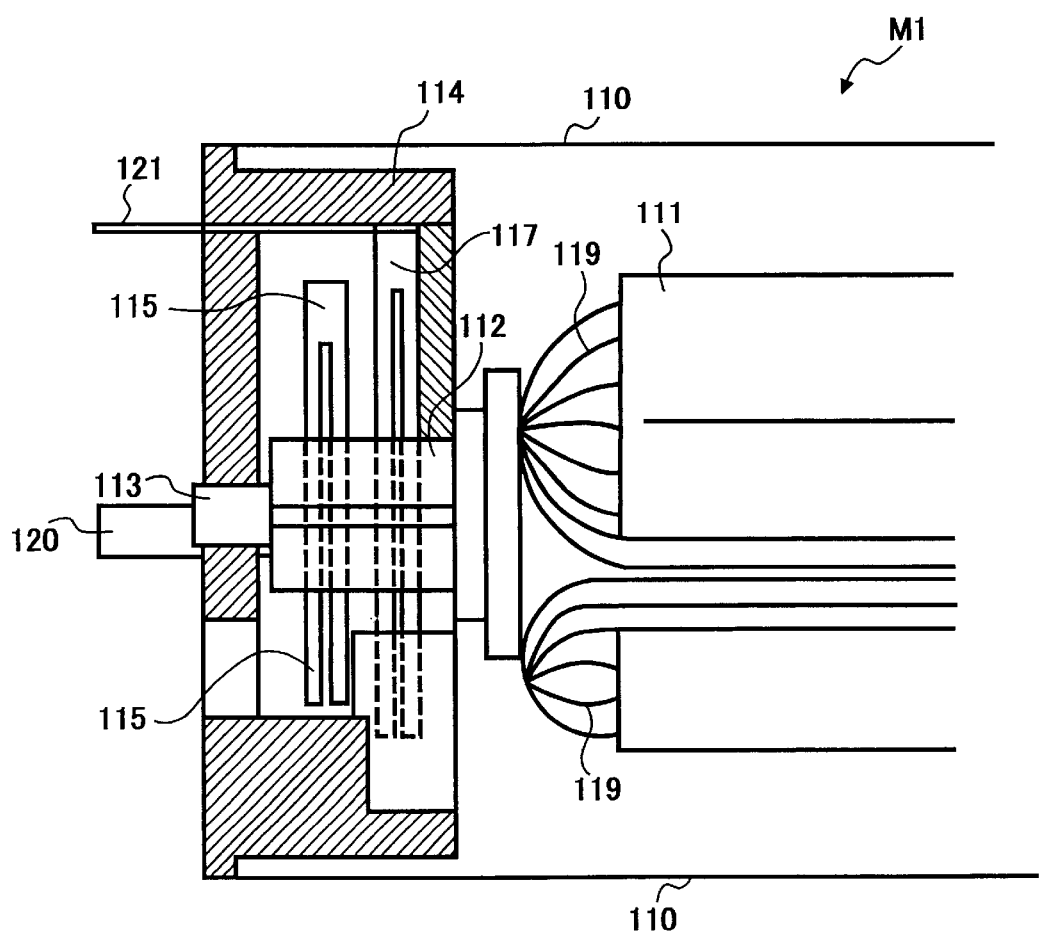
FIG. 1 is a schematic front view of a DC motor of the present invention illustrating a part of the DC motor shown in a longitudinal cross section.

Embodiments of the present invention are described in detail referring to the drawings, wherein like reference numerals designate identical or corresponding parts throughout the several views.

Other features of the invention will become apparent in the course of the following descriptions of exemplary embodiments, which are given for illustration of the invention and are not intended to be limiting thereof.

Figure 2:
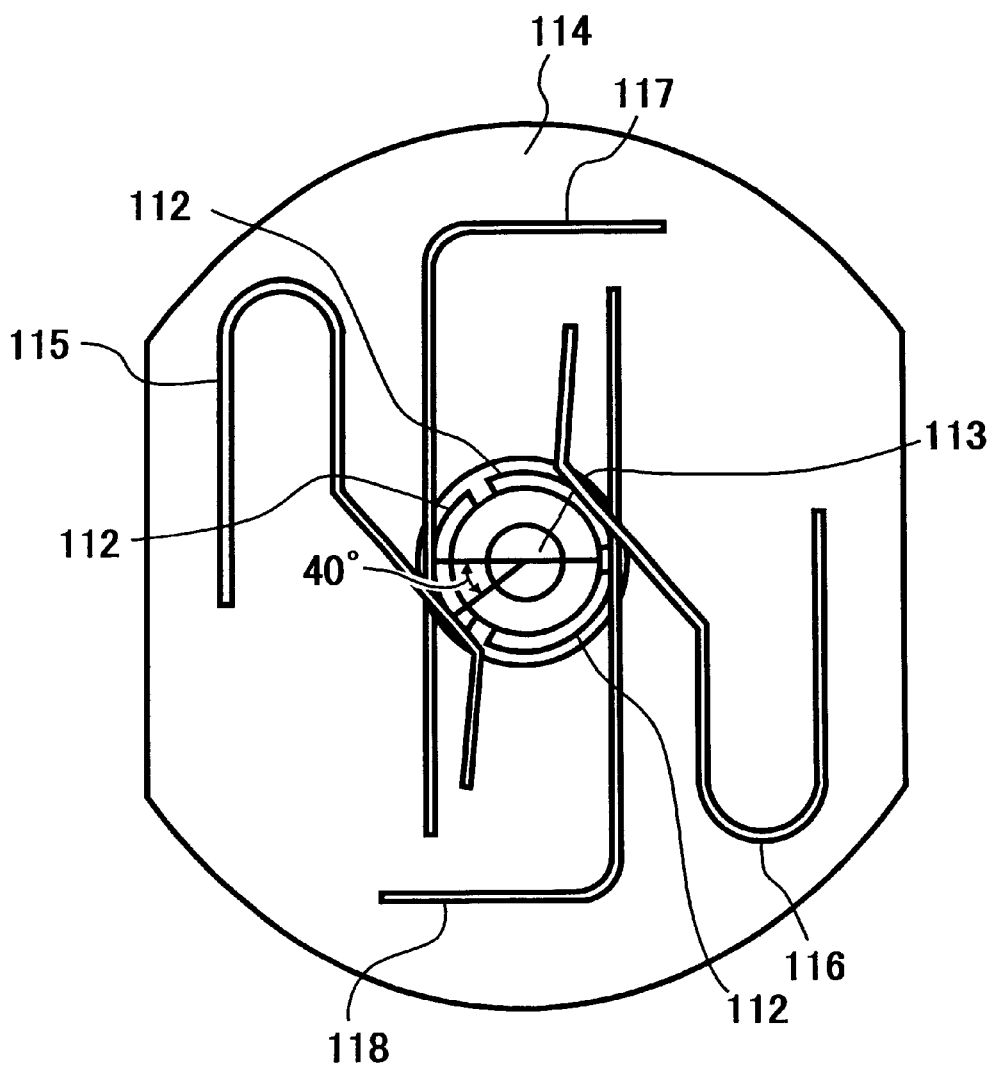
FIG. 2 is an internal cross-sectional view of the DC motor viewing from a left side opposed to a tip end of a rotation shaft of the DC motor.

FIGS. 1 and 2 illustrate a construction of a section in the vicinity of electrode brushes and rotation detecting brushes of a DC motor of the present invention. FIG. 1 is a schematic front view of the DC motor which illustrates a part of the DC motor shown in a longitudinal cross section, and FIG. 2 is a schematic internal cross-sectional view of the DC motor viewing from the left side opposed to a tip end of a rotation shaft. FIGS. 1 and 2 illustrate main elements of a DC motor M1 such as a stator 110, a rotor 111, a commutator 112, a rotation shaft 113, a support base 114, a pair of electrode brushes 115 and 116, a pair of rotation detecting brushes 117 and 118, and etc. (the stator 110 and the rotor 111 are not shown in FIG. 2). For sake of clarity, FIG. 1 illustrates only the electrode brush 115 and the rotation detecting brush 117 which are arranged by shifting the position in the thrust direction along an axis of the rotation shaft 113. Referring to FIG. 2, the rotation detecting brushes 117 and 118 are arranged on the rotational angle position of 40° relative to the electrode brushes 115 and 116, respectively.

The rotor 111 forms, for example, three magnetic poles with the structure including three sets of rotor coils 119 wound in the rotor 111. The rotor 111 is fixed on the rotation shaft 113. The commutator 112 includes segments made up of, for example, three conductive pieces which surround the circumference of the rotation shaft 113 at equally angled intervals with somewhat small gap. Each set of rotor coils 119 of the rotor 111 is connected to each other between the segments of the commutator 112 adjacent to each other. The rotation shaft 113 fixedly supports the rotor 111 on the intermediate portion of the rotation shaft 113, and fixedly supports the commutator 112 on the portion of the rotation shaft 113 close to one end of the rotor 111. The rotation shaft 113 is rotatably held by the support base 114, etc.

The support base 114 rotatably holds the rotation shaft 113 at a position in the vicinity of one end of the rotation shaft 113 at the side of the commutator 112 by a suitable bearing mechanism. The support base 114 is in the shape of short-sized cylinder which is hollow and has one end surface portion, and accommodates and supports almost all portions of the paired electrode brushes 115 and 116 and the paired rotation detecting brushes 117 and 118 in its hollow portion. In the state that the support base 114 holds the rotation shaft 113, the support base 114 accommodates almost all portions of the commutator 112 in its hollow portion.

The stator 110 accommodates the rotor 111, the commutator 112, the rotation shaft 113, and etc. Further, the stator 110 partially accommodates the support base 114. In such a way, the assembly as mentioned above constitutes a unit of the DC motor M1.

The paired electrode brushes 115 and 116 are made of a material in a state of plate which is conductive and resilient. As illustrated in FIG. 2, the electrode brushes 115 and 116 are respectively bent in U shape. One end of each electrode brush 115 and 116 is bent outward. The one end thereof is further bent back such that the tip end portion thereof becomes almost parallel with the non-bent portion. At each other tip end portion of electrode brushes 115 and 116, an extending portion that extends in a direction perpendicular to the end surface portion of the support base 114 is formed.

The electrode brushes 115 and 116 are formed in a rotative symmetrical state relative to the rotation shaft 113 which is almost in parallel with the extending portions. The support base 114 holds the electrode brushes 115 and 116 in the hollow portion such that the electrode brushes 115 and 116 are brought into sliding contact with the commutator 112 on the rotational angle position of 180° relative to the commutator 112.

The paired rotation detecting brushes 117 and 118 are made of a material in a state of plate which is conductive and resilient. As illustrated in FIG. 2, the rotation detecting brushes 117 and 118 are respectively bent in L shape. One portion of each rotation detecting brush 117 and 118 from the bent point is longer than the other portion therefrom. At each tip end portion of the other portions of the rotation detecting brushes 117 and 118, an extending portion that extends in a direction perpendicular to the end surface portion of the support base 114 is formed.

The rotation detecting brushes 117 and 118 are formed in a rotative symmetrical state relative to the rotation shaft 113 which is almost in parallel with the extending portions. The support base 114 holds the rotation detecting brushes 117 and 118 in the hollow portion such that the rotation detecting brushes 117 and 118 are brought into sliding contact with the commutator 112 on the rotational angle position of 180° relative to the commutator 112. In addition, the sliding contact position of each rotation detecting brush 117 and 118 is a position different from the sliding contact position of each electrode brush 115 and 116 at a predetermined positional interval in the thrust direction along the axis of the rotation shaft 113. The sliding contact positions of the rotation detecting brushes 117 and 118 are shifted by a predetermined rotational angle, for example, 40° relative to the sliding contact positions of the electrode brushes 115 and 116, respectively.

The support base 114 includes a through-hole on the center of the end plate portion thereof so as to pass the rotation shaft 113 into the through-hole and to rotatably hold the rotation shaft 113. A bearing portion is formed at the through-hole.

Respective tip ends of the extending portions at the other tip end portions of the electrode brushes 115 and 116, and respective tip ends of the extending portions at the tip end portions of the rotation detection brushes 117 and 118 protrude outward from the end surface portion of the support base 114 to serve as external terminals 120 and 121 for connection, respectively.

Although the pair of rotation detecting brushes 117 and 118 is provided in the DC motor M1, only one of the rotation detecting brushes 117 and 118 can be provided therein.

Figure 3:
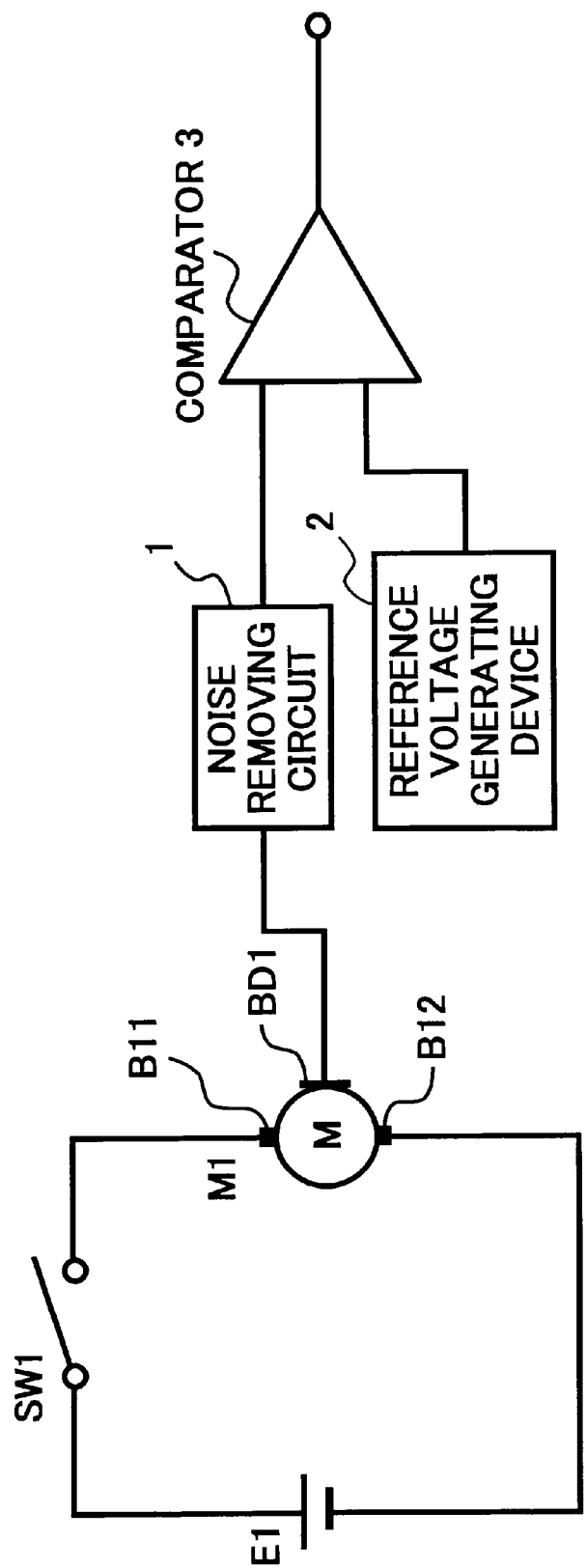
FIG. 3 is a circuit diagram illustrating a basic configuration of a rotation detecting apparatus of the present invention.

Next, a rotation detecting apparatus of the present invention that detects the rotational operation of a DC motor is described. FIG. 3 is a circuit diagram illustrating a basic configuration of a rotation detecting apparatus that detects the rotational operation of a DC motor. The DC motor M1 is driven by being applied with a drive voltage Eo from a drive power supply E1 through a switch SW1. The DC motor M1 includes one rotation detecting brush BD1 in addition to a pair of electrode brushes B11 and B12.

The rotation detecting apparatus includes a noise removing circuit 1, a reference voltage generating device 2, and a comparator 3. The noise removing circuit 1 removes noise components such as the waveform in a state of a sharp surge from the signal detected by the rotation detecting brush BD1 and applies the detecting signal voltage to the comparator 3.

The reference voltage generating device 2 generates a reference voltage for converting the detection signal generated by the rotation detecting brush BD1 into pulse train of pulse period and pulse width corresponding to the rotational speed of the DC motor M1, and then applies the reference voltage to the comparator 3.

The comparator 3 compares the voltage of the detection signal generated by the rotation detection brush BD1 from which the noise is removed by the noise removing circuit 1 with the reference voltage generated by the reference voltage generating device 2, and outputs a pulse train of pulse period and pulse width corresponding to the rotational speed of the DC motor M1.

Figure 4:
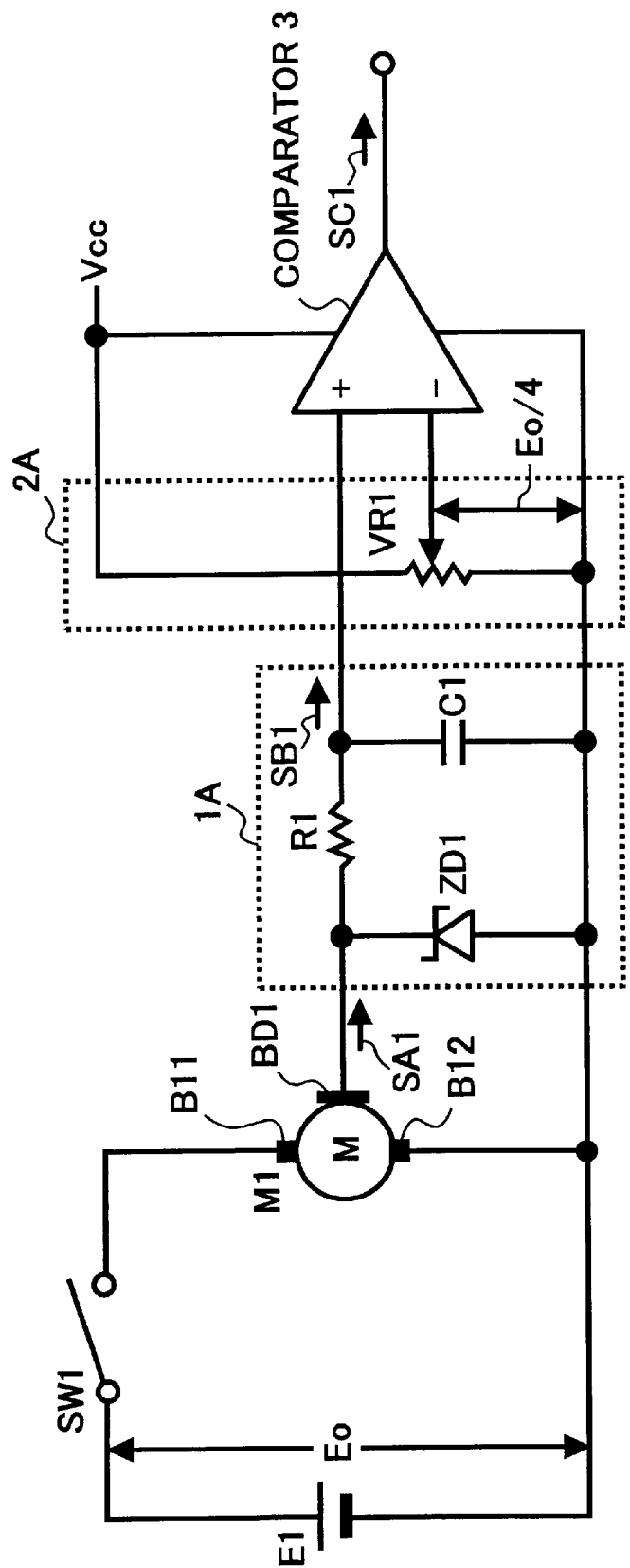
FIG. 4 is a circuit diagram illustrating a rotation detecting apparatus according to a first embodiment of the present invention.

FIG. 4 illustrates a rotation detecting apparatus that detects the rotational operation of a DC motor according to a first embodiment of the present invention. The rotation detecting apparatus of FIG. 4 has more specific configuration than the rotation detecting apparatus of FIG. 3. The rotation detecting apparatus of FIG. 4 includes a noise removing circuit 1A, a reference voltage generating device 2A, and the comparator 3.

The noise removing circuit 1A removes noise components such as the waveform in a state of a sharp surge from the signal detected by the rotation detecting brush BD1 and applies the detecting signal voltage to the comparator 3. The noise removing circuit 1A includes a constant-voltage diode ZD1, a resistor R1, and a capacitor C1.

The constant-voltage diode ZD1 (e.g., zener diode, etc.) is connected across the rotation detecting brush BD1 and the common low-voltage side of the drive power supply E1. The common low-voltage side of the drive power supply E1 may be referred to as a ground level.

The resistor R1 and the capacitor C1 are connected in series. One side of the resistor R1 is connected to the rotation detecting brush BD1, and the capacitor C1 is connected to the common low-voltage side of the drive power supply E1. The series circuit of the resistor R1 and the capacitor C1 is connected in parallel with the constant-voltage diode ZD1 across the rotation detecting brush BD1 and the common low-voltage side of the drive power supply E1.

A voltage between both terminals of the capacitor C1, that is, a voltage between a connection point of the capacitor C1 and the resistor R1 and the common low-voltage side of the drive power supply E1, is applied to a non-inversion input terminal (i.e., +side) of the comparator 3.

The reference voltage generating device 2A generates a reference voltage for converting the detection signal generated by the rotation detecting brush BD1 into pulse train of pulse period and pulse width corresponding to the rotational speed of the DC motor M1, and then applies the reference voltage to the comparator 3. The reference voltage generating device 2A includes a potentiometer VR1.

The both terminals at both fixed sides of the potentiometer VR1 are connected to a power supply voltage Vcc side and the common low-voltage side, respectively. A voltage between the movable terminal of the potentiometer VR1 and the common low-voltage side (e.g., a reference voltage almost equal to Eo/4) is applied to an inversion input terminal (i.e., −side) of the comparator 3.

In the comparator 3, the voltage of the detection signal generated by the rotation detecting brush BD1 from which the noise is removed by the noise removing circuit 1 is applied to the non-inversion input terminal (i.e., +side), and the reference voltage (Eo/4) generated by the reference voltage generating device 2 is applied to the inversion input terminal (i.e., −side). The comparator 3 compares the above-described voltage of the detection signal with the reference voltage (Eo/4).

When an output voltage from the noise removing circuit 1A exceeds the reference voltage (Eo/4), the comparator 3 outputs the power supply voltage Vcc (i.e., high level), and when the output voltage from the noise removing circuit 1A equals to the reference voltage (Eo/4) or smaller, the comparator 3 outputs the common low-voltage (i.e., low level). The comparator 3 outputs a pulse train of pulse period and pulse width corresponding to the rotational speed of the DC motor M1.

Next, the operation of the rotation detecting apparatus of FIG. 4 is described referring to FIGS. 5A through 5C. FIG. 5A is a diagram illustrating the waveform of an output signal SA1 from the rotation detecting brush BD1 at the time of high and low speed rotations of the DC motor M1, FIG. 5B is a diagram illustrating the waveform of an output signal SB1 from the noise removing circuit 1 at the time of high and low speed rotations of the DC motor M1, and FIG. 5C is a diagram illustrating the waveform of an output signal SC1 from the comparator 3 at the time of high and low speed rotations of the DC motor M1.

The DC motor M1 and the switch SW1 are connected to the drive power supply E1 of drive voltage Eo in series. The rotation detecting brush BD1 of the DC motor M1 is connected to the noise removing circuit 1A. As described above, in the noise removing circuit 1A, the series circuit of the resistor R1 and the capacitor C1 is connected in parallel with the constant-voltage diode ZD1. The constant-voltage diode ZD1 clamps the voltage of the counter electromotive force induced by the action of self-induction of the rotor windings of the DC motor M1, i.e., the rotor coils.

The resistor R1 and the capacitor C1 construct a lowpass filter for taking out an output voltage from a connection point of the resistor R1 and the capacitor C1 and removing high frequency components. The output voltage taken out from the connection point of the resistor R1 and the capacitor C1 is applied to the non-inversion input terminal (i.e., +side) of the comparator 3.

When the switch SW1 is closed, the drive voltage Eo is applied to the DC motor M1 from the drive power supply E1. Thereby, the rotor coils are magnetically exited through the electrode brushes B11 and B12, and the rotor rotates relative to the stator having magnetic poles formed by permanent magnets, etc. of itself. By the rotation of the DC motor M1, the voltage signal SA1 almost in the state of pulse is generated onto the rotation detecting brush BD1.

Regarding the sharp surge-state waveform of the leading edge portion of each pulse in the pulse train of the voltage signal SA1 (illustrated in FIG. 5A) output from the rotation detecting brush BD1, because the magnitude of the current flowing through the rotor coils connected to respective conductive pieces of the commutator instantaneously varies when the conductive pieces of the commutator in contact with the rotation detecting brush BD1 are changed over, the above-described variation of the current is caused by the voltage generated by the action of the self-induction of the rotor coils. The peak value and width of the surge voltage waveform vary in accordance with the magnitude of the voltage thus induced varies in accordance with magnitude of the current flowing through the rotor coils corresponding to the rotational speed of the DC motor M1.

The inclined portion of each pulse is composed of (superposing) the voltage generated by current flowing through the rotor coils and by DC resistance components of the rotor coils and the induction voltage induced by the action of the rotor coils' rotation in the magnetic field. The latter induction voltage turns out to be dominant at the time of the high speed rotation of the DC motor M1, and the former voltage generated by the current flowing through the rotor coils and by the DC resistance components of the rotor coils turns out to be dominant at the time of the low speed rotation of the DC motor M1. Therefore, as illustrated in FIGS. 5A and 5B, the lower the speed of rotation becomes, the smaller the inclination angle of each pulse becomes.

In the waveform of the output signal SB1 from the noise removing circuit 1A illustrated in FIG. 5B, the above-described surge waveform and high-frequency noise such as mechanical noise, etc., caused by the contact of the rotation detecting brush BD1 with the commutator are removed. The comparator 3 compares a voltage of the output signal SB1 from the noise removing circuit 1A with the reference voltage (e.g., about Eo/4) taken out from the potentiometer VR1.

Referring to FIG. 5C, the output signal SC1 from the comparator 3 is alternately only one of two sorts of voltage, that is, the power supply voltage Vcc (high level) and the common low-voltage (low level). Consequently, a stable rectangular waveform can be obtained.

The noise removing circuit 1A may be suitably constructed according to properties of the used DC motor, electric power consumed by the DC motor, and voltage of a signal processing circuit system, etc. Further, the noise removing circuit 1A is not always an indispensable structure. Depending on the properties of the used DC motor, the electric power consumed by the DC motor, and the voltage of the signal processing circuit system, etc., the noise removing circuit 1A may be omitted.

Figure 6:
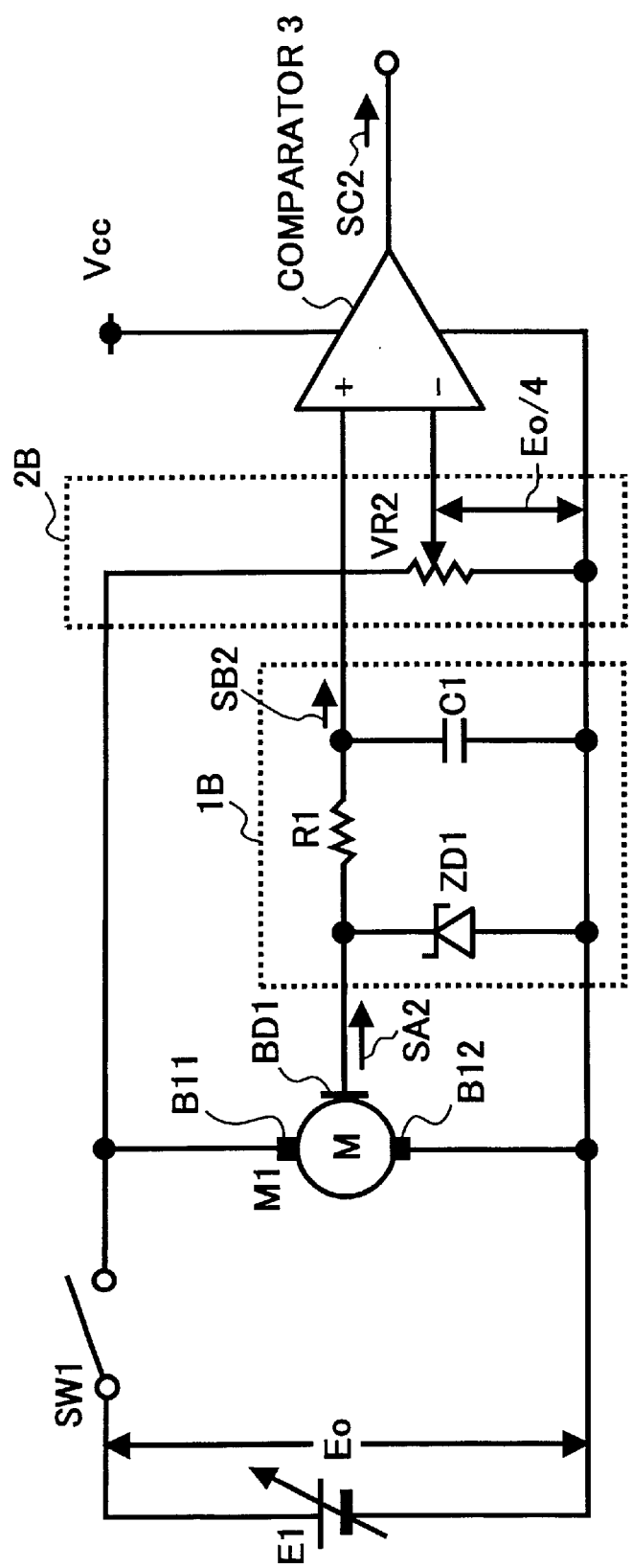
FIG. 6 is a circuit diagram illustrating a rotation detecting apparatus according to a second embodiment of the present invention.

Next, referring to FIG. 6, a rotation detecting apparatus that detects the rotational operation of a DC motor according to a second embodiment of the present invention is described.

Similarly, as in the rotation detecting apparatuses of FIGS. 3 and 4, the rotation detecting apparatus illustrated in FIG. 6 detects the rotational operation of the DC motor M1 that is driven by being applied with the drive voltage E0 from the drive power supply E1 through the switch SW1. The DC motor M1 includes one rotation detecting brush BD1 in addition to the pair of electrode brushes B11 and B12. The rotation detecting apparatus of FIG. 6 includes a noise removing circuit 1B, a reference voltage generating device 2B, and the comparator 3.

Similarly, as in the noise removing circuit 1A of FIG. 4, the noise removing circuit 1B includes the constant-voltage diode ZD1, the resistor R1, and the capacitor C1. The noise removing circuit 1B removes noise components such as the waveform in a state of a sharp surge from the signal detected by the rotation detecting brush BD1 and applies the detecting signal voltage to the comparator 3.

The constant-voltage diode ZD1 (e.g., zener diode, etc.) is connected across the rotation detecting brush BD1 and the common low-voltage side of the drive power supply E1.

The resistor R1 and the capacitor C1 are connected in series. One side of the resistor R1 is connected to the rotation detecting brush BD1, and the capacitor C1 is connected to the common low-voltage side of the drive power supply E1. The series circuit of the resistor R1 and the capacitor C1 is connected in parallel with the constant-voltage diode ZD1 across the rotation detecting brush BD1 and the common low-voltage side of the drive power supply E1.

A voltage between both terminals of the capacitor C1, that is, a voltage between a connection point of the capacitor C1 and the resistor R1 and the common low-voltage side of the drive power supply E1, is applied to a non-inversion input terminal (i.e., +side) of the comparator 3.

The reference voltage generating device 2B generates a reference voltage for converting the detection signal generated by the rotation detecting brush BD1 into pulse train of pulse period and pulse width corresponding to the rotational speed of the DC motor M1, and then applies the reference voltage to the comparator 3. The reference voltage generating device 2B includes a potentiometer VR2 similarly as the reference voltage generating device 2A of FIG. 4. The both terminals at both fixed sides of the potentiometer VR2 are connected between the electrode brushes B11 and B12 of the DC motor M1. A voltage between the movable terminal of the potentiometer VR2 and the common low-voltage side (e.g., a reference voltage almost equal to Eo/4) is applied to an inversion input terminal (i.e., –side) of the comparator 3.

The comparator 3 of FIG. 6 has substantially the same construction as the ones of FIGS. 3 and 4. In the comparator 3, the voltage of the detection signal generated by the rotation detecting brush BD1 from which the noise is removed by the noise removing circuit 1B is applied to the non-inversion input terminal (i.e., +side), and the reference voltage (Eo/4) generated by the reference voltage generating device 2B is applied to the inversion input terminal (i.e., –side). The comparator 3 compares the above-described voltage of the detection signal with the reference voltage (Eo/4).

When an output voltage from the noise removing circuit 1B exceeds the reference voltage (Eo/4), the comparator 3 outputs a power supply voltage Vcc (i.e., high level), and when the output voltage from the noise removing circuit 1B equals to the reference voltage (Eo/4) or smaller, the comparator 3 outputs a common low-voltage (i.e., low level). The comparator 3 outputs a pulse train of pulse period and pulse width corresponding to the rotational speed of the DC motor M1.

Figure 7A:
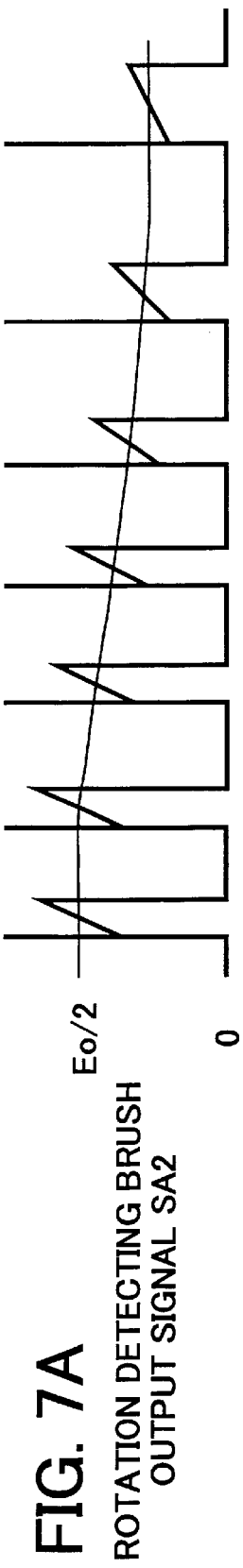
FIG. 7A is a diagram illustrating the waveform of an output signal from the rotation detecting brush.
Figure 7B:
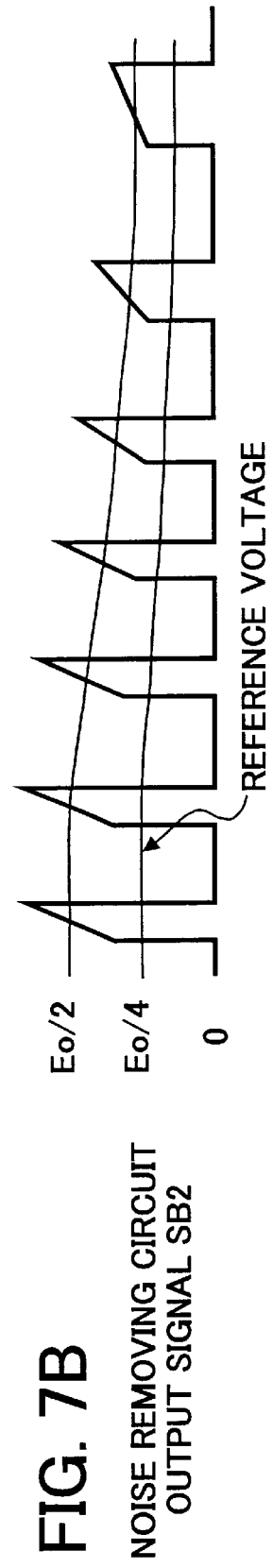
FIG. 7B is a diagram illustrating the waveform of an output signal from the noise removing circuit.
Figure 7C:
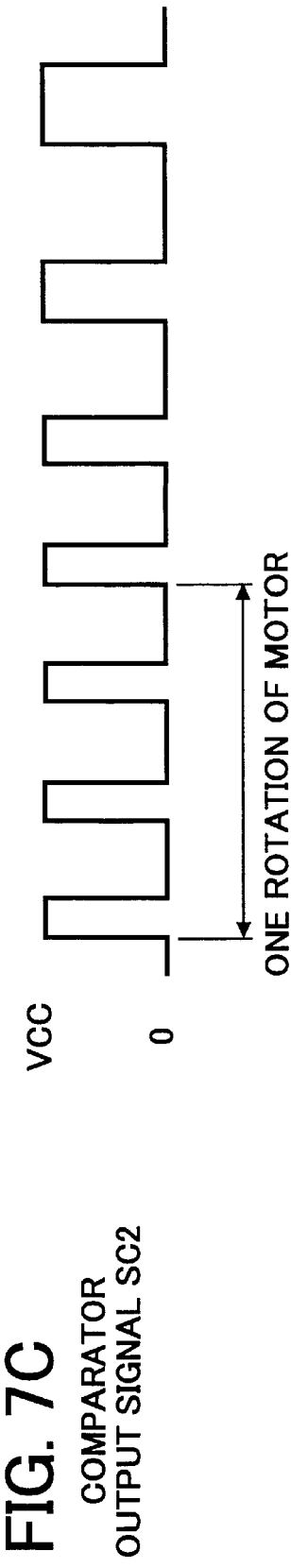
FIG. 7C is a diagram illustrating the waveform of an output signal from the comparator.

Next, the operation of the rotation detecting apparatus of FIG. 6 is described referring to FIGS. 7A through 7C. FIG. 7A is a diagram illustrating the waveform of an output signal SA2 from the rotation detecting brush BD1 when the drive voltage Eo for driving the DC motor M1 gradually drops. FIG. 7B is a diagram illustrating the waveform of an output signal SB2 from the noise removing circuit 1B when the drive voltage Eo for driving the DC motor M1 gradually drops. FIG. 7C is a diagram illustrating the waveform of an output signal SC2 from the comparator 3 when the drive voltage Eo for driving the DC motor M1 gradually drops.

The point of difference between each construction of the rotation detecting apparatuses of FIGS. 4 and 6 is that the power supply for the reference voltage generating device 2B is made the same as the drive power supply for the DC motor M1 in FIG. 6.

As illustrated in FIGS. 7A and 7B, when the drive voltage Eo for driving the DC motor M1 gradually drops, the voltage of the output signal SA2 of the rotation detecting brush BD1 and the voltage of the output signal SB2 of the noise removing circuit 1B gradually drop corresponding to the changes of the drive voltage Eo. In this case, if the load torque imposed on the DC motor M1 is constant, the rotational speed of the DC motor M1 becomes gradually low.

However, because the output voltage of the potentiometer VR2 as the reference voltage has dropped in proportion to the drive voltage Eo, the relative magnitude relation (i.e., the ratio) between the inversion input and non-inversion input of the comparator 3 is kept almost constant. Therefore, a stable rectangular waveform can be obtained irrespective of variation of the voltage Eo applied across both terminals of the DC motor M1 as the waveform of the output signal SC2 from the comparator 3.

In an apparatus using a DC motor, the rotational speed of the DC motor is often controlled by changing the voltage applied to the DC motor, i.e., by controlling the torque generated by the DC motor. In an apparatus using a battery as a power source, the voltage applied across both terminals of the DC motor varies frequently. In the rotation detecting apparatus of FIG. 6 according to the second embodiment of the present invention, even when the voltage applied across both terminals of the DC motor varies, stable rotation detecting signals can be obtained.

Figure 8:
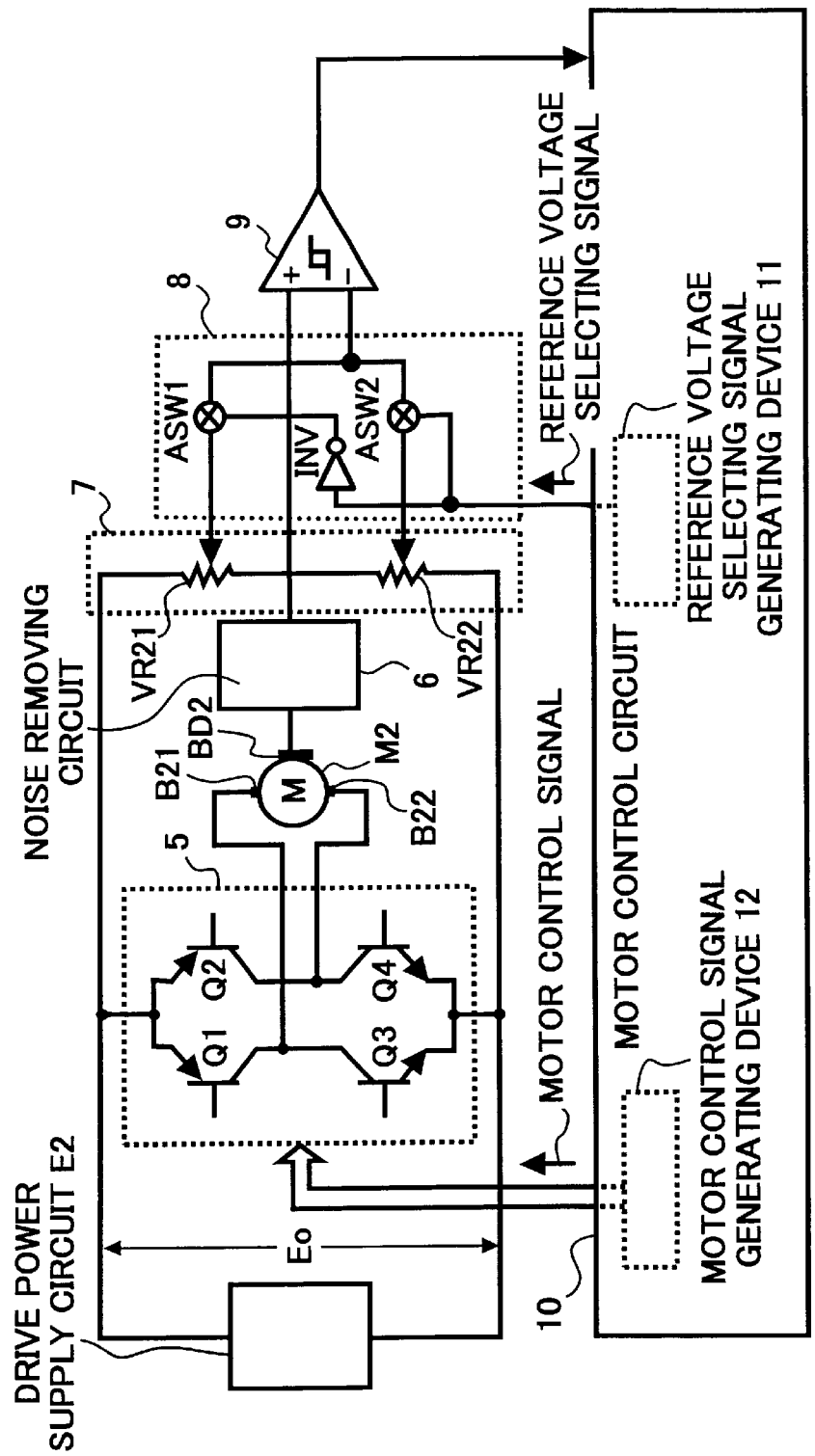
FIG. 8 is a circuit diagram illustrating a rotation control apparatus according to a third embodiment of the present invention.

FIG. 8 illustrates a construction of a rotation control apparatus that controls the rotational operation of a DC motor according to a third embodiment of the present invention. The rotation control apparatus of FIG. 8 includes a motor driving circuit 5, a noise removing circuit 6, a reference voltage generating device 7, a reference voltage selecting device 8, a comparator 9, and a motor control circuit 10 in addition to a DC motor M2 and a drive power supply circuit E2.

The rotation control apparatus of FIG. 8 controls the rotational operation of the DC motor M2 that is driven by being supplied with a drive electric power from the drive power supply circuit E2 through the motor driving circuit 5. The DC motor M2 includes one rotation detecting brush BD2 in addition to a pair of electrode brushes B21 and B22.

The motor driving circuit 5 including a switching section constructing a bridge circuit composed of four transistors Q1, Q2, Q3, and Q4 is connected to the positive and negative output terminals of the drive power supply circuit E2 constructed with the DC power supply of voltage Eo.

The electrode brush B21 of the DC motor M2 is connected to one of the output terminals of the motor driving circuit 5, i.e., a connection point of a collector of the transistor Q1 and a collector of the transistor Q3. The other electrode brush B22 of the DC motor M2 is connected to the other output terminal of the motor driving circuit 5, i.e., a connection point of a collector of the transistor Q2 and a collector of the transistor Q4.

Four control input terminals of the motor driving circuit 5 are connected to the motor control circuit 10. Turning on/off the transistors Q1 through Q4, forward/reverse rotations of the DC motor M2, and the rotation stop of the DC motor M2 are controlled in accordance with motor control signals generated by a motor control signal generating device 12 of the motor control circuit 10.

The output signal generated from the rotation detecting brush BD2 of the DC motor M2 is input to the noise removing circuit 6, and the voltage of the output signal generated from the noise removing circuit 6 is applied to a non-inversion input terminal (i.e., +side) of the comparator 9.

The reference voltage generating device 7 includes potentiometers VR21 and VR22 in series. The series circuit of the potentiometers VR21 and VR22 is connected to the drive power supply circuit E2 in parallel with the motor driving circuit 5.

Specifically, the output terminals of respective potentiometers VR21 and VR22 respectively generate different voltages both proportional to the power supply voltage Eo. For example, the output terminal of the potentiometer VR21 takes out the voltage almost equal to 3Eo/4 between the movable terminal of the potentiometer VR21 and the common low-voltage side, and the output terminal of the potentiometer VR22 takes out the voltage almost equal to Eo/4 between the movable terminal of the potentiometer VR22 and the common low-voltage side.

The reference voltage selecting device 8 includes two analog switches ASW1 and ASW2 and one inverter INV. The output voltage taken out from the movable terminal of the potentiometer VR21 is applied to the input terminal of the analog switch ASW1, and the output voltage taken out from the movable terminal of the potentiometer VR22 is applied to the input terminal of the analog switch ASW2. Respective output terminals of the analog switches ASW1 and ASW2 are connected to the inversion input terminal (i.e., −side) of the comparator 9.

A reference voltage selecting signal as a control signal generated from a reference voltage selecting signal generating device 11 of the motor control circuit 10 is inverted by the inverter INV and is applied to a control terminal of the analog switch ASW1. Further, the reference voltage selecting signal is directly applied to a control terminal of the analog switch ASW2.

Specifically, the analog switches ASW1 and ASW2 are controlled such that one of the switches ASW1 and ASW2 is turned on and the other is turned off by the reference voltage selecting signal generated from the reference voltage selecting signal generating device 11. Then, only one of the output voltages of the potentiometers VR21 and VR22 is applied to the inversion input terminal of the comparator 9. The voltage of output signal from the comparator 9 is applied to the motor control circuit 10.

The motor control circuit 10 includes a microcomputer (not shown), the reference voltage selecting signal generating device 11, the motor control signal generating device 12, and etc. The motor control circuit 10 receives the output signal from the comparator 9, and, if necessary, a control command signal from an external device (not shown). The motor control signal generating device 12 generates the motor control signal to be applied to the motor driving circuit 5, and the reference voltage selecting signal generating device 11 generates the reference voltage selecting signal to be applied to the reference voltage selecting device 8.

The analog switches ASW1 and ASW2 are respectively turned on or turned off, in accordance with the signal state of the respective control terminals; High "H" or Low "L". In one of the both analog switches, when the state of the analog switch is "ON", the voltage applied to the input terminal is directly output to the output terminal. On the contrary, when the state of the analog switch is "OFF", the voltage applied to the input terminal is not output to the output terminal.

Specifically, for example, when the control terminal is "H", the state of the analog switch becomes "ON". In such a state, the input signal directly passes through the analog switch. When the control terminal is "L", the analog switch is turned off, and put in the high-impedance state.

Specifically, for example, when the control terminal is in the state of "High", the analog switches ASW1 and ASW2 are put in on-state and the input signals pass therethrough. When the control terminal is in the state of "Low", the analog switches ASW1 and ASW2 are put in off-state and in the high-impedance state.

Figure 9:
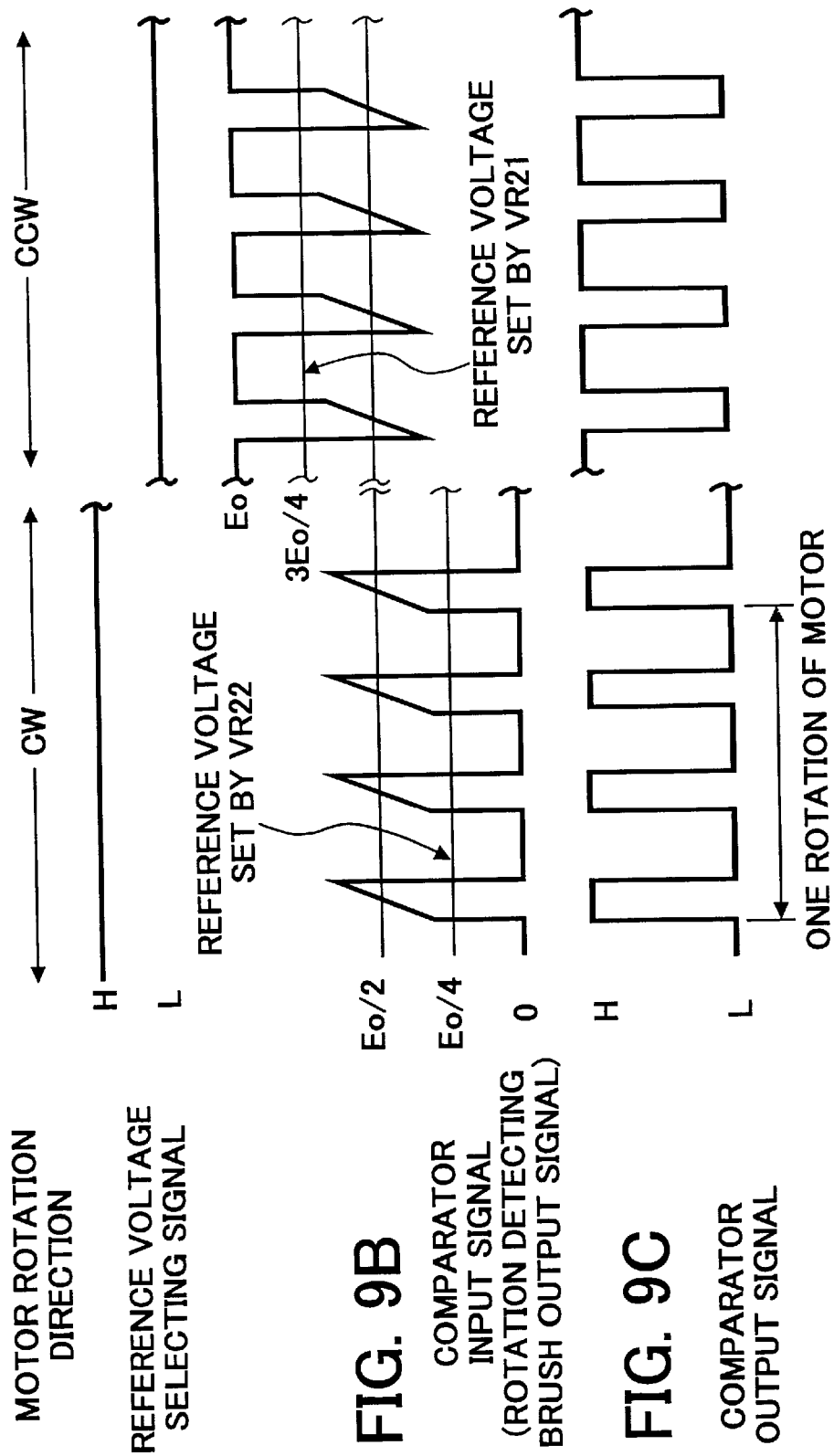
FIG. 9A is a diagram illustrating the waveform of a reference voltage selecting signal generated by a reference voltage selecting signal generating device.
FIG. 9B is a diagram illustrating the waveform of an input signal to an inversion input terminal of the comparator.
FIG. 9C is a diagram illustrating the waveform of an output signal from the comparator.

Next, the operation of the rotation control apparatus of FIG. 8 is described referring to FIGS. 9A through 9C.

FIG. 9A is a diagram illustrating the waveform of a reference voltage selecting signal generated by the reference voltage selecting signal generating device 11 when the DC motor M2 rotates in the clockwise (CW) and counterclockwise (CCW) directions, FIG. 9B is a diagram illustrating the waveform of an input signal to the inversion input terminal of the comparator 9 when the DC motor M2 rotates in the clockwise (CW) and counter-clockwise (CCW) directions, and FIG. 9C is a diagram illustrating the waveform of an output signal from the comparator 9 when the DC motor M2 rotates in the clockwise (CW) and counter-clockwise (CCW) directions.

When the motor control signal is output from the motor control signal generating device 12, and the transistors Q1 and Q4 of the motor driving circuit 5 are turned on, the DC motor M2 rotates in the clockwise direction. Almost simultaneously, the reference voltage selecting signal "H" is output from the reference voltage selecting signal generating device 11 (FIG. 9A). Then, the voltage of the rotation detecting signal generated by the rotation detecting brush BD2 of the DC motor M2 is applied to the non-inversion input terminal of the comparator 9 through the noise removing circuit 6.

On the other hand, the reference voltage is applied to the inversion input terminal of the comparator 9. In such a state, because the reference voltage selecting signal is "H", and the analog switch ASW1 is turned off and the analog switch ASW2 is turned on, the voltage Eo/4 set by the potentiometer VR22 is selected as the reference voltage (FIG. 9B). As a result, a rectangular waveform of the output signal from the comparator 9 is obtained as illustrated in FIG. 9C.

When the motor control signal is output from the motor control signal generating device 12, and the transistors Q2 and Q3 of the motor driving circuit 5 are turned on, the DC motor M2 rotates in the counter-clockwise direction. Almost simultaneously, the reference voltage selecting signal "L" is output from the reference voltage selecting signal generating device 11 (FIG. 9A). Then, the voltage of the rotation detecting signal generated by the rotation detecting brush BD2 of the DC motor M2 is applied to the non-inversion input terminal of the comparator 9 through the noise removing circuit 6.

On the other hand, the reference voltage is input to the inversion input terminal of the comparator 9. In such a state, because the reference voltage selecting signal is "L", and the analog switch ASW1 is turned on and the analog switch ASW2 is turned off, the voltage 3Eo/4 set by the potentiometer VR21 is selected as the reference voltage (FIG. 9B). As a result, a rectangular waveform of the output signal from the comparator 9 is obtained as illustrated in FIG. 9C.

In such a way, the pulse train as the rotation signal of the DC motor M2 is obtained from the output terminal of the comparator 9. For example, when the angle between the rotation detecting brush BD2 and the electrode brush B22 is 40°, the duty of the pulse becomes ⅓ at the time of the clockwise rotation of the DC motor M2, while the duty of the pulse becomes ⅔ at the time of the counter-clockwise rotation thereof.

With the above-described construction of the rotation control apparatus, stable rotation signals can be obtained in bi-directional rotations of the DC motor M2. As a result, the rotational speed of the DC motor M2 can be properly controlled.

Figure 10:
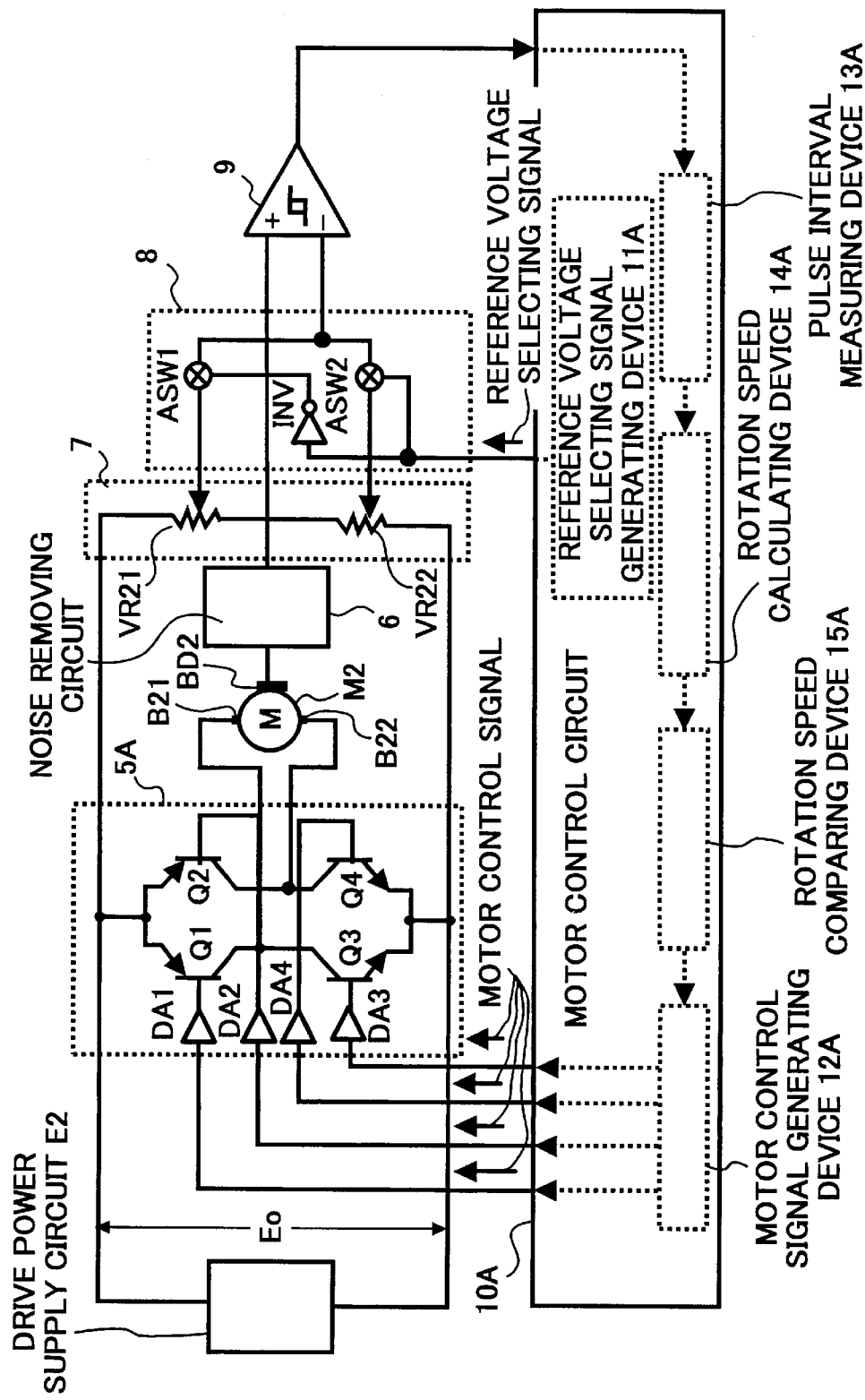
FIG. 10 is a circuit diagram illustrating a rotation control apparatus according to a fourth embodiment of the present invention.

FIG. 10 illustrates a construction of a rotation control apparatus that controls the rotational operation of the DC motor according to a fourth embodiment of the present invention. The rotation control apparatus of FIG. 10 has a construction similar to the rotation control apparatus of FIG. 8 employing a motor driving circuit 5A instead of the motor driving circuit 5, and a motor control circuit 10A instead of the motor control circuit 10.

The motor control circuit 10A includes a microcomputer (not shown), a reference voltage selecting signal generating device 11A, a motor control signal generating device 12A, a pulse interval measuring device 13A, a rotational speed calculating device 14A, a rotational speed comparing device 15A, etc.

Figure 13A:
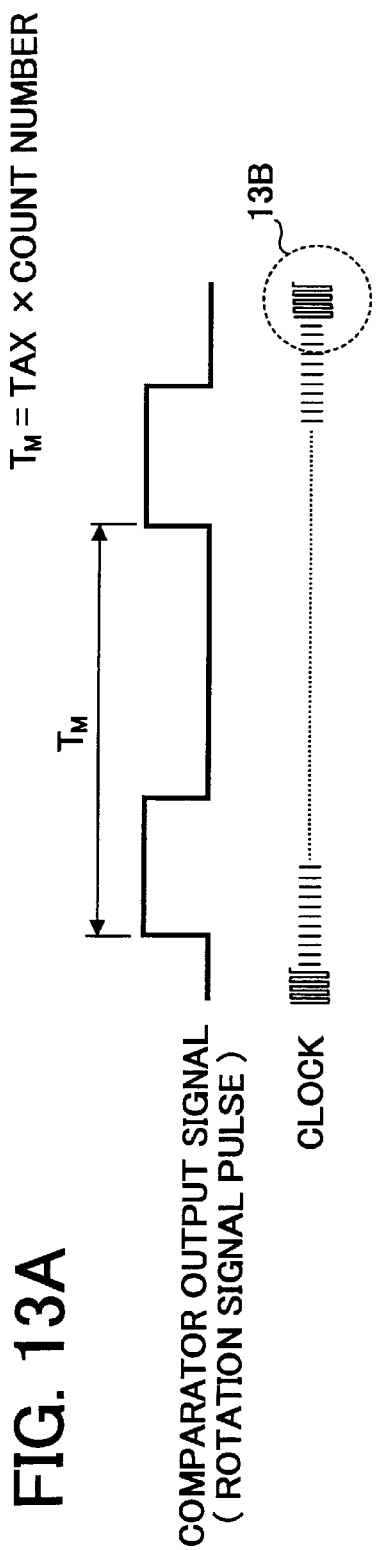
FIG. 13A is a waveform diagram for explaining a measurement of pulse interval.
Figure 13B:
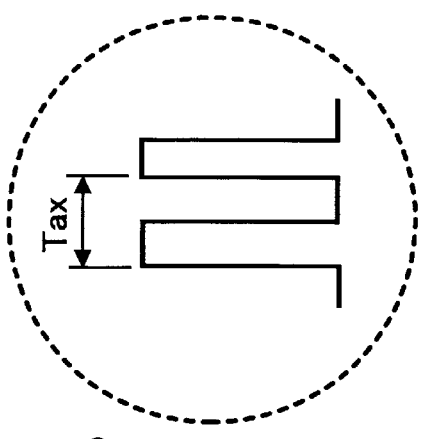
FIG. 13B is an enlarged view of one period of clock.

The pulse interval measuring device 13A measures a pulse interval $T_M$. The method of measuring the pulse interval $T_M$ by use of the pulse interval measuring device 13A is to count the clock having sufficiently higher frequency than that of the rotation signal pulse of the DC motor M2 output from the comparator 9 as illustrated in FIG. 13A by one period of the rotation signal pulse. In FIG. 13B, "Tax" represents one period of the clock. The pulse interval $T_M$ signifies "Tax X count number".

The rotational speed calculating device 14A calculates the rotational speed of the DC motor M2 based on the pulse interval $T_M$ obtained by the pulse interval measuring device 13A. When the period of the rotation signal pulse obtained by the pulse interval measuring device 13A, that is, the pulse interval, is $T_M$ seconds, the rotational speed of the DC motor M2 is calculated by the rotational speed calculating device 14A. The calculated value is $60/3T_M$ r.p.m. in the case of the three-pole motor. The clock is generated by a clock oscillator (not shown) contained in the microcomputer (not shown), etc. of the motor control circuit 10A.

The rotational speed comparing device 15A compares a present rotational speed N1 calculated by the rotational speed calculating device 14A with a target speed N2, and causes the motor control signal generating device 12A to generate a motor control signal so as to obtain the target speed N2.

The motor driving circuit 5A is constructed such that the transistors Q1, Q2, Q3, and Q4 are respectively turned on/off by drivers DA1, DA2, DA3, and DA4 which react to the motor control signal generated by the motor control signal generating device 12A of the motor control circuit 10A.

Figure 11:
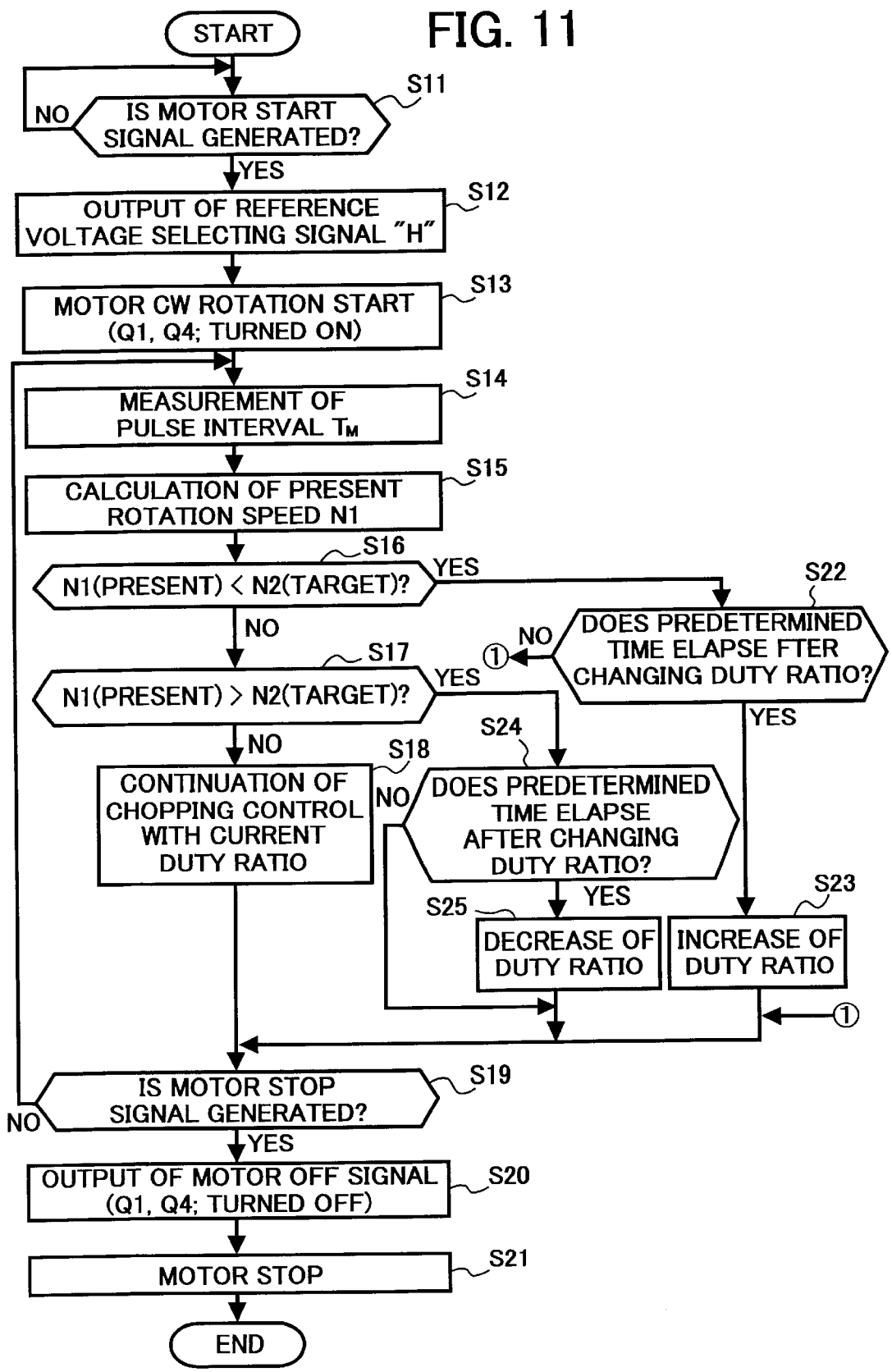
FIG. 11 is a flowchart illustrating main steps of the motor rotation control operation of the rotation control apparatus of FIG. 10.

Next, the operation of the rotation control apparatus of FIG. 10 is described referring to FIG. 11 and FIGS. 12A through 12D. FIG. 11 is a flowchart illustrating main steps of the operation of controlling the rotational speed of the DC motor M2. FIG. 12A is a diagram illustrating a waveform of an on/off control signal of the transistor Q1, FIG. 12B is a diagram illustrating a waveform of an on/off control signal of the transistor Q4, FIG. 12C is a diagram illustrating a waveform of a signal input to the non-inversion input terminal of the comparator 9 (i.e., an output signal of the rotation detecting brush BD2), and FIG. 12D is a diagram illustrating a waveform of an output signal from the comparator 9.

Respective signals illustrated in FIGS. 12A through 12D are generated in the state that the DC motor M2 is rotated by performing a chopping control and the rotational speed of the DC motor M2 is controlled to be constant until a motor stop signal is generated. When the DC motor M2 is rotated, rotation signal pulses of the DC motor M2 appear from the output terminal of the comparator 9 corresponding to the rotation of the DC motor M2.

In the rotation control apparatus according to the fourth embodiment of the present invention, the motor control circuit 10A performs the so-called chopping control of repeating the momentary turning-off of the electricity supplying to the DC motor M2, and the rotational speed of the DC motor M2 is controlled by changing the duty ratio of the chopping control.

Specifically, the rotational speed of the DC motor M2 is calculated based on the rotation signal generated by the rotation detecting brush BD2. When the rotational speed of the DC motor M2 is higher than a predetermined target rotational speed, the duty ratio (i.e., the ratio of ON time per one pulse period) is reduced, and thereby the rotational speed of the DC motor M2 is lowered. When the rotational speed of the DC motor M2 is lower than the target rotational speed, the duty ratio is increased, and thereby the rotational speed of the DC motor M2 is made higher to the target rotational speed.

Hereinafter, main steps of the operation of controlling the rotational speed of the DC motor (hereinafter simply referred to as a motor rotation control operation) are described referring to FIG. 11. In step S11, the motor control circuit 10A judges if a motor start signal is generated from an external device (not shown) or not. If the answer is YES in step S11, the reference voltage selecting signal generating device 11A outputs the reference voltage selecting signal "H" in step S12. If the answer is NO in step S11, the motor rotation control operation returns to reexecute step S11. At almost the same timing of the output of the reference voltage selecting signal "H", the transistors Q1 and Q4 of the motor driving circuit 5A are turned on, and the voltage almost equal to the power supply voltage Eo is applied to the electrode brushes B21 and B22 of the DC motor M2. Thereby, the DC motor M2 starts rotating in the clockwise direction in step S13.

Further, the pulse interval measuring device 13A measures the pulse interval $T_M$ based on the rotation signal pulses output from the comparator 9 in step S14. Based on the measurement result of the pulse interval $T_M$, the rotational speed calculating device 14A calculates a present rotational speed N1 of the DC motor M2 in step S15.

Then, the rotational speed comparing device 15A compares the present rotational speed N1 calculated by the rotational speed calculating device 14A with a target rotational speed N2, and judges if the present rotational speed N1 is lower than the target rotational speed N2 in step S16. The target rotational speed N2 may not be a specified rotational speed value but may fall within a specified rotational speed range. If the answer is NO in step S16, the rotational speed comparing device 15A judges if the present rotational speed N1 exceeds the target rotational speed N2 in step S17.

If the answer is NO in step S17, the present rotational speed N1 equals to the target rotational speed N2. Therefore, the motor control circuit 10A continues the chopping control of the DC motor M2 with the current duty ratio in step S18.

Then, the motor control circuit 10A judges if a motor stop signal is generated from an external device (not shown) or not in step S19. If the answer is YES in step S19, the motor control signal generating device 12A outputs motor off signals, and the transistors Q1 and Q4 are turned off in step S20. Then, the DC motor M2 stops rotating in step S21. If the answer is NO in step S19, the motor rotation control operation returns to reexecute step S14.

If the answer is YES in step S16, the motor control circuit 10A judges if a predetermined time elapses after the immediately-before duty ratio is changed in step S22. If the answer is YES in step S22 or if the duty ratio is not changed before at all, the motor control circuit 10A increases the duty ratio of the chopping control in step S23, and then the motor rotation control operation proceeds to step S19. If the answer is NO in step S22, the motor rotation control operation proceeds to step S19 without changing the duty ratio of the chopping control.

If the answer is YES in step S17, the motor control circuit 10A judges if a predetermined time elapses after the immediately-before duty ratio is changed in step S24. If the answer is YES in step S24 or if the duty ratio is not changed before at all, the motor control circuit 10A decreases the duty ratio of the chopping control in step S25, and then the motor rotation control operation proceeds to step S19. If the answer is NO in step S24, the motor rotation control operation proceeds to step S19 without changing the duty ratio of the chopping control.

In the above-described motor rotation control operation, unless the predetermined time elapses after changing the duty ratio, the duty ratio is not changed. Because, it is considered that even though the duty ratio is changed, the rotational speed of the DC motor M2 does not immediately vary, and the response of the DC motor M2 is delayed. In such a situation, the predetermined number of the pulse periods of the chopping control or the predetermined count number of the rotation signal pulses can be used instead of the predetermined time.

As illustrated in FIGS. 12A through 12D, when the present rotational speed N1 coincides with the target rotational speed N2, the motor control circuit 10A controls such that the transistor Q1 repeats the state of turning-on and turning-off with the constant-period/constant-duty (ratio) and the transistor Q4 is always in the state of turning-on.

When the motor control circuit 10A judges that the measured present rotational speed N1 is lower than the target rotational speed N2, the motor control signal generating device 12A applies the motor control signals to the motor driving circuit 5A so as to increase the duty ratio of the chopping control in accordance with the difference between the present rotational speed N1 and the target rotational speed N2.

Specifically, for example, the ratio of the ON period during one period in the periodical on/off operation of the transistor Q1 is increased relative to the OFF period. For example, if the duty ratio is controlled to be 50% at the beginning, the duty ratio is changed to 75%, and then the rotational speed of the DC motor M2 is measured again.

When the motor control circuit 10A judges that the present rotational speed N1 exceeds the target rotational speed N2, the motor control signal generating device 12A applies the motor control signals to the motor driving circuit 5A so as to decrease the duty ratio of the chopping control in accordance with the difference between the present rotational speed N1 and the target rotational speed N2.

Specifically, for example, the ratio of the ON period during one period in the periodical on/off operation of the transistor Q1 is decreased relative to the OFF period. For example, if the duty ratio is controlled to be 75% at the beginning, the duty ratio is changed to 50%, and then the rotational speed of the DC motor M2 is measured again.

However, when the motor control circuit 10A judges that the present rotational speed N1 is still higher than the target rotational speed N2, the motor control signal generating device 12A applies the motor control signals to the motor driving circuit 5A so as to further decrease the duty ratio of the chopping control in accordance with the difference between the present rotational speed N1 and the target rotational speed N2.

Specifically, the ratio of the ON period during one period in the periodical on/off operation of the transistor Q1 is further decreased relative to the OFF period. For example, if the duty ratio is controlled to be 50% at the beginning, the duty ratio is changed to 25%, and then the rotational speed of the DC motor M2 is measured again.

Hereinafter, the output voltage generated from the rotation detecting brush BD2 at the time of performing the chopping control is described. Referring to FIG. 12C, in the waveform at the DC control, the low-voltage area where the voltage is scarcely generated is shown as low "L" area, and the area where the voltage is gradually increased in the state of rightward rising-up is shown as high "H" area. In the "L" area, because the transistor Q4 is always turned on even in the chopping control period, the electric potential of the electrode brush B22 is almost equal to the common low-voltage potential. Because the rotation detecting brush BD2 inclined by the angle of 40° from the electrode brush B22 is short-circuited to the electrode brush B22 through the commutator, the rotation detecting brush BD2 almost falls to the common low-voltage potential.

In the "H" area, for example, viewing the "portion A" indicated by dotted lines in FIGS. 12A through 12D, because the transistor Q1 is turned off at that time, the external voltage is not applied across the electrode brushes B21 and B22 of the DC motor M2. However, because the voltage is generated by the rotor coils due to the inductive electromotive force when the DC motor M2 rotates, the voltage also appears in the "H" area. When the rotation of the DC motor M2 becomes slow, the voltage turns out to be small. Therefore, it may be difficult to detect the voltage.

As described above, in the rotation control apparatus according to the fourth embodiment of the present invention, the rotational speed of the DC motor M2 is controlled by the chopping control. When the present rotational speed N1 is lower than the target rotational speed N2, the duty ratio of the chopping control is increased so as to increase the rotational speed of the DC motor M2. On the contrary, when the present rotational speed N1 exceeds the target rotational speed N2, the duty ratio of the chopping control is decreased so as to decrease the rotational speed of the DC motor M2.

Figure 14:
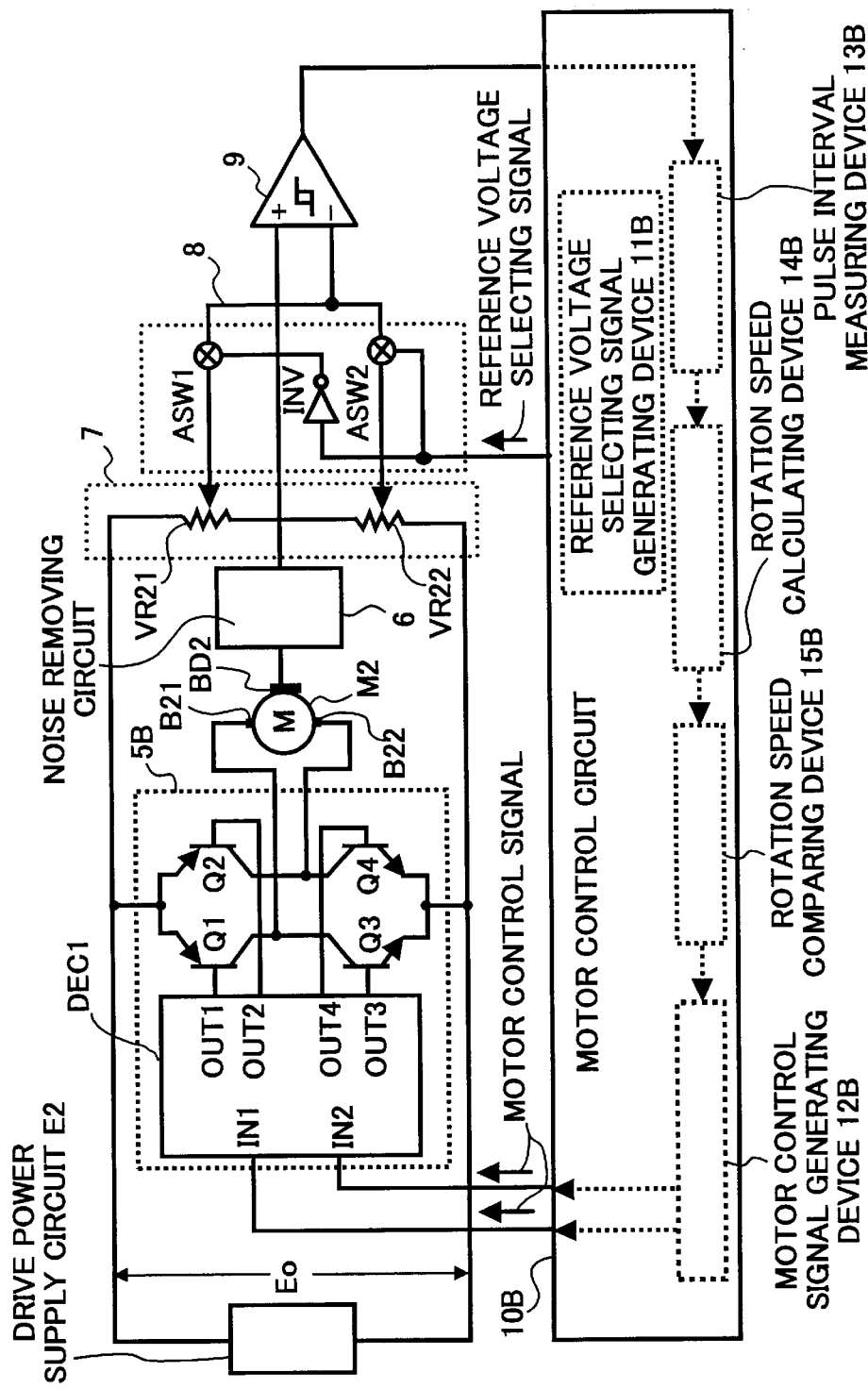
FIG. 14 is a circuit diagram illustrating a rotation control apparatus according to a fifth embodiment of the present invention.

FIG. 14 illustrates a rotation control apparatus that controls the rotational operation of the DC motor M2 according to a fifth embodiment of the present invention. The rotation control apparatus of FIG. 14 has a construction similar to the rotation control apparatus of FIG. 10 employing a motor driving circuit 5B instead of the motor driving circuit 5A, and a motor control circuit 10B instead of the motor control circuit 10A.

In the motor driving circuit 5B, a decoder DEC1 is provided at the preceding stage of the bridge circuit including the four transistors Q1 through Q4. As illustrated in a truth table of FIG. 15, the motor driving circuit 5B serves to cause the DC motor M2 to be in the four states, such as, the clockwise rotation, the counter-clockwise rotation, the brake (shunt), and the stop, by use of the combination of two bits composed of the respective one-bit input signals IN1 and IN2 respectively applied as the motor control signals from a motor control signal generating device 12B of the motor control circuit 10B.

In such a motor driving circuit 5B, because the number of the control signals is small, the motor driving circuit 5B can be widely utilized in the apparatus that controls the rotation of the DC motor. In the motor driving circuit 5B, the transistors Q1 through Q4 are respectively turned on and off by the action of output signals OUT 1 through OUT 4 of the decoder DEC1 reacting in accordance with the motor control signals IN1 and IN2.

The motor control circuit 10B includes a microcomputer (not shown), a reference voltage selecting signal generating device 11B, the motor control signal generating device 12B, a pulse interval measuring device 13B, the rotational speed calculating device 14B, the rotational speed comparing device 15B, etc.

In the motor control circuit 10B, the rotational speed comparing device 15B compares a present rotational speed N1 calculated by the rotational speed calculating device 14B with a target rotational speed N2. Based on the comparison result, the motor control signal generating device 12B generates motor control signals so as to obtain a target rotational speed N2 by the combination of the DC control and the chopping control. However, during the period of chopping control, the comparison result of the present rotational speed N1 and the target rotational speed N2, or the detection result of the rotational speed of the DC motor M2 by the pulse interval measuring device 13B and the rotational speed calculating device 14B is ignored and not reflected to the motor control signals applied to the motor driving circuit 5B.

Figure 16:
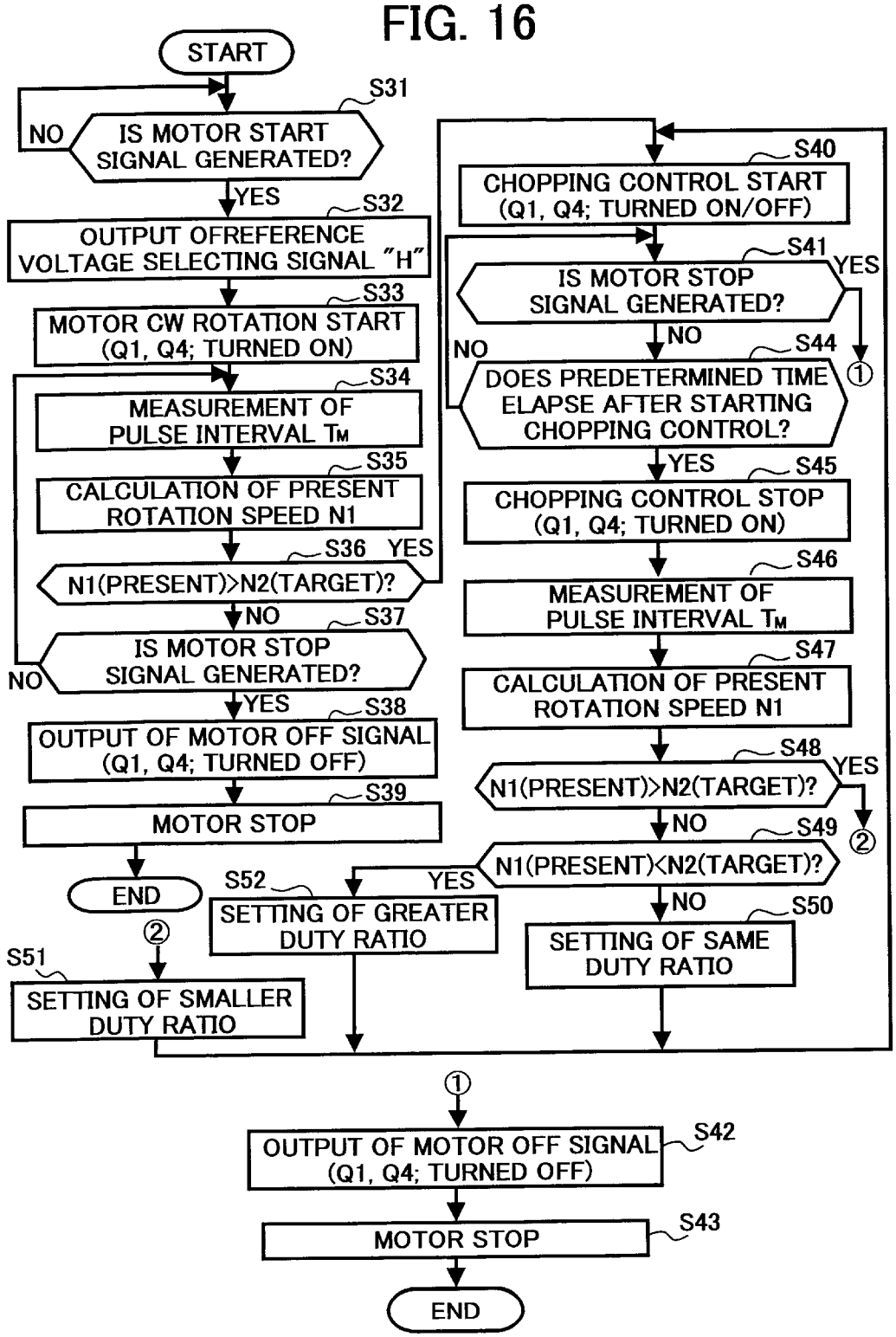
FIG. 16 is a flowchart illustrating main steps of the motor rotation control operation of the rotation control apparatus of FIG. 14.

Next, the operation of the rotation control apparatus of FIG. 14 is described referring to FIG. 16 and FIGS. 17A through 17D. FIG. 16 is a flowchart illustrating main steps of the operation of controlling the rotational speed of the DC motor M2. FIG. 17A is a diagram illustrating a waveform of an on/off control signal of the transistor Q1 when the DC control and the chopping control are performed, FIG. 17B is a diagram illustrating a waveform of an on/off control signal of the transistor Q4 when the DC control and the chopping control are performed, FIG. 17C is a diagram illustrating a waveform of a signal input to the non-inversion input terminal of the comparator 9 (i.e., an output signal of the rotation detecting brush BD2) when the DC control and the chopping control are performed, and FIG. 17D is a diagram illustrating a waveform of rotation signal pulses output from the comparator 9 when the DC control and the chopping control are performed.

The brief flows of the operation of the rotation control apparatus of FIG. 14 are that the DC voltage is applied to the DC motor M2 through the motor driving circuit 5B in accordance with the motor control signals generated by the motor control signal generating device 12B, and thereby the DC motor M2 starts rotating. The rotational speed of the DC motor M2 is gradually increased in accordance with the time constant of the motor driving circuit 5B, and finally rotational speed thereof becomes constant. In the motor control circuit 10B, a present rotational speed N1 is calculated from the rotation signal of the DC motor M2. When the present rotational speed N1 exceeds a predetermined target rotational speed N2, the DC control is switched to the chopping control for a certain period of time so as to decrease the rotational speed of the DC motor M2. In the chopping control, the turning-on and turning-off of the electricity supplying to the DC motor M2 are repeated, and intermittent feeding is performed so as to obtain the target rotational speed N2 of the DC motor M2.

Hereinafter, main steps of the operation of controlling the rotational speed of the DC motor (hereinafter simply referred to as a motor rotation control operation) are described referring to FIG. 16. In step S31, the motor control circuit 10B judges if a motor start signal is generated from an external device (not shown) or not. If the answer is YES in step S31, the reference voltage selecting signal generating device 11B outputs the reference voltage selecting signal "H" in step S32. If the answer is NO in step S31, the motor rotation control operation returns to reexecute step S31. At almost the same timing of the output of the reference voltage selecting signal "H", the motor control signal "H" is applied to the IN1, and the motor control signal "L" is applied to the IN2 from the motor control signal generating device 12B. Then, the transistors Q1 and Q4 of the motor driving circuit 5B are turned on, and the voltage almost equal to the power supply voltage Eo is applied to the electrode brushes B21 and B22 of the DC motor M2. Thereby, the DC motor M2 starts rotating in the clockwise direction in step S33. As a result, the rotation signal pulses are output from the comparator 9 corresponding to the rotations of the DC motor M2.

The rotation of the DC motor M2 is slow-speed at the beginning. However, if the motor drive voltage continues to be applied to the DC motor M2, the rotation of the DC motor M2 is increased in accordance with the time constant of the motor driving circuit 5B, and then the rotational speed of the DC motor M2 becomes constant when the torque generated by the DC motor M2 and the load torque are balanced with each other.

Further, the pulse interval measuring device 13B measures the pulse interval $T_M$ based on the rotation signal pulses output from the comparator 9 in step S34. Based on the measurement result of the pulse interval $T_M$, the rotational speed calculating device 14B calculates a present rotational speed N1 of the DC motor M2 in step S35.

Then, the rotational speed comparing device 15B compares the present rotational speed N1 calculated by the rotational speed calculating device 14B with a target rotational speed N2, and judges if the present rotational speed N1 exceeds the target rotational speed N2 in step S36. If the answer is NO in step S36, the rotational speed of the DC motor M2 is maintained. Further, the motor control circuit 10B judges if a motor stop signal is generated from an external device (not shown) or not in step S37. If the answer is YES in step S37, the motor control signal generating device 12B outputs motor off signals, and the transistors Q1 and Q4 are turned off in step S38. Then, the DC motor M2 stops rotating in step S39. The reason why the motor control circuit 10B judges if the motor stop signal is generated from the external device in step S37 is that, if the rotational speed of the DC motor M2 does not reach the target rotational speed N2 forever for some reasons, the motor rotation control operation is put in an endless loop inevitably. If the answer is NO in step S37, the motor rotation control operation returns to reexecute step S34.

If the answer is YES in step S36, the motor control circuit 10B starts chopping control of continuing or discontinuing the supply of the drive current by performing the ON/OFF control of the drive current by turning on and off the transistors Q1 and Q4 of the motor driving circuit 5B at the same time in step S40.

With regard to the subsequent motor rotation control operation steps, the present rotational speed N1 of the DC motor M2 is calculated from the rotation signal of the DC motor M2. When the present rotational speed N1 exceeds the predetermined target rotational speed N2, the duty ratio is decreased so as to decrease the rotational speed of the DC motor M2. On the contrary, when the present rotational speed N1 is lower than the predetermined target rotational speed N2, the duty ratio is increased so as to increase the rotational speed of the DC motor M2. Thereby, the motor control circuit 10B controls the rotational speed of the DC motor M2 to reach the target rotational speed N2.

After the chopping control is started in step S40, the motor control circuit 10B judges if the motor stop signal is generated from the external device or not in step S41. If the answer is YES in step S41, the motor control signal generating device 12B outputs motor off signals, and the transistors Q1 and Q4 are turned off in step S42. Then, the DC motor M2 stops rotating in step S43. If the answer is NO in step S41, the motor control circuit 10B judges if a predetermined time elapses after starting the chopping control or not in step S44. If the answer is NO in step S44, the motor rotation control operation returns to reexecute step S41.

If the answer is YES in step S44, the motor control circuit 10B stops the chopping control in step S45. The motor control signal generating device 12B outputs the motor control signals IN1 "H" and IN2 "L", and thereby the transistors Q1 and Q4 of the motor driving circuit 5B are turned on. As a result, the DC motor M2 is controlled by the DC control from the chopping control.

Further, the pulse interval measuring device 13B measures the pulse interval $T_M$ based on the rotation signal pulses output from the comparator 9 in step S46. Based on the measurement result of the pulse interval $T_M$, the rotational speed calculating device 14B calculates the present rotational speed N1 of the DC motor M2 in step S47. Then, the rotational speed comparing device 15B compares the present rotational speed N1 calculated by the rotational speed calculating device 14B with the target rotational speed N2, and judges if the present rotational speed N1 exceeds the target rotational speed N2 in step S48. The target rotational speed N2 may not be a specified rotational speed value but may fall within a specified rotational speed range.

If the answer is NO in step S48, the rotational speed comparing device 15B judges if the present rotational speed N1 is lower than the target rotational speed N2 or not in step S49. If the answer is NO in step S49, because the present rotational speed N1 equals to the target rotational speed N2, the motor control circuit 10B sets the duty ratio that is set last time in step S50. After step S50, the motor rotation control operation returns to reexecute step S40 at the same duty ratio set in step S50.

If the answer is YES in step S48, the motor control circuit 10B sets smaller duty ratio of the chopping control than that of the last time in step S51. After step S51, the motor rotation control operation returns to reexecute step S40 at the smaller duty ratio set in step S51. If the answer is YES in step S49, the motor control circuit 10B sets greater duty ratio of the chopping control than that of the last time in step S52. After step S52, the motor rotation control operation returns to reexecute step S40 at the greater duty ratio set in step S52.

In the above-described motor rotation control operation, when the predetermined time does not elapse after setting the duty ratio and starting chopping control, the chopping control is not stopped. Because, it is considered that even though the duty ratio is set and the chopping control is started, the rotational speed of the DC motor M2 does not immediately vary, and the response of the DC motor M2 is delayed.

In the chopping control of the rotation control apparatus of FIG. 14 according to the fifth embodiment of the present invention, the ON state of both transistors Q1 and Q4 of the motor driving circuit 5B and the OFF state of both transistors Q1 and Q4 are alternately repeated.

In the output signal from the rotation detecting brush BD2 during the chopping control period, as illustrated in FIG. 17C, the electric potential becomes unstable during the period when the both transistors Q1 and Q4 are turned off (i.e., the area indicated by dotted lines in the waveform of the input signal to the non-inversion input terminal of the comparator 9 in FIG. 17C). This is because when the both transistors Q1 and Q4 are turned off, the rotation detecting brush BD2 is completely separated from the motor driving circuit 5B. As a result, the output signal from the comparator 9 inevitably turns out to be unstable. For example, the pulse width may change, the pulse may appear even in the area where there exists no rotation signal of the DC motor M2, the signal may disappear, and the false signal may appear, etc.

Therefore, the motor control circuit 10B does not detect the rotational speed of the DC motor M2 during the period of chopping control, but detects the rotational speed of the DC motor M2 after the chopping control is changed to the DC control. By repeating the above-described chopping control and DC control, the rotational speed of the DC motor M2 is controlled to reach the target rotational speed.

The predetermined time period from stopping the chopping control after starting the chopping control till detecting the rotational speed of the DC motor M2 under the DC control is determined in consideration of the response speed of the DC motor M2 under the chopping control. Moreover, the other time period of detecting the rotational speed of the DC motor M2 under the DC control is short, for example, the time period of counting at least two rotation signal pulses output from the comparator 9.

Next, a rotation control apparatus that controls the rotational operation of the DC motor M2 according to a sixth embodiment of the present invention is described. The rotation control apparatus according to the sixth embodiment of the present invention has the same construction as that of the rotation control apparatus of FIG. 14 but performs different motor rotation control operations.

The brief flows of the operation of the rotation control apparatus according to the sixth embodiment of the present invention are that the motor control circuit 10B stops the chopping control and calculates a present rotational speed N1 of the DC motor M2 based on the rotation signal of the DC motor M2. When the present rotational speed N1 is lower than a predetermined target speed N2, the duty ratio is increased so as to increase the rotational speed of the DC motor M2, and the chopping control is performed during a predetermined time period $T_{CHP}$ from that time point. On the other hand, when the present rotational speed N1 is higher than the target speed N2, the duty ratio is decreased so as to decrease the rotational speed of the DC motor M2, and the chopping control is performed during the predetermined time period $T_{CHP}$ from that time point. Thereby, the rotational speed of the DC motor M2 is controlled to reach the target rotational speed.

The above-described time period $T_{CHP}$ signifies the time obtained from the pulse interval $T_M$ measured by the pulse interval measuring device 13B; for example, $T_{CHP}=0.7 T_M$. During the time period $T_{CHP}$, the detection of the rotation signal pulse is not performed. The detection of the rotation signal pulse is started in the DC control state of turning on both of the transistors Q1 and Q4 after the time period $T_{CHP}$ elapses. Until detecting the leading edge of the rotation signal pulse, both of the transistors Q1 and Q4 keep the ON state.

From the time point when the leading edge of the rotation signal pulse immediately before starting the chopping control is detected, the counting of the clock (signals) is started. In the state of performing the next DC control after the chopping control, the leading edge of the pulse is detected and the pulse interval $T_M$ is calculated. The chopping control is performed again by the predetermined time period $T_{CHP}$ (=$0.7T_M$). At this time, the duty ratio is changed if necessary. Thereafter, such steps as mentioned above are repeated.

Hereinafter, main steps of the operation of controlling the rotational speed of the DC motor (hereinafter simply referred to as a motor rotation control operation) are described referring to FIG. 18 and FIGS. 19A through 19D.

FIG. 19A is a diagram illustrating a waveform of an on/off control signal of the transistor Q1 when the DC control and the chopping control are repeatedly performed, FIG. 19B is a diagram illustrating a waveform of an on/off control signal of the transistor Q4 when the DC control and the chopping control are repeatedly performed, FIG. 19C is a diagram illustrating a waveform of a signal input to the non-inversion input terminal of the comparator 9 (i.e., an output signal of the rotation detecting brush BD2) when the DC control and the chopping control are repeatedly performed, and FIG. 19D is a diagram illustrating a waveform of rotation signal pulses output from the comparator 9 when the DC control and the chopping control are repeatedly performed.

In the respective waveforms of on/off control signals of the transistors Q1 and Q4 illustrated in FIGS. 19A and 19B, respectively, the frequency of the chopping control is made sufficiently high. Further, in the same waveforms, the DC control period of stopping the chopping control is illustrated in the state of the pulse.

In the waveforms of FIGS. 19C and 19D, the area where the chopping control is performed is indicated by dotted lines. The above-described area corresponds to the time period $T_{CHP}$. When the DC motor M2 rotates, the rotation signal pulses are output from the comparator 9 corresponding to the rotations of the DC motor M2. Because the false pulses appear in the area of the waveform indicated by dotted lines (i.e., the time period $T_{CHP}$), the motor control circuit 10B does not detect the rotation signal pulses in that area.

Figure 18A:
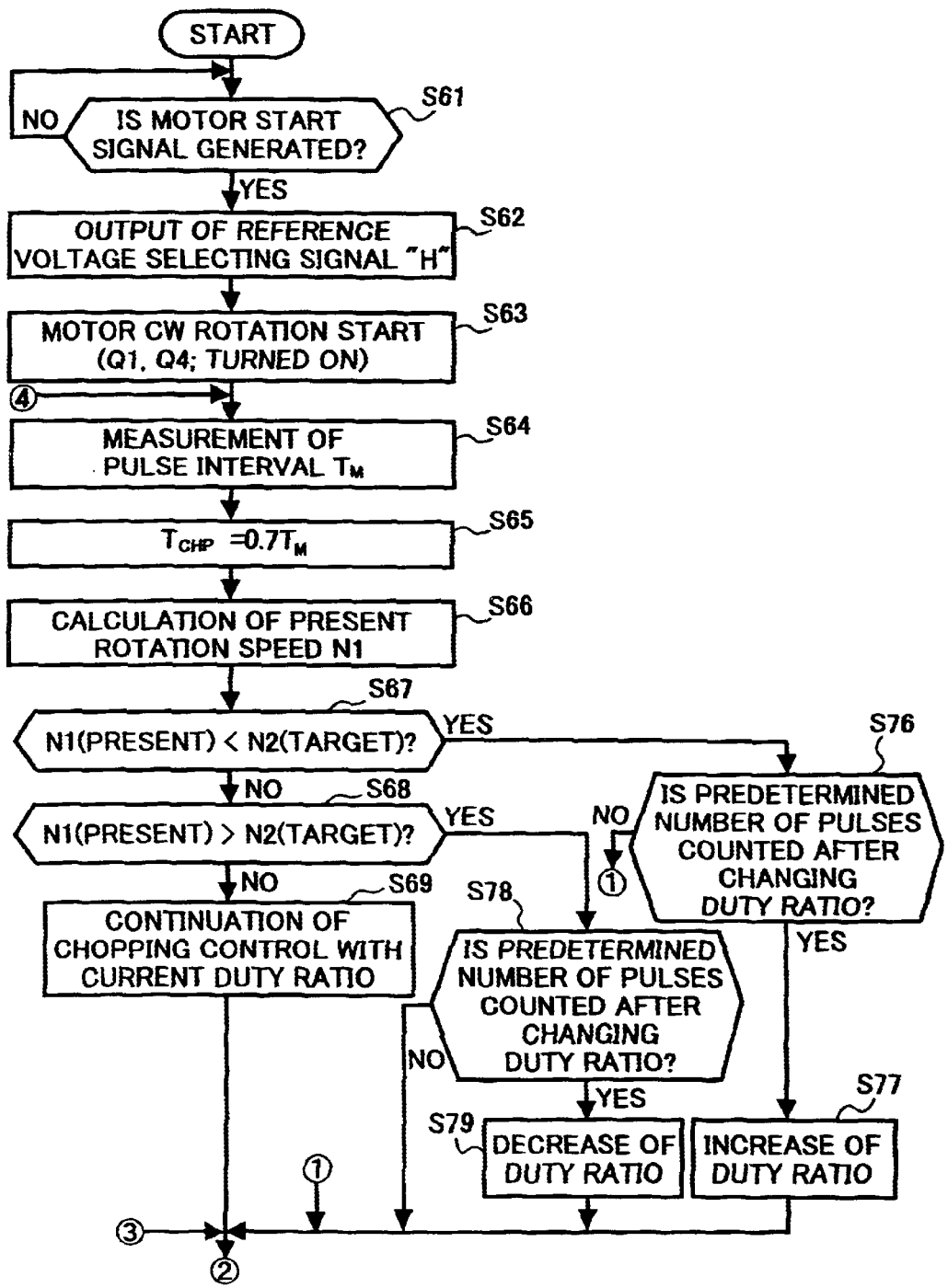
FIGS. 18A and 18B are a flowchart illustrating main steps of another motor rotation control operation of the rotation control apparatus of FIG. 14.
Figure 18B:
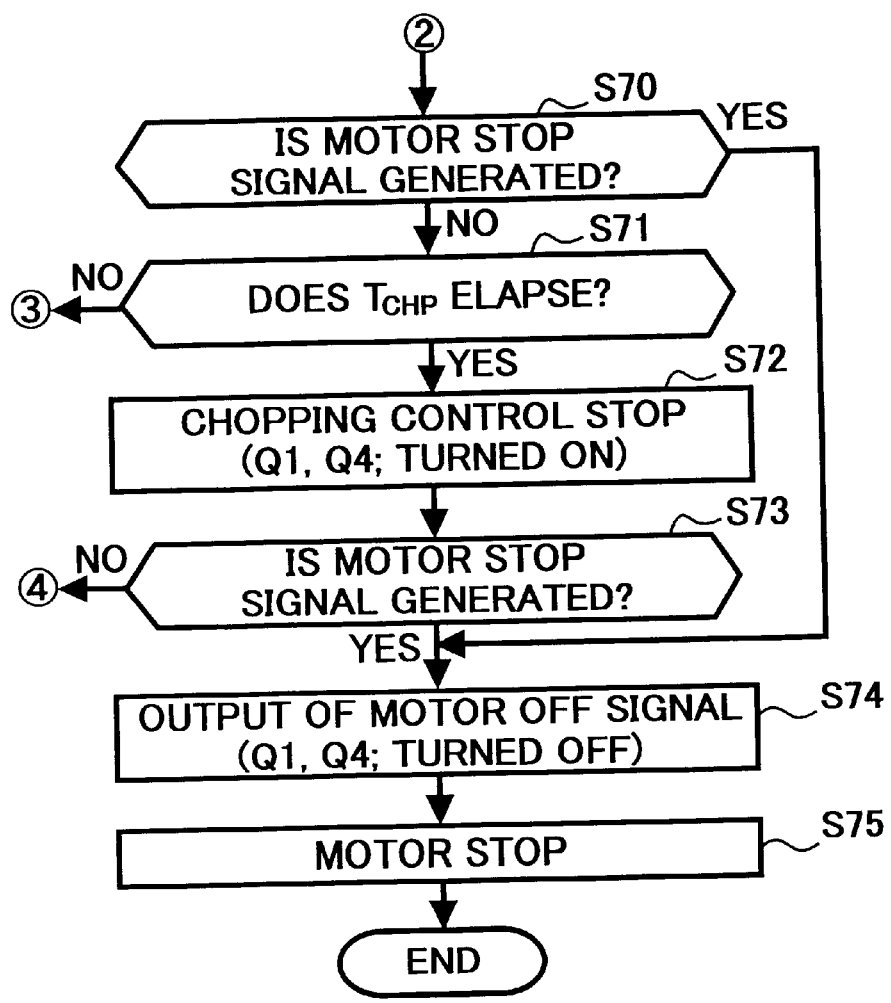

Referring to a flowchart of FIGS. 18A and 18B, in step S61, the motor control circuit 10B judges if a motor start signal is generated from an external device (not shown) or not. If the answer is YES in step S61, the reference voltage selecting signal generating device 11B outputs the reference voltage selecting signal "H" in step S62. If the answer is NO in step S61, the motor rotation control operation returns to reexecute step S61. At almost the same timing of the output of the reference voltage selecting signal "H", the motor control signal "H" is applied to the IN1, and the motor control signal "L" is applied to the IN2 from the motor control signal generating device 12B. Then, the transistors Q1 and Q4 of the motor driving circuit 5B are turned on, and the voltage almost equal to the power supply voltage Eo is applied to the electrode brushes B21 and B22 of the DC motor M2. Thereby, the DC motor M2 starts rotating in the clockwise direction in step S63. As a result, the rotation signal pulses are output from the comparator 9 corresponding to the rotations of the DC motor M2.

Further, the pulse interval measuring device 13B measures the pulse interval $T_M$ based on the rotation signal pulses output from the comparator 9 in step S64. Based on the measurement result of the pulse interval $T_M$, the pulse interval measuring device 13B further calculates a predetermined time $T_{CHP}$ (=$0.7T_M$) in step S65. Then, the rotational speed calculating device 14B calculates a present rotational speed N1 of the DC motor M2 based on the measurement result of the pulse interval $T_M$ in step S66.

Further, the rotational speed comparing device 15B compares the present rotational speed N1 calculated by the rotational speed calculating device 14B with a target rotational speed N2, and judges if the present rotational speed N1 is smaller than the target rotational speed N2 in step S67. The target rotational speed N2 may not be a specified rotational speed value but may fall within a specified rotational speed range.

If the answer is NO in step S67, the rotational speed comparing device 15B judges if the present rotational speed N1 exceeds the target rotational speed N2 in step S68. If the answer is NO in step S68, because the present rotational speed N1 equals to the target rotational speed N2, the motor control circuit 10B continues the chopping control with the current duty ratio in step S69.

Then, the motor control circuit 10B judges if a motor stop signal is generated from an external device (not shown) in step S70. If the answer is NO in step S70, the motor control circuit 10B judges if the predetermined time $T_{CHP}$ elapses or not in step S71. If the answer is NO in step S71, the motor rotation control operation returns to reexecute step S70. If the answer is YES in step S71, the motor control circuit 10B stops the chopping control, and the both transistors Q1 and Q4 of the motor driving circuit 5B are turned on in step S72. Further, the motor control circuit 10B judges if the motor stop signal is generated from the external device (not shown) in step S73. If the answer is NO in step S73, the motor rotation control operation returns to reexecute step S64. If the answer is YES in both steps S70 and S73, the motor control signal generating device 12B outputs motor off signals, and the transistors Q1 and Q4 are turned off in step S74. Then, the DC motor M2 stops rotating in step S75.

If the answer is YES in step S67, the motor control circuit 10B judges if a predetermined number of rotation signal pulses is counted after changing the immediately-before duty ratio in step S76. If the answer is YES in step S76 or if the duty ratio is not changed before at all, the motor control circuit 10B increases the duty ratio of the chopping control in step S77. Further, the motor rotation control operation proceeds to step S70. If the answer is NO in step S76, the motor rotation control operation proceeds to step S70 without changing the duty ratio of the chopping control.

If the answer is YES in step S68, the motor control circuit 10B judges if a predetermined number of rotation signal pulses is counted after changing the immediately-before duty ratio in step S78. If the answer is YES in step S78 or if the duty ratio is not changed before at all, the motor control circuit 10B decreases the duty ratio of the chopping control in step S79. Further, the motor rotation control operation proceeds to step S70. If the answer is NO in step S78, the motor rotation control operation proceeds to step S70 without changing the duty ratio of the chopping control.

In the above-described motor rotation control operation, the duty ratio is not changed until the predetermined number of rotation signal pulses is counted after changing the immediately-before duty ratio. Because, it is considered that even though the duty ratio is changed, the rotational speed of the DC motor M2 does not follow immediately, and the response of the DC motor M2 is delayed.

In the above-described rotation control apparatuses according to the fifth and sixth embodiments of the present invention, even if the motor control circuit 10B that makes the rotation detecting brush BD2 substantially separate from the motor driving circuit 5B at the time of performing the chopping control is employed, the rotational speed of the DC motor M2 can be controlled to reach the target rotational speed.

Next, a rotation control apparatus that controls the rotational operation and a cumulative rotation number of the DC motor M2 according to a seventh embodiment of the present invention is described. The rotation control apparatus of FIG. 20 has a construction similar to the rotation control apparatus of FIG. 10 employing a motor control circuit 10C instead of the motor control circuit 10A.

The motor control circuit 10C includes a microcomputer (not shown), a reference voltage selecting signal generating device 11C, a motor control signal generating device 12C, a pulse number counting device 13C, a cumulative rotation number calculating device 14C, a remaining rotation number calculating device 15C, etc.

The pulse number counting device 13C counts the number of the rotation signal pulses output from the comparator 9, and inputs the number of pulses to the cumulative rotation number calculating device 14C. The cumulative rotation number calculating device 14C calculates the cumulative rotation number of the DC motor M2 from the rotation start of the DC motor M2, and inputs the cumulative rotation number to the remaining rotation number calculating device 15C. Then, the remaining rotation number calculating device 15C calculates the remaining rotation number to a target cumulative rotation number of the DC motor M2 corresponding to the motor stop. When the remaining rotation number becomes zero, the remaining rotation number calculating device 15C causes the motor control signal generating device 12C to generate a motor off signal.

The brief flows of the operation of the rotation control apparatus of FIG. 20 are that the rotation number of the DC motor M2 is counted from the rotation start thereof, and when the cumulative rotation number reaches a predetermined rotation number, the rotation of the DC motor M2 is stopped.

Specifically, the DC motor M2 is driven to rotate by performing the DC control first. When the cumulative rotation number of the DC motor M2 from the rotation start thereof reaches a predetermined rotation number (R1), the DC motor M2 is switched to be driven by performing the chopping control. When the cumulative rotation number of the DC motor M2 from the switch to the chopping control reaches a predetermined rotation number (R2), the DC motor M2 is stopped. That is, when the cumulative rotation number of the DC motor M2 from the rotation start thereof reaches a predetermined rotation number (R1+R2), the DC motor M2 is stopped.

In the rotation control apparatus of FIG. 20, the rotation of the DC motor M2 is controlled to be fast by performing the DC control in the period corresponding to the rotation number R1, and the rotation of the DC motor M2 is controlled to be relatively slow by performing the chopping control before the rotation of the DC motor M2 is stopped (i.e., in the period corresponding to the rotation number R2).

Figure 21:
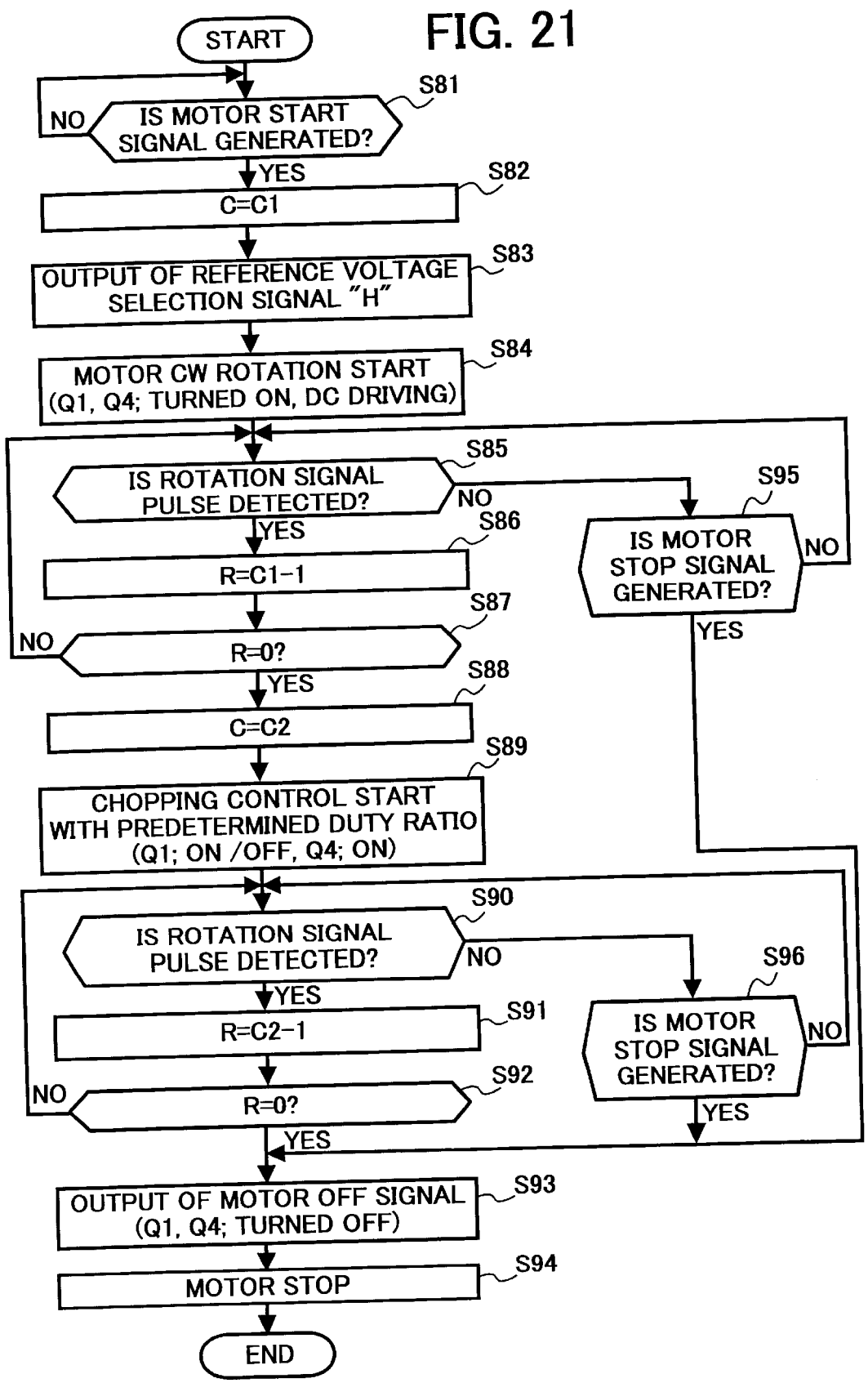
FIG. 21 is a flowchart illustrating main steps of the motor rotation control operation of the rotation control apparatus of FIG. 20.

Next, the operation of the rotation control apparatus of FIG. 20 is described referring to FIG. 21 and FIGS. 22A through 22D. FIG. 21 is a flowchart illustrating main steps of the operation of controlling the rotational speed and cumulative rotation number of the DC motor M2 (hereinafter simply referred to as a motor rotation control operation). FIG. 22A is a diagram illustrating a waveform of an on/off control signal of the transistor Q1 when the DC control and the chopping control are performed, FIG. 22B is a diagram illustrating a waveform of an on/off control signal of the transistor Q4 when the DC control and the chopping control are performed, FIG. 22C is a diagram illustrating a waveform of a signal input to the non-inversion input terminal of the comparator 9 (i.e., an output signal of the rotation detecting brush BD2) when the DC control and the chopping control are performed, and FIG. 22D is a diagram illustrating a waveform of rotation signal pulses output from the comparator 9 when the DC control and the chopping control are performed.

In the flowchart of FIG. 21, for sake of clarity, a cumulative pulse number and a remaining pulse number are used instead of the above-described cumulative rotation number and the remaining rotation number, respectively. In step S81, the motor control circuit 10C judges if a motor start signal is generated from an external device (not shown) or not. If the answer is YES in step S81, a first target cumulative pulse number "C" is set as a remaining pulse number C1 in the remaining rotation number calculating device 15C in step S82. If the answer is NO in step S81, the motor rotation control operation returns to reexecute step S81. Then, the reference voltage selecting signal generating device 11C outputs the reference voltage selecting signal "H" in step S83. Almost simultaneously, the transistors Q1 and Q4 of the motor driving circuit 5A are turned on, and thereby the DC motor M2 is driven to rotate in the clockwise direction by performing the DC control in step S84.

Next, the motor control circuit 10C judges if the rotation signal pulse output from the comparator 9 is detected or not in step S85. If the answer is YES in step S85, the remaining rotation number calculating device 15C calculates a remaining pulse number "R" by subtracting one from the remaining pulse number C1 in step S86. Further, the motor control circuit 10C judges if the remaining pulse number "R" is zero or not in step S87. If the answer is NO in step S87, the motor rotation control operation returns to reexecute step S85. If the answer is YES in step S87, a second target cumulative pulse number "C" is set as a remaining pulse number C2 in the remaining rotation number calculating device 15C in step S88.

Then, the motor control signal is generated from the motor control signal generating device 12C such that the transistor Q1 is turned on/off and the transistor Q4 is turned on. Thereby, the DC motor M2 is driven by performing the chopping control with a predetermined duty ratio in step S89.

After starting the chopping control in step S89, the motor control circuit 10C judges if the rotation signal pulse output from the comparator 9 is detected or not in step S90. If the answer is YES in step S90, the remaining rotation number calculating device 15C calculates a remaining pulse number "R" by subtracting one from the remaining pulse number C2 in step S91. Further, the motor control circuit 10C judges if the remaining pulse number "R" is zero or not in step S92. If the answer is NO in step S92, the motor rotation control operation returns to reexecute step S90. If the answer is YES in step S92, the motor control signal generating device 12C outputs motor off signals, and the transistors Q1 and Q4 are turned off in step S93. Thereby, the DC motor M2 stops rotating in step S94.

If the answer is NO in step S85, the motor control circuit 10C judges if a motor stop signal is generated from an external device (not shown) or not in step S95. If the answer is YES in step S95, the motor rotation control operation proceeds to step S93. If the answer is NO in step S95, the motor rotation control operation returns to reexecute step S85.

If the answer is NO in step S90, the motor control circuit 10C judges if the motor stop signal is generated from the external device (not shown) or not in step S96. If the answer is YES in step S96, the motor rotation control operation proceeds to step S93. If the answer is NO in step S96, the motor rotation control operation returns to reexecute step S90.

Next, a rotation control apparatus that controls the rotational speed and a cumulative rotation number of the DC motor M2 according to an eighth embodiment of the present invention is described. The rotation control apparatus of FIG. 23 has a construction similar to the rotation control apparatus of FIG. 20 employing a motor control circuit 10D instead of the motor control circuit 10C.

The motor control circuit 10D includes a microcomputer (not shown), a reference voltage selecting signal generating device 11D, a motor control signal generating device 12D, a pulse number counting device 13D, a cumulative rotation number calculating device 14D, a remaining rotation number calculating device 15D, a pulse interval measuring device 16D, the rotational speed calculating device 17D, the rotational speed comparing device 18D, etc.

Figure 23:
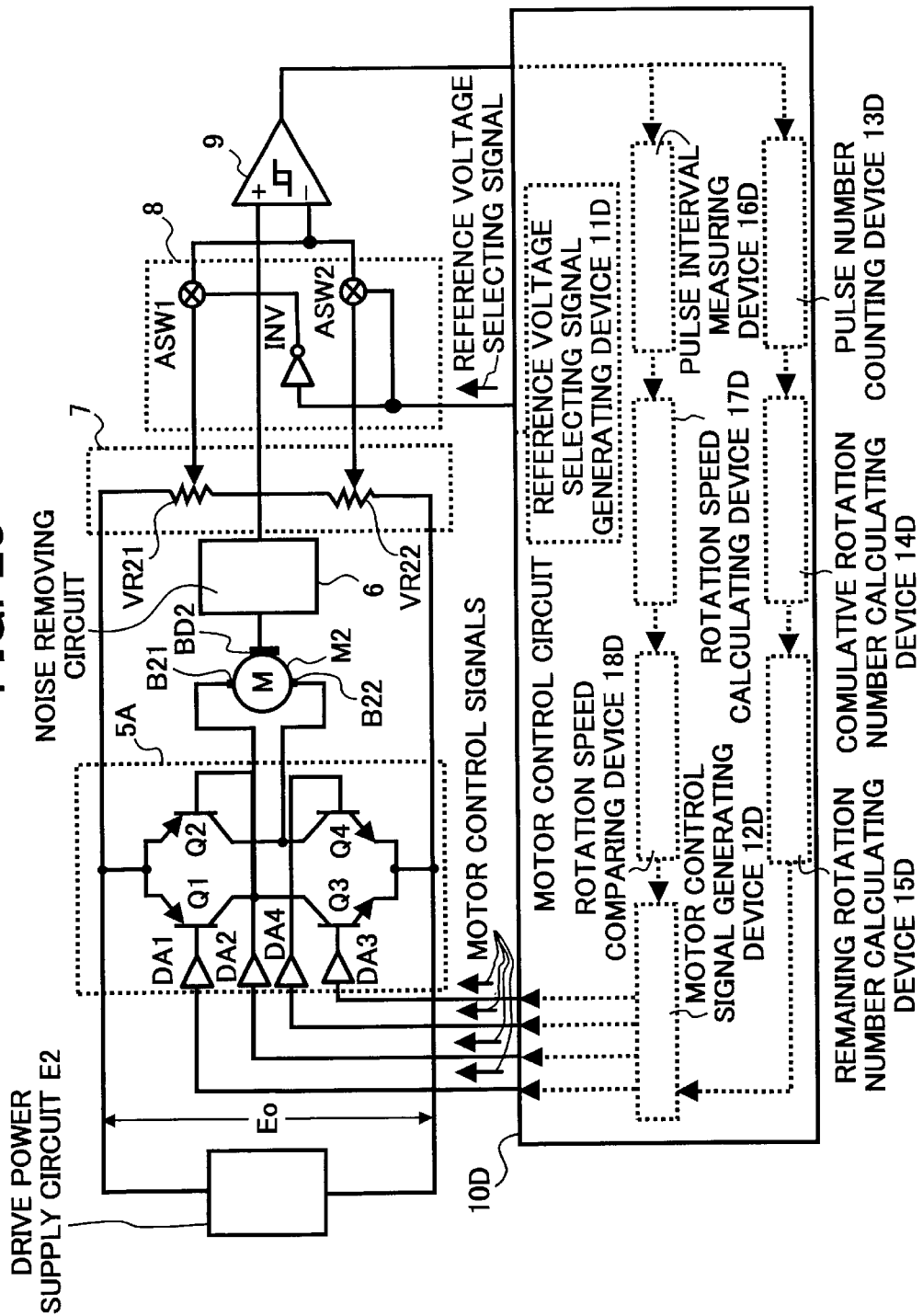
FIG. 23 is a circuit diagram illustrating a rotation control apparatus according to an eighth embodiment of the present invention.

The brief flows of the operation of the rotation control apparatus of FIG. 23 are that the DC motor M2 is driven to rotate by performing the DC control first. When the cumulative rotation number of the DC motor M2 from the rotation start thereof reaches a predetermined rotation number (R1), the DC motor M2 is switched to be driven by performing the chopping control. During the chopping control period, the rotational speed of the DC motor M2 is detected. In order to improve the stopping position accuracy of the DC motor M2, the duty ratio of the chopping control is changed such that the rotational speed of the DC motor M2 becomes low before the stop thereof. When the cumulative rotation number of the DC motor M2 from the switch to the chopping control reaches a predetermined rotation number (R2), the DC motor is stopped.

Figure 24B:
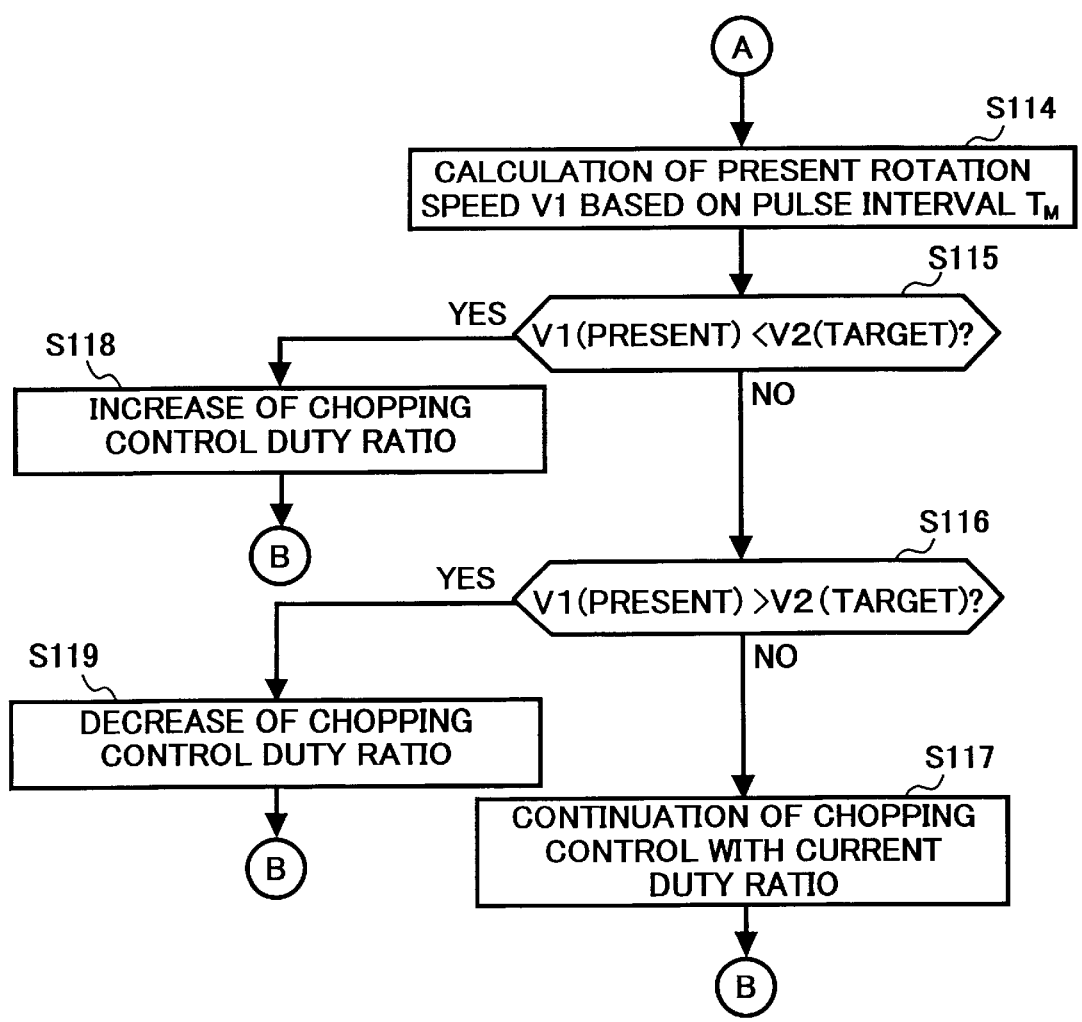

Next, the operation of the rotation control apparatus of FIG. 23 is described referring to FIGS. 24A and 24B, and FIGS. 25A through 25D. FIGS. 24A and 24B are a flowchart illustrating main steps of the operation of controlling the rotational speed and cumulative rotation number of the DC motor M2 (hereinafter simply referred to as a motor rotation control operation). FIG. 25A is a diagram illustrating a waveform of an on/off control signal of the transistor Q1 when the DC control and the chopping control are performed, FIG. 25B is a diagram illustrating a waveform of an on/off control signal of the transistor Q4 when the DC control and the chopping control are performed, FIG. 25C is a diagram illustrating a waveform of a signal input to the non-inversion input terminal of the comparator 9 (i.e., an output signal of the rotation detecting brush BD2) when the DC control and the chopping control are performed, and FIG. 25D is a diagram illustrating a waveform of rotation signal pulses output from the comparator 9 when the DC control and the chopping control are performed.

Also in the flowchart of FIGS. 24A and 24B, for sake of clarity, a cumulative pulse number and a remaining pulse number are used instead of the above-described cumulative rotation number and the remaining rotation number, respectively. In step S101, the motor control circuit 10D judges if a motor start signal is generated from an external device (not shown) or not. If the answer is YES in step S101, a first target cumulative pulse number "C" is set as a remaining pulse number C1 in the remaining rotation number calculating device 15D in step S102. If the answer is NO in step S101, the motor rotation control operation returns to reexecute step S101. Then, the reference voltage selecting signal generating device 11D outputs the reference voltage selecting signal "H" in step S103. Almost simultaneously, the transistors Q1 and Q4 of the motor driving circuit 5A are turned on, and thereby the DC motor M2 is driven to rotate in the clockwise direction by performing the DC control in step S104.

Next, the motor control circuit 10D judges if the rotation signal pulse output from the comparator 9 is detected or not in step S105. If the answer is YES in step S105, the remaining rotation number calculating device 15D calculates a remaining pulse number "R" by subtracting one from the remaining pulse number C1 in step S106. Further, the motor control circuit 10D judges if the remaining pulse number "R" is zero or not in step S107. If the answer is NO in step S107, the motor rotation control operation returns to reexecute step S105. If the answer is YES in step S107, a second target cumulative pulse number "C" is set as a remaining pulse number C2 in the remaining rotation number calculating device 15D in step S108.

Then, the motor control signal is generated from the motor control signal generating device 12D such that the transistor Q1 is turned on/off and the transistor Q4 is turned on. Thereby, the DC motor M2 is driven by performing the chopping control with a predetermined duty ratio in step S109.

After starting the chopping control in step S109, the motor control circuit 10D judges if the rotation signal pulse output from the comparator 9 is detected or not in step S110. If the answer is YES in step S110, the remaining rotation number calculating device 15D calculates a remaining pulse number "R" by subtracting one from the remaining pulse number C2 in step S111.

Further, the motor control circuit 10D judges if the remaining pulse number "R" is zero or not in step S112. If the answer is NO in step S112, the motor control circuit 10D judges if a predetermined number of rotation signal pulses is counted after starting the chopping control or after changing the immediately-before duty ratio in step S113. If the answer is NO in step S113, the motor rotation control operation returns to reexecute step S110. If the answer is YES in step S113, the pulse interval measuring device 16D measures the pulse interval $T_M$ based on the rotation signal pulses output from the comparator 9, and the rotational speed calculating device 17D calculates a present rotational speed V1 based on the measurement result of the pulse interval $T_M$ in step S114.

Further, the rotational speed comparing device 18D compares the present rotational speed V1 calculated by the rotational speed calculating device 17D with a target rotational speed V2, and judges if the present rotational speed V1 is smaller than the target rotational speed V2 in step S115. The target rotational speed V2 may not be a specified rotational speed value but may fall within a specified rotational speed range.

If the answer is NO in step S115, the rotational speed comparing device 18D judges if the present rotational speed V1 exceeds the target rotational speed V2 in step S116. If the answer is NO in step S116, because the present rotational speed V1 equals to the target rotational speed V2, the motor control circuit 10D continues the chopping control with the current duty ratio in step S117. After step S117, the motor rotation control operation returns to reexecute step S110.

If the answer is YES in step S115, the motor control circuit 10D increases the duty ratio of the chopping control in step S118. If the answer is YES in step S116, the motor control circuit 10D decreases the duty ratio of the chopping control in step S119. After both steps S118 and S119, the motor rotation control operation returns to reexecute step S110.

If the answer is NO in step S110, the motor control circuit 10D judges if a motor stop signal is generated from an external device (not shown) in step S121. If the answer is NO in step S121, the motor rotation control operation returns to reexecute step S110. If the answer is YES in step S121, the motor control signal generating device 12D outputs motor off signals, and the transistors Q1 and Q4 are turned off in step S122. Then, the DC motor M2 stops rotating in step S123.

If the answer is NO in step S105, the motor control circuit 10D judges if the motor stop signal is generated from the external device (not shown) in step S120. If the answer is NO in step S120, the motor rotation control operation returns to reexecute step S105. If the answer is YES in step S120, the motor rotation control operation proceeds to step S122. Further, if the answer is YES in step S112, the motor rotation control operation proceeds to step S122.

In both rotation control apparatuses according to the seventh and eighth embodiments, owing to the above-described rotation control operations, the DC motor M2 can reach the target rotation number at high speed by the DC control, and then the DC motor M2 can smoothly stop at the target position by the chopping control. As a result, the stopping position accuracy of the DC motor M2 can be improved.

There are several methods of detecting the rotation signal pulse, such as, for example, detection of the leading edge, detection of the trailing edge, and detection of both the leading edge and the trailing edge. In the rotation control apparatuses according to the seventh and eighth embodiments, the leading edge of the rotation signal pulse is detected as illustrated in FIGS. 22D and 25D.

In the above-described motor rotation control operations, the DC motor M2 is driven to rotate by performing DC control first, and then the DC control is switched to the chopping control until the motor stops. Alternatively, the DC motor M2 may be rotated by performing chopping control from start to end.

Further, in the above-described rotation control apparatuses according to the seventh and eighth embodiments of the present invention, the rotation number of the DC motor M2 is counted from the rotation start thereof. Alternatively, the rotation number of the DC motor M2 may start to be counted with reference to the signal generated by an external device (not shown) after the rotation start of the DC motor M2.

Although the rotation control apparatuses according to the seventh and eighth embodiments of the present invention employ the same motor driving circuit 5A as the rotation control apparatus of FIG. 10, the motor driving circuit 5B that is employed in the rotation control apparatus of FIG. 14 can be used instead of the motor driving circuit 5A.

Next, the arrangement of the rotation detection brush for detecting the rotation of the DC motor according to the embodiments of the present invention is described in details.

FIGS. 26A through 26E illustrate an example of a DC motor wherein a rotation detecting brush BD3 is arranged in a position inclined by 60° relative to one of electrode brushes B31 and B32, e.g., the electrode brush B32 in FIGS. 26A through 26E. Accordingly, an angle between the electrode brush B31 and the rotation detecting brush BD3 is larger than an angle between the electrode brush B32 and the rotation detecting brush BD3.

FIG. 26A illustrates an initial state of commutator CM3 of the DC motor. FIGS. 26B through 26E respectively illustrate the states of the commutator CM3 rotating clockwise in order by 30°.

Figure 32:
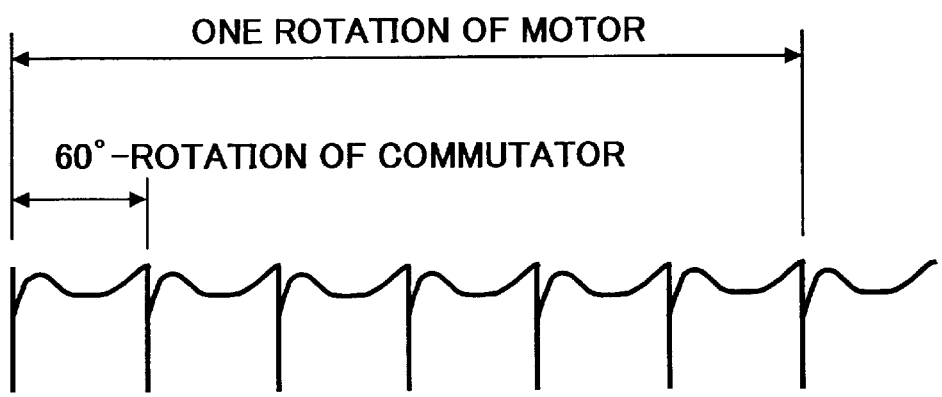
FIG. 32 is a diagram of ripple waveform according to the background art.
Figure 33:
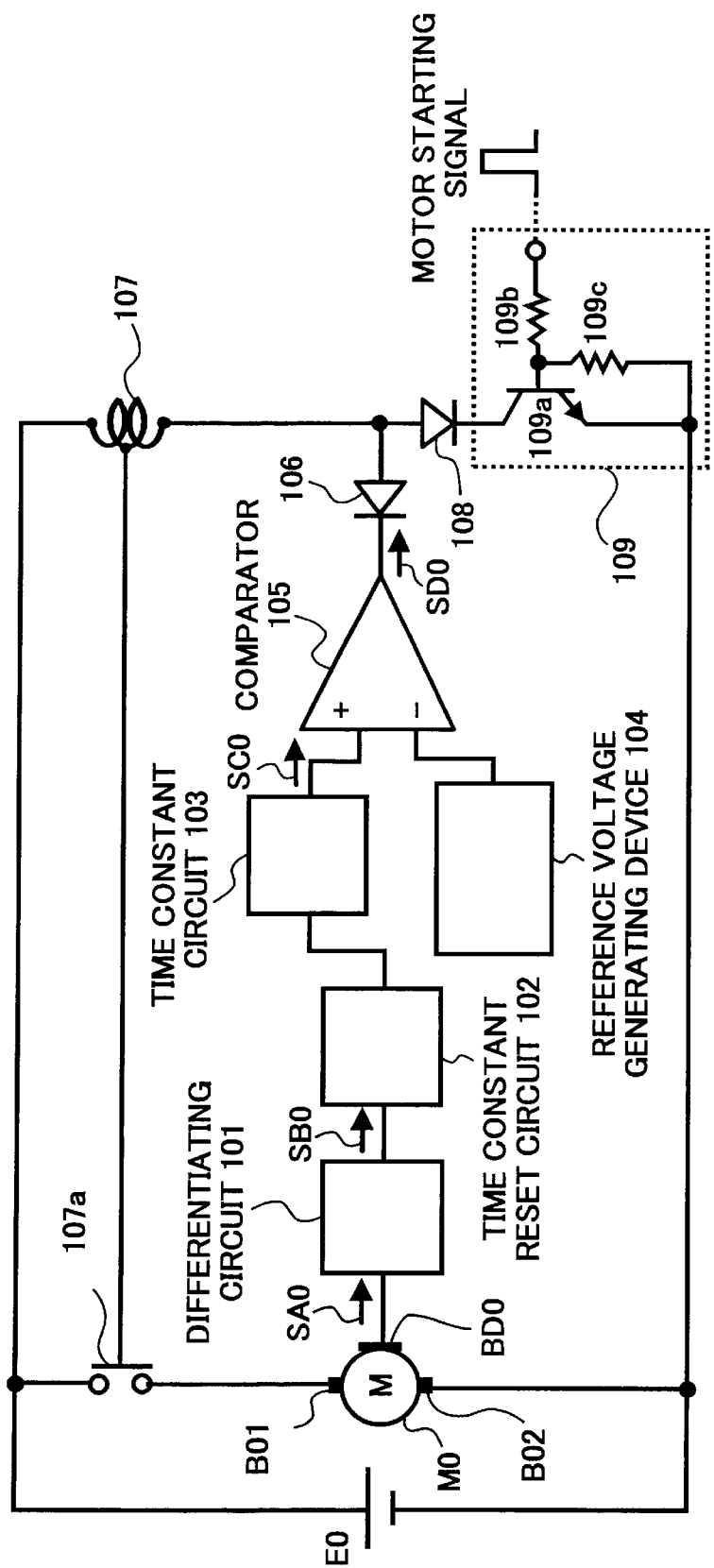
FIG. 33 is a circuit diagram illustrating a background DC motor control circuit.
Figure 34:
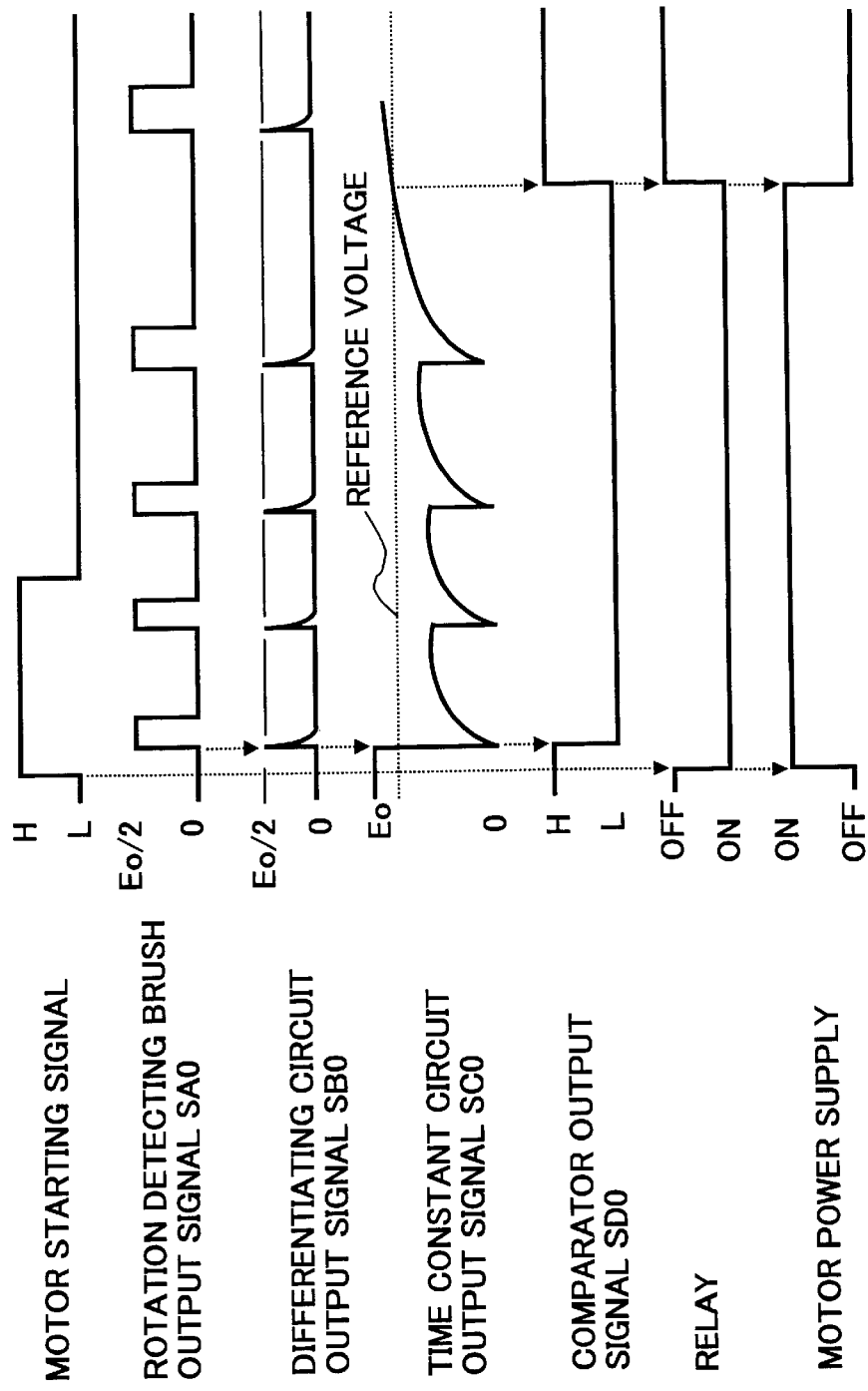
FIG. 34 is a diagram illustrating waveforms of a motor starting signal, a rotation detecting signal, an output signal from a differentiating circuit, an output signal from a time constant circuit, an output signal from a comparator, an operation (on/off) signal of a relay, and a supply signal applied to a motor from a drive power supply according to the background art.

FIG. 27 illustrates an estimated voltage waveform of an output voltage V generated from the rotation detecting brush BD3 when the commutator CM3 and the rotor are rotated as illustrated in FIGS. 26A through 26E. As is apparent from the fact in comparison with the waveform at the time of detecting rotation's number of the motor from the drive voltage ripple of the motor illustrated in FIG. 32, the waveform of the output voltage V in FIG. 27 largely varies per 60°.

Figure 28C:
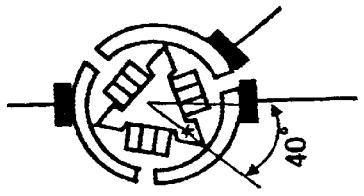
FIGS. 28A through 28G are schematic views illustrating an example of a DC motor wherein a rotation detecting brush is arranged in a position inclined by 40° relative to the electrode brush, and conditions of the commutator rotating clockwise in order by 20°.
Figure 28B:
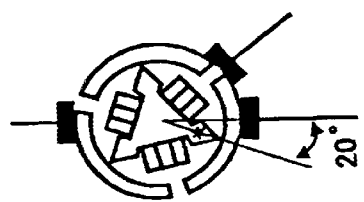
Figure 28A:
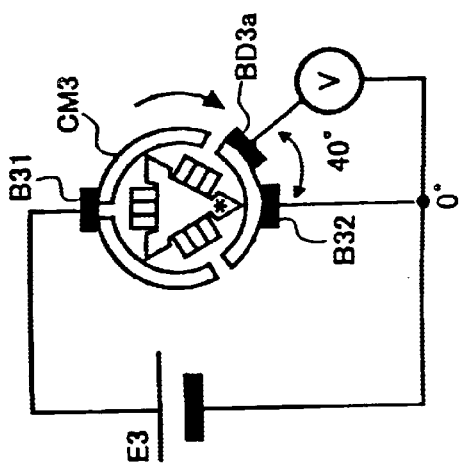
Figure 28G:
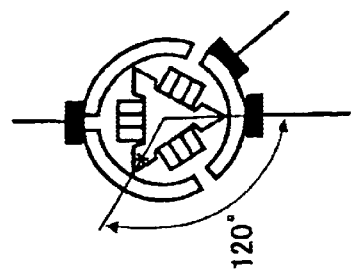
Figure 28F:
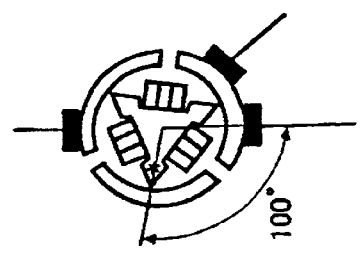
Figure 28E:
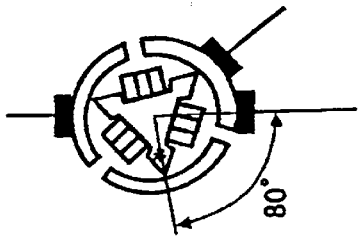
Figure 28D:
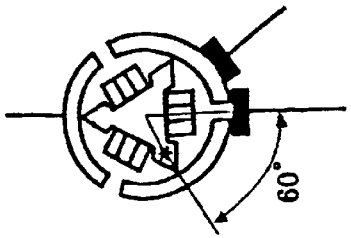

FIGS. 28A through 28G illustrate another example of the DC motor wherein a rotation detecting brush BD3a is arranged in a position inclined by 40° relative to one of the electrode brushes B31 and B32, e.g., the electrode brush B32 in FIGS. 28A through 28G. FIG. 28A illustrates an initial state of the commutator CM3 of the DC motor. FIGS. 28B through 28G respectively illustrate the states of the commutator CM3 rotating clockwise in order by 20°.

Figure 29:
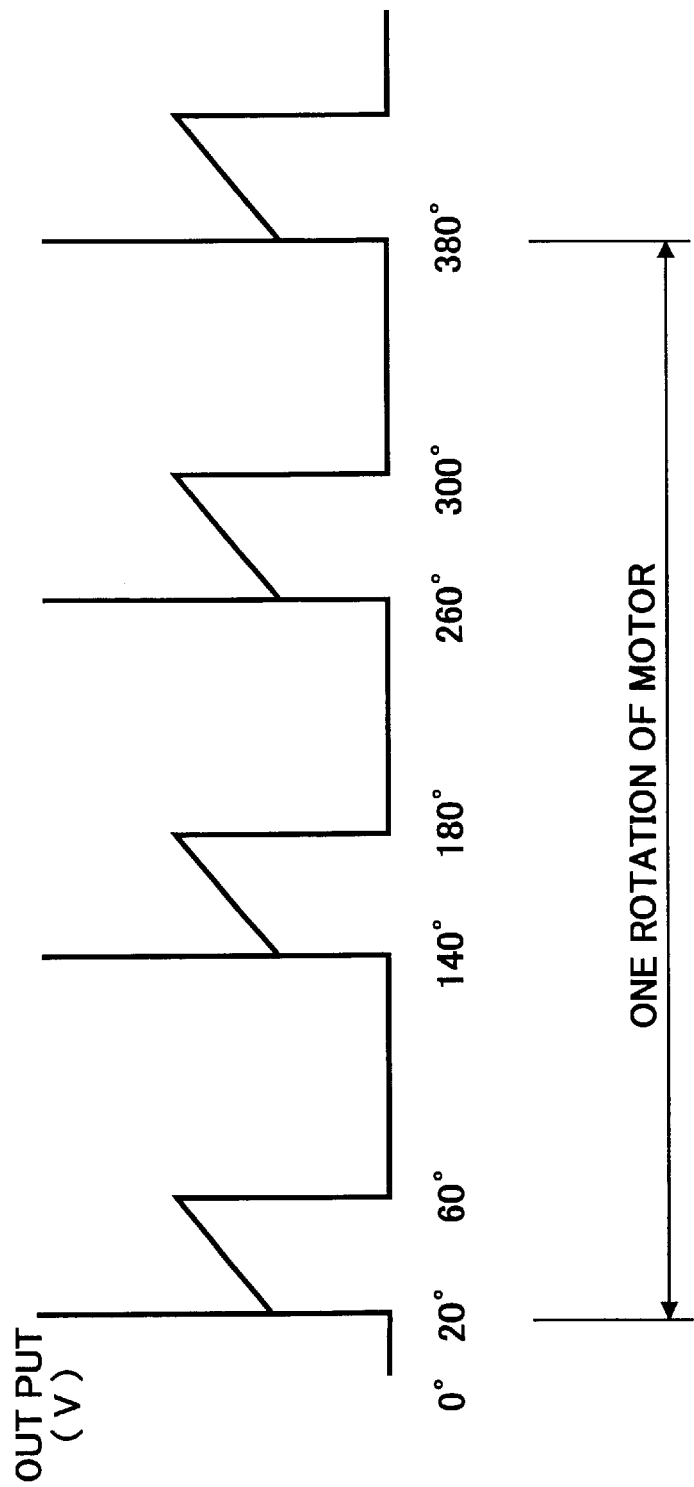
FIG. 29 is a waveform diagram of an output voltage generated from the rotation detecting brush.
Figure 30:
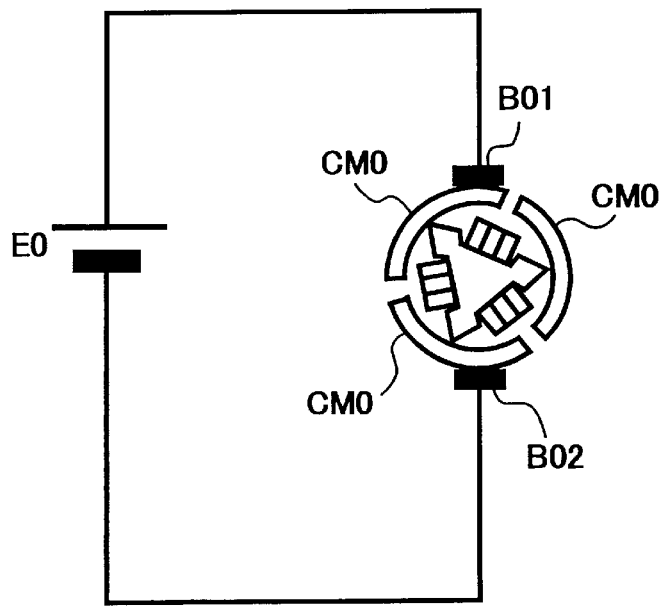
FIG. 30 is a schematic circuit diagram employing a three-pole DC motor according to the background art.
Figure 31:
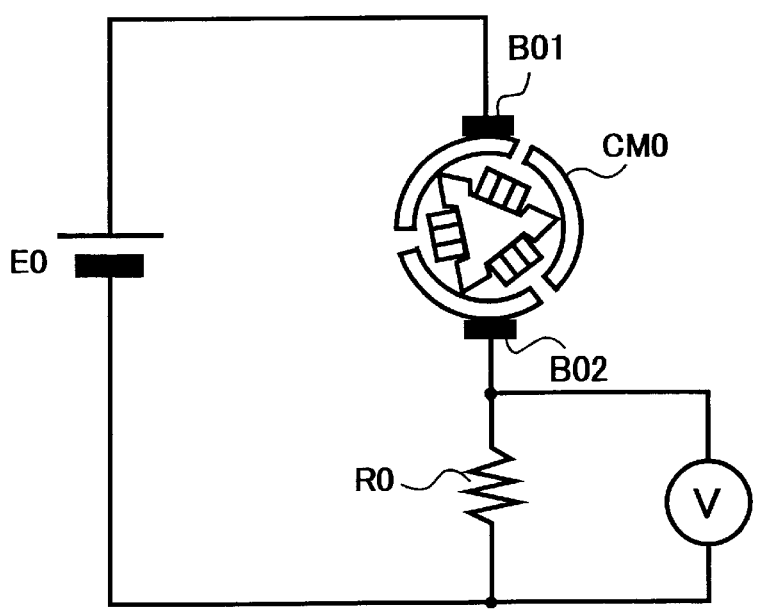
FIG. 31 is another schematic circuit diagram employing a three-pole DC motor according to the background art.

FIG. 29 illustrates an estimated voltage waveform of an output voltage V generated from the rotation detecting brush BD3a when the commutator CM3 and the rotor are rotated as illustrated in FIGS. 28A through 28G. If the voltage waveform is the one as illustrated in FIG. 27 or FIG. 29, the information relating to the number of rotations of the DC motor can be detected from the waveform of output signal from which the high-frequency component, such as, the ripple, etc. is removed from the output voltage V by causing the output voltage V to pass through the lowpass filter.

Numerous additional modifications and variations of the present invention are possible in light of the above teachings. It is therefore to be understood that within the scope of the appended claims, the present invention may be practiced otherwise than as specifically described herein.

What is claimed is:

1. A DC motor rotation detector apparatus configured to detect at least one of a rotational direction, a rotational speed, a rotational position, and a cumulative rotation number of a rotor of a DC motor, comprising:
    at least one rotation detector brush configured to detect a rotation of the rotor;
    a reference voltage device configured to generate a reference voltage; and
    a comparator configured to compare a voltage detected by the rotation detector brush with the reference voltage generated by the reference voltage device to generate a pulse train of pulse period corresponding to the rotation speed of the rotor.

2. The DC motor rotation detector apparatus according to claim 1, wherein the reference voltage device further comprises:
    a device that divides a DC drive voltage and obtains the reference voltage.

3. A DC motor rotation control apparatus configured to control at least one of a rotational direction, a rotational speed, a rotational position, and a cumulative rotation number of a rotor of a DC motor, comprising:
    at least one rotation detector brush configured to detect a rotation of the rotor;
    a motor driver circuit configured to apply a DC drive voltage to a pair of electrode brushes and to drive the DC motor;
    a reference voltage device configured to generate plural reference voltages which correspond respectively to at least one of different rotational directions of the rotor and voltages applied to the DC motor;
    a comparator configured to compare the voltage detected by the rotation detector brush with one of the plural reference voltages generated by the reference voltage device to generate a pulse train of pulse period corresponding to the rotational speed of the rotor; and
    a motor control circuit configured to apply the reference voltage to the comparator and to control the motor driving circuit by reacting to an output signal of the comparator.

4. The DC motor rotation control apparatus according to claim 3, wherein the motor control circuit further comprises:
    a pulse interval measurement device configured to measure a pulse interval of output pulses of the comparator;
    a rotational speed calculator device configured to calculate rotational speed of the rotor based on the pulse interval measured by the pulse interval measurement device;
    a rotational speed comparator device configured to compare the rotational speed of the rotor calculated by the rotational speed calculator device with a target rotational speed of the rotor; and
    a chopping control device configured to control a drive output signal of the motor driver circuit by performing chopping control based on a comparison result obtained by the rotational speed comparator device such that the rotational speed of the rotor reaches the target rotational speed.

5. The DC motor rotation control apparatus according to claim 4, wherein the motor control circuit further comprises:
    a rotational speed detection suppressor device configured to invalidate a rotational speed detection result measured by the pulse interval measurement device when a chopping operation is performed by the chopping control device.

6. A DC motor rotation detection method for detecting at least one of a rotational direction, a rotational speed, a rotational position, and a cumulative rotation number of a rotor of a DC motor, comprising:
    detecting a rotation of the rotor using least one rotation detector brush;
    generating a detection voltage;
    generating a reference voltage; and
    comparing the detection voltage with the reference voltage to generate a pulse train of pulse period corresponding to the rotational speed of the rotor.

7. The DC motor rotation detection method according to claim 6, wherein the step of generating the reference voltage further comprises:
    dividing a DC drive voltage and obtaining the reference voltage.

8. A DC motor rotation control method for controlling at least one of a rotational direction, a rotational speed, a rotational position, and a cumulative rotation number of a rotor of a DC motor, comprising:
    detecting a rotation of the rotor using at least one rotation detector brush;
    generating a detection voltage;
    driving the DC motor with a motor driving circuit by applying a DC drive voltage to a pair of electrode brushes;
    generating plural reference voltages which correspond respectively to at least one of different rotational directions of the rotor and voltages applied to the DC motor;
    comparing the voltage detected by the rotation detector brush with one of the plural reference voltages using a comparator to generate a pulse train of pulse period corresponding to the rotational speed of the rotor;
    applying the reference voltage to the comparator using a motor control circuit; and
    controlling the motor driving circuit by reacting to an output signal of the comparator.

9. The DC motor rotation control method according to claim 8, wherein the step of controlling the motor driving circuit further comprises:
    measuring a pulse interval of output pulses of the comparator;
    calculating a rotational speed of the rotor based on the pulse interval;

comparing the rotational speed of the rotor with a target rotational speed of the rotor; and controlling a device output signal of the motor driver circuit by performing chopping control such that the rotational speed of the rotor reaches the target rotational speed.

10. The DC motor rotation control method according to claim 9, wherein the step of controlling the motor driving circuit further comprises:

suppressing an invalid rotational speed detection result when a chopping operation is performed.

11. A DC motor rotation detector configured to detect at least one of a rotational direction, a rotational speed, a rotational position, and a cumulative rotation number of a rotor of a DC motor, comprising:

at least one rotation detection means for detecting a rotation of the rotor;

a reference voltage generating means for generating a reference voltage; and a comparing means for comparing a voltage detected by the rotation detection means with the reference voltage generated by the reference voltage generating means to generate a pulse train of pulse period corresponding to the rotational speed of the rotor.

12. The DC motor rotation detector according to claim 11, wherein the reference voltage generating means further comprises:

a voltage dividing means for dividing a DC drive voltage and obtaining the reference voltage.

13. A DC motor rotation control apparatus configured to control at least one of a rotational direction, a rotational speed, a rotational position, and a cumulative rotation number of a rotor of a DC motor, comprising:

at least one rotation detection means for detecting a rotation of the rotor;

a motor driving means for applying a DC drive voltage to a pair of electrode brushes and for driving the DC motor;

a reference voltage generating means for generating plural reference voltages which correspond respectively to at least one of different rotational directions of the rotor and voltages applied to the DC motor;

a comparator means for comparing the voltage detected by the rotation detection means with one of the plural reference voltages generated by the reference voltage generating means to generate a pulse train of pulse period corresponding to the rotational speed of the rotor; and a motor control means for applying the reference voltage to the comparator means and for controlling the motor driving means by reacting to an output signal of the comparator means.

14. The DC motor rotation control apparatus according to claim 13, wherein the motor control means further comprises:

a pulse interval measurement means for measuring a pulse interval of output pulses of the comparator means;

a rotational speed calculator means for calculating rotational speed of the rotor based on the pulse interval measured by the pulse interval measurement means;

a rotational speed comparator means for comparing the rotational speed of the rotor calculated by the rotational speed calculator means with a target rotational speed of the rotor; and a chopping control means for controlling a drive output signal of the motor driving means by performing chopping control based on a comparison result obtained by the rotational speed comparator means such that the rotational speed of the rotor reaches the target rotational speed.

15. The DC motor rotation control apparatus according to claim 14, wherein the motor control means further comprises:

a rotational speed detection suppressor means for invalidating a rotational speed detection result measured by the pulse interval measurement means when a chopping operation is performed by the chopping control means.

16. An apparatus using a DC motor rotation detector device configured to detect at least one of a rotational direction, a rotational speed, a rotational position, and a cumulative rotation number of a rotor of a DC motor, said DC motor rotation detector device comprising:

at least one rotation detector brush configured to detect a rotation of the rotor;

a reference voltage device configured to generate a reference voltage; and a comparator configured to compare a voltage detected by the rotation detector brush with the reference voltage generated by the reference voltage device to generate a pulse train of pulse period corresponding to the rotational speed of the rotor.

17. The apparatus according to claim 16, wherein the reference voltage device further comprises:

a device that divides a DC drive voltage and obtains the reference voltage.

18. An apparatus using a DC motor rotation control device configured to control at least one of a rotational direction, a rotational speed, a rotational position, and a cumulative rotation number of a rotor of a DC motor, said DC motor rotation control device comprising:

at least one rotation detector brush configured to detect a rotation of the rotor;

a motor driver circuit configured to apply a DC drive voltage to a pair of electrode brushes and to drive the DC motor;

a reference voltage device configured to generate plural reference voltages which correspond respectively to at least one of different rotational directions of the rotor and voltages applied to the DC motor;

a comparator configured to compare the voltage detected by the rotation detector brush with one of the plural reference voltages generated by the reference voltage device to generate a pulse train of pulse period corresponding to the rotational speed of the rotor; and a motor control circuit configured to apply the reference voltage to the comparator and to control the motor driving circuit by reacting to an output signal of the comparator.

19. The apparatus according to claim 18, wherein the motor control circuit further comprises:

a pulse interval measurement device configured to measure a pulse interval of output pulses of the comparator;

a rotational speed calculator device configured to calculate rotational speed of the rotor based on the pulse interval measured by the pulse interval measurement device;

a rotational speed comparator device configured to compare the rotational speed of the rotor calculated by the rotational speed calculator device with a target rotational speed of the rotor; and a chopping control device configured to control a drive output signal of the motor driver circuit by performing chopping control based on a comparison result obtained by the rotational speed comparator device such that the rotational speed of the rotor reaches the target rotational speed.

20. The apparatus according to claim 19, wherein the motor control circuit farther comprises:
a rotational speed detection suppressor device configured to invalidate a rotational speed detection result measured by the pulse interval measurement device when a chopping operation is performed by the chopping control device.

21. The DC motor rotation control apparatus according to claim 13, wherein the motor control means further comprises at least one of:
a reference voltage selecting signal generating means for generating a reference voltage selecting signal,
a motor control signal generating means for generating a motor control signal,
a pulse number counting means for a counting a pulse number,
a cumulative rotational number calculating means for calculating a cumulative rotational number, and
a remaining rotational number calculating means for calculating a remaining rotational number.

22. The apparatus according to claim 18, wherein the motor control circuit further comprises at least one of:
a reference voltage selecting signal generating device,
a motor control signal generating device,
a pulse number counting device,
a cumulative rotational number calculating device, and
a remaining rotational number calculating device.

23. The apparatus according to claim 18, wherein the motor control circuit further comprises at least one of:
a reference voltage selecting signal generating device,
a motor control signal generating device,
a pulse number counting device,
a cumulative rotation number calculating device,
a remaining rotation number calculating device,
a pulse interval measuring device,
a rotational speed calculating device, and
a rotational speed comparing device.

24. The apparatus according to claim 18, wherein the motor control circuit further comprises at least one of:
means for generating a reference voltage selecting signal,
means for generating a motor control signal,
means for counting a pulse number,
means for calculating a cumulative rotation,
means for calculating a remaining rotation number,
means for measuring a pulse interval,
means for calculating a rotational speed, and
means for comparing a rotational speed.

* * * * *